US012665294B2

(12) United States Patent
Xue et al.

(10) Patent No.: US 12,665,294 B2
(45) Date of Patent: Jun. 23, 2026

(54) ANTENNA STRUCTURE AND ELECTRONIC DEVICE

(71) Applicant: Huawei Technologies Co., Ltd., Shenzhen (CN)

(72) Inventors: Liang Xue, Shanghai (CN); Yiwen Gong, Shanghai (CN); Wei Wu, Shanghai (CN); Jiaming Wang, Shanghai (CN); Fangchao Zhao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 193 days.

(21) Appl. No.: 18/579,689

(22) PCT Filed: Jul. 14, 2022

(86) PCT No.: PCT/CN2022/105631

§ 371 (c)(1),
(2) Date: Jan. 16, 2024

(87) PCT Pub. No.: WO2023/284811

PCT Pub. Date: Jan. 19, 2023

(65) Prior Publication Data

US 2024/0347903 A1 Oct. 17, 2024

(30) Foreign Application Priority Data

Jul. 16, 2021 (CN) ........................ 202110810416.X

(51) Int. Cl.
*H01Q 1/52* (2006.01)
*H01Q 1/24* (2006.01)
(Continued)

(52) U.S. Cl.
CPC ............. *H01Q 1/521* (2013.01); *H01Q 1/243* (2013.01); *H01Q 1/48* (2013.01); *H01Q 9/42* (2013.01); *H01Q 25/04* (2013.01)

(58) Field of Classification Search
CPC .......... H01Q 1/521; H01Q 1/243; H01Q 1/48; H01Q 9/42; H01Q 25/04
See application file for complete search history.

(56) References Cited

U.S. PATENT DOCUMENTS

2012/0256800 A1 10/2012 Kuonanoja
2019/0027833 A1* 1/2019 Ayala Vazquez ...... H01Q 5/342

FOREIGN PATENT DOCUMENTS

CN 103579740 A 2/2014
CN 107257016 A 10/2017
(Continued)

OTHER PUBLICATIONS

Changjiang Deng et al: "Tightly Arranged Four-Element MIMO Antennas for 5G Mobile Terminals", IEEE Transactions on Antennas and Propagation, Oct. 2019, total 9 pages.

*Primary Examiner* — Graham P Smith
(74) *Attorney, Agent, or Firm* — Conley Rose, P.C.

(57) ABSTRACT

An antenna structure includes a first radiator and a second radiator, and a first open end of the first radiator is opposite to and spaced from a second open end of the second radiator. A decoupling circuit is connected between the first open end and the second open end. The first radiator includes a first section and a second section that intersect, and the first section and the second section are respectively located on two adjacent sides of a ground.

20 Claims, 40 Drawing Sheets

(51) Int. Cl.

| | |
|---|---|
| ***H01Q 1/48*** | (2006.01) |
| ***H01Q 9/42*** | (2006.01) |
| ***H01Q 25/04*** | (2006.01) |

(56) References Cited

FOREIGN PATENT DOCUMENTS

| | | | |
|---|---|---|---|
| CN | 110247160 | A | 9/2019 |
| CN | 111276806 | A | 6/2020 |
| CN | 112736432 | A | 4/2021 |
| CN | 113451771 | A | 9/2021 |
| TW | M571056 | U | 12/2018 |
| WO | 2018219112 | A1 | 12/2018 |
| WO | 2020207425 | A1 | 10/2020 |

* cited by examiner

ANTENNA STRUCTURE AND ELECTRONIC DEVICE

CROSS-REFERENCE TO RELATED APPLICATIONS

This is a National Stage of International Patent Application No. PCT/CN2022/105631, filed on Jul. 14, 2022, which claims priority to Chinese Patent Application No. 202110810416.X, filed on Jul. 16, 2021, which are incorporated by reference.

TECHNICAL FIELD

This application relates to the field of communication technologies, and in particular, to an antenna structure and an electronic device.

BACKGROUND

With continuous development of communication technologies, more antennas need to be deployed in an electronic device like a mobile phone. As sizes of internal components such as a camera and a battery of the mobile phone increase, the internal components occupy larger space. Consequently, available space for the antenna is further reduced. Therefore, a multi-antenna compact design becomes an urgent problem to be resolved in recent years. A primary technical difficulty of the multi-antenna compact design is how to implement isolation between antennas.

SUMMARY

This application provides an antenna and an electronic device, to improve isolation between antennas, and improve communication effect of the electronic device.

According to a first aspect, this application provides an antenna structure. The antenna structure includes a first radiator, a second radiator, a ground, and a decoupling circuit. The ground includes a first edge and a second edge that are adjacent and intersect. The first radiator includes a first section and a second section that intersect, the first section is located on a side of the first edge of the ground and is spaced from the first edge, and the second section is located on a side of the second edge of the ground and is spaced from the second edge. The first radiator includes a first open end, the second radiator includes a second open end, a gap is formed between the first open end and the second open end, the first radiator is entirely located on one side of the gap, and the second radiator is entirely located on the other side of the gap. The decoupling circuit is connected to the first open end and the second open end.

In this application, an equivalent capacitor is formed between the first open end and the second open end that are spaced. The decoupling circuit is connected between the first open end and the second open end, and the decoupling circuit and the equivalent capacitor formed between the first open end and the second open end can form a band-stop filter. In this way, current coupling between a first antenna and a second antenna is prevented, so that isolation between the first antenna and the second antenna is improved.

In addition, in this application, the first radiator includes the first section and the second section that intersect, the first section and the second section are respectively located on two adjacent sides of the ground, and a ground current generated by the ground under excitation of the first radiator and a ground current generated by the ground under excitation of the second radiator are not reverse in a large area. Therefore, after the decoupling circuit is connected between the first radiator and the second radiator, when isolation between the first antenna and the second antenna is improved, performance of the first antenna or the second antenna is not greatly affected.

Moreover, the first radiator includes the first section and the second section that intersect, so that the ground current generated by the ground under excitation of the first radiator and the ground current generated by the ground under excitation of the second radiator can intersect at a specific angle, instead of exciting the ground to respectively generate two opposite currents. Therefore, isolation between the first antenna and the second antenna can be further improved. In addition, in this implementation of this application, radiation patterns of the first antenna and the second antenna can be complementary. Therefore, an envelope correlation coefficient (ECC) between the first antenna and the second antenna can be relatively small.

In some implementations, the ground further includes a third edge, the first edge is connected between the second edge and the third edge, and the third edge is adjacent to and intersects the first edge, where an angle at which the first edge and the second edge intersect and an angle at which the first edge and the third edge intersect are within a range of 80° to 100°.

End portions of the first radiator include a first end and a second end, the first end is an end that is of the first section of the first radiator and that is away from the second section, and the second end is an end that is of the second section of the first radiator and that is away from the first section. The first end is the first open end, and the second end is connected to the ground, or the second end is a third open end of the first radiator.

In this implementation of this application, when the first end is the first open end, and the second end is connected to the ground, one end of the first radiator is an open end (that is, the first open end) and is not connected to the ground, and the other end (that is, the second end) is a grounding end and is connected to the ground. In some implementations of this application, the first antenna can generate an antenna pattern in a ¼ wavelength mode. When the first end is the first open end, and the second end is the third open end, both ends of the first radiator are open ends (that is, the first open end and the third open end), that is, neither of the two ends of the first radiator is connected to the ground. In some implementations of this application, the first antenna can generate an antenna pattern in a ¼ wavelength mode and an antenna pattern in a ½ wavelength mode.

In some implementations, the second radiator includes a third section and a fourth section that intersect, the third section of the second radiator is located on a side of the first edge and is spaced from the first edge, and the fourth section of the second radiator is located on a side of the third edge and is spaced from the third edge. End portions of the second radiator include a third end and a fourth end, the third end is an end that is of the third section of the second radiator and that is away from the fourth section of the second radiator, and the fourth end is an end that is of the fourth section of the second radiator and that is away from the third section of the second radiator. The third end is the second open end, and the fourth end is connected to the ground, or the fourth end is a fourth open end of the second radiator.

In this implementation of this application, the first radiator includes the first section and the second section that intersect, and the second radiator includes the third section and the fourth section that intersect. The first radiator may be a structure in which one end is an open end and the other end is a grounding end, or may be a structure in which both ends are open ends. The second radiator is a structure in which one end is an open end and the other end is a grounding end, or may be a structure in which both ends are open ends. Aground current generated by the ground under excitation of the first radiator and a ground current generated by the ground under excitation of the second radiator are not reverse in a large area. Therefore, after the decoupling circuit is connected between the first radiator and the second radiator, when isolation between the first antenna and the second antenna is improved, performance of the first antenna or the second antenna is not greatly affected. Moreover, the ground current generated by the ground under excitation of the first radiator and the ground current generated by the ground under excitation of the second radiator can intersect at a specific angle, instead of exciting the ground to respectively generate two opposite currents. Therefore, isolation between the first antenna and the second antenna can be further improved. In some implementations of this application, the second antenna can also generate an antenna pattern in a ¼ wavelength mode and/or an antenna pattern in a ½ wavelength mode.

In some implementations, the second radiator is entirely located on a side of the second edge and is spaced from the second edge, and the second radiator is located on a side that is of the second section of the first radiator and that is away from the first section. End portions of the first radiator include a first end and a second end, the first end is an end that is of the first section of the first radiator and that is away from the second section, and the second end is an end that is of the second section of the first radiator and that is away from the first section. End portions of the second radiator include a third end and a fourth end, and the third end is close to the first radiator relative to the fourth end. The second end of the first radiator is the first open end, and the third end of the second radiator is the second open end. The decoupling circuit is connected to the second end of the first radiator and the third end of the second radiator.

In this implementation of this application, only the first radiator includes the first section and the second section that intersect, and the second radiator has a straight-line-shaped structure. A ground current generated by the ground under excitation of the first radiator and a ground current generated by the ground under excitation of the second radiator are not reverse in a large area. Therefore, after the decoupling circuit is connected between the first radiator and the second radiator, when isolation between the first antenna and the second antenna is improved, performance of the first antenna or the second antenna is not greatly affected. Moreover, the ground current generated by the ground under excitation of the first radiator and the ground current generated by the ground under excitation of the second radiator can intersect at a specific angle, instead of exciting the ground to respectively generate two opposite currents. Therefore, isolation between the first antenna and the second antenna can be further improved. In some implementations of this application, the second antenna can also generate an antenna pattern in a ¼ wavelength mode and an antenna pattern in a ½ wavelength mode.

In some implementations, the first radiator further includes a third open end, the first end is the third open end, and the fourth end of the second radiator is connected to the ground. In this implementation, the first radiator is a structure in which both ends are open ends, and the second radiator includes one open end and one grounding end.

In some implementations, an operating band of the first radiator in a first operating mode and an operating band of the second radiator in a second operating mode are the same or have a difference less than 1 GHz.

In some implementations, the operating band of the first radiator in the first operating mode and the operating band of the second radiator in the second operating mode each are any operating band of sub-6G. In some implementations, one of the first radiator and the second radiator includes a first sub-radiator and a second sub-radiator that are spaced from each other, the first sub-radiator is entirely located on one side of the second sub-radiator, the other radiator in the first radiator and the second radiator is entirely located on the other side of the second sub-radiator, the first sub-radiator is coupled to the second sub-radiator, and an end that is of the second sub-radiator and that is away from the first sub-radiator is the first open end or the second open end.

In this implementation of this application, the first radiator or the second radiator includes the first sub-radiator and the second sub-radiator that are spaced from each other. When a hand of a user or another structure blocks a gap between the first radiator and the second radiator, and then the hand of the user or the another structure connects an open end of the first radiator to an open end of the second radiator, isolation between the first antenna and the second antenna does not deteriorate sharply.

In some implementations, an electrical length of the second sub-radiator is less than ¼ of a wavelength of a decoupling band of the antenna structure, and the decoupling band is the same as the operating band of the first radiator in the first operating mode or is the same as the operating band of the second radiator in the second operating mode. This avoids that an excessively long length of the second sub-radiator affects arrangement of the first sub-radiator and the second radiator, and ensures that at least one of the first sub-radiator and the second radiator can include the first section and the second section.

In some implementations, a feedpoint is disposed on the second sub-radiator, and the feedpoint is used for receiving signal feed-in, so that the second sub-radiator can be used as a separate radiation stub to perform signal radiation. This increases an operating mode of an antenna.

In some implementations, the decoupling circuit is inductive, and an equivalent inductance value of the decoupling circuit is related to the operating band of the first radiator in the first operating mode and/or the operating band of the second radiator in the second operating mode.

In some implementations, the decoupling circuit includes a lumped inductor or a distributed inductor. In some implementations, the decoupling circuit includes a first branch and a second branch that are disposed in parallel, and an equivalent inductance value of the first branch is different from an equivalent inductance value of the second branch. In some implementations, the first branch is an inductive filter circuit, and the second branch includes a lumped inductor or a distributed inductor. Therefore, it is ensured that when operating frequencies of the first radiator and the second radiator change, an inductance value of the decoupling circuit connected between the first open end of the first radiator and the second open end of the second radiator can change correspondingly, to ensure that there is always relatively good isolation between the first antenna and the second antenna.

In some implementations, the first branch includes a capacitor, a first inductor, and a second inductor, the capacitor is connected in parallel to the first inductor and then connected in series to the second inductor, and the second branch includes a third inductor.

In some implementations, the decoupling circuit is connected to a first connection point of the first open end, and a distance between the first connection point and an end face of the first open end is within a range of 0 mm to 2 mm; and/or the decoupling circuit is connected to a second connection point of the second open end, and a distance between the second connection point and an end face of the second open end is within a range of 0 mm to 2 mm. The decoupling circuit is separately connected to the ends of the open ends of the two radiators, and the connection points are within a range of 0 mm to 2 mm from the end faces. This can ensure relatively good isolation between the first antenna and the second antenna, and save space of an electronic device.

According to a second aspect, this application further provides an electronic device. The electronic device includes a radio frequency front end and the foregoing antenna structure, a first feedpoint is disposed on a first radiator, a second feedpoint is disposed on a second radiator, and the radio frequency front end is connected to the first feedpoint and the second feedpoint. Because relatively good isolation can be achieved between the first antenna and the second antenna in the antenna structure of this application, and antenna efficiency of a single antenna is not greatly reduced, it is ensured that antennas of the electronic device in this application can be designed more compactly, and the electronic device can have a relatively good radio frequency signal transmission function.

In some implementations, the electronic device includes a metal frame, and the metal frame includes the first radiator and the second radiator. Therefore, space occupied by the antenna structure in the electronic device can be reduced.

In some implementations, a ground includes any one of or a combination of any two or more of one or more grounded middle plates, ground planes of one or more circuit boards, and one or more ground metal pieces.

In some implementations, the electronic device includes a mainboard, the mainboard is a circuit board, and a ground plane of the mainboard may be used as the ground. Alternatively, in some other implementations, the ground plane of the mainboard is connected to the middle plate, and the middle plate and the ground plane of the mainboard are used as the ground together. Alternatively, in some implementations, the electronic device further includes a sub-board, the sub-board is also a circuit board, and ground planes of both the mainboard and the sub-board may be used as the ground, or the ground plane of the mainboard and/or the ground plane of the sub-board and/or the middle plate are/is used as the ground.

BRIEF DESCRIPTION OF DRAWINGS

To describe the structural features and functions of this application more clearly, the following describes this application in detail with reference to the accompanying drawings and specific embodiments.

DESCRIPTION OF EMBODIMENTS

The following clearly describes the technical solutions in embodiments of this application with reference to the accompanying drawings in embodiments of this application.

This application provides an electronic device. The electronic device includes an antenna, and the electronic device can transmit a signal through the antenna. In this application, the electronic device may be a mobile phone, a tablet computer, a PC, a router, a wearable device, or the like. In this application, an example in which the electronic device is a mobile phone is used to describe the electronic device in this application.

Figure 1:
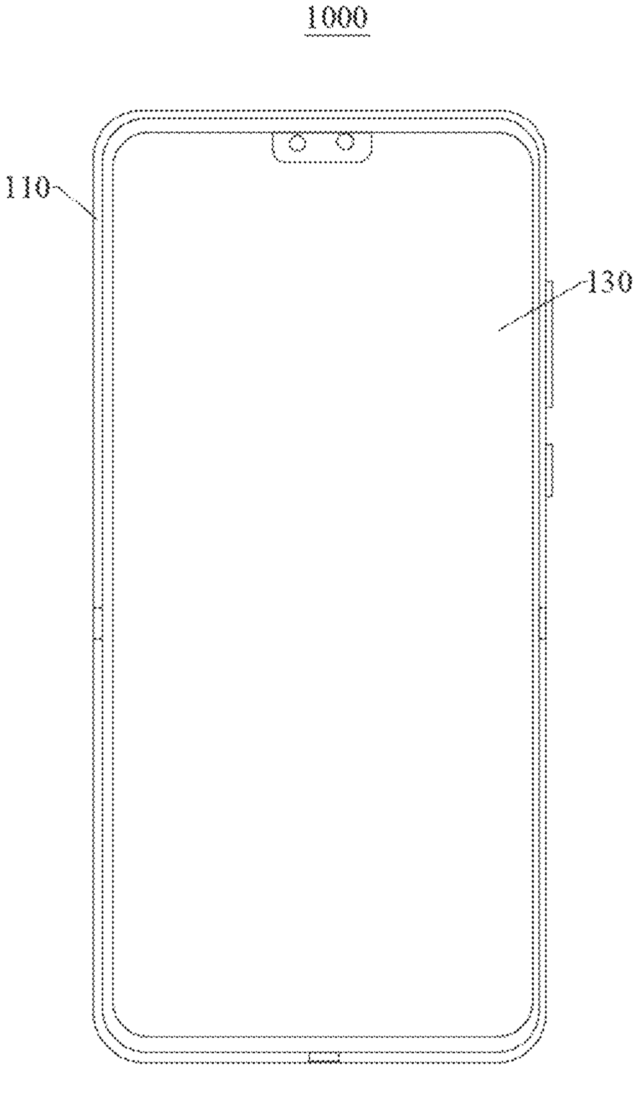
FIG. 1 is a schematic diagram of a structure of an electronic device according to an implementation of this application.
Figure 2:
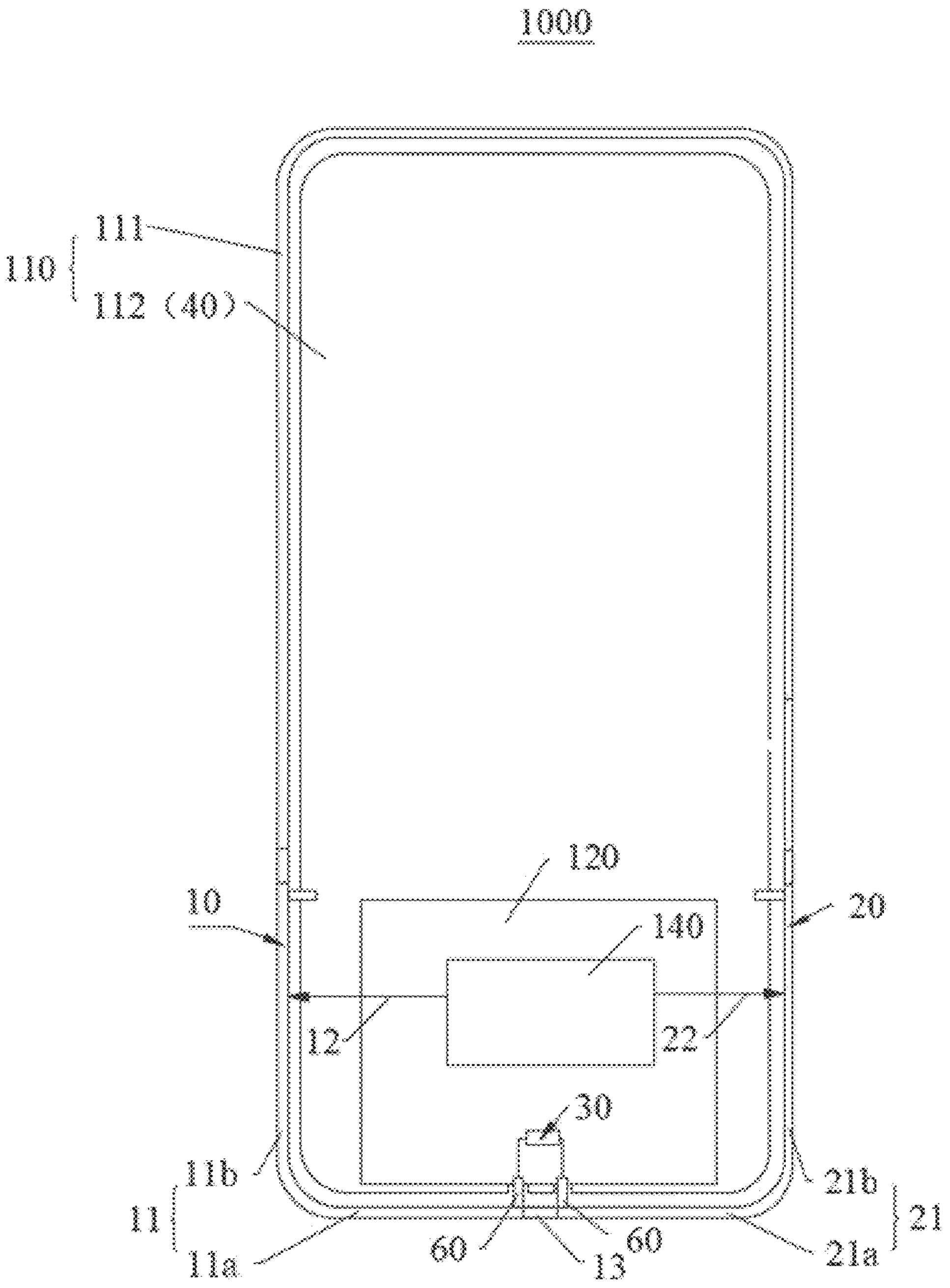
FIG. 2 is a schematic diagram of an internal structure of the electronic device shown in FIG. 1.

Refer to FIG. 1 and FIG. 2. FIG. 1 is a schematic diagram of a structure of an electronic device 1000 according to an implementation of this application. FIG. 2 is a schematic diagram of an internal structure of the electronic device 1000 shown in FIG. 1. In this implementation, the electronic device 1000 includes a middle frame 110, a mainboard 120, a display 130, a rear cover (not shown), and an antenna structure. Both the display 130 and the rear cover are fastened to the middle frame 110. The display 130, the rear cover, and the middle frame 110 can be fastened to form accommodation space, and the mainboard 120 can be accommodated in the accommodation space. In this implementation, the middle frame 110 includes a frame 111 and a middle plate 112. The frame 111 is disposed around the middle plate 112 and connected to the middle plate 112. In some implementations of this application, the frame 111 and the middle plate 112 may be an integrally formed structure. Alternatively, the frame 111 and the middle plate 112 may be separately formed independent structures, and are connected through a connection piece like a screw, a buckle, or a spring, or connected through welding, bonding, or the like. In some implementations, a protrusion piece extending inward from an inner side surface of the frame 111 may be used as a connection piece, or a protrusion piece extending from an edge of the middle plate 112 to the frame 111 may be used as a connection piece, so that the frame 111 and the middle plate 112 are connected through the connection piece. In this implementation, the mainboard 120 is fastened to the middle plate 112, so that the mainboard 120 is fastened in the electronic device 1000. It may be understood that, in some other implementations of this application, the middle frame 110 may alternatively include only the frame 111, but does not include the middle plate 112, and the mainboard 120 is fastened in the electronic device 1000 in another manner.

In some implementations of this application, a radio frequency front end 140 is disposed on the mainboard 120, and the radio frequency front end 140 can be signal-connected to the antenna structure, to transmit a processed radio frequency signal to the antenna structure for sending, or process a radio frequency signal received by the antenna structure. Specifically, in some implementations of this application, the radio frequency front end 140 may include a transmit path and a receive path. The transmit path includes components such as a power amplifier and a filter, and is used to perform processing such as power amplification and filtering on a radio frequency signal and transmit a processed radio frequency signal to the antenna structure, to send the processed radio frequency signal through the antenna structure. The receive path includes components such as a low-noise amplifier and a filter. The receive path processes a radio frequency signal received by the antenna structure, to ensure that a useful radio frequency signal can be completely picked up from space without distortion and transmitted to subsequent circuits such as a frequency conversion circuit and an intermediate frequency amplification circuit.

Figure 3:
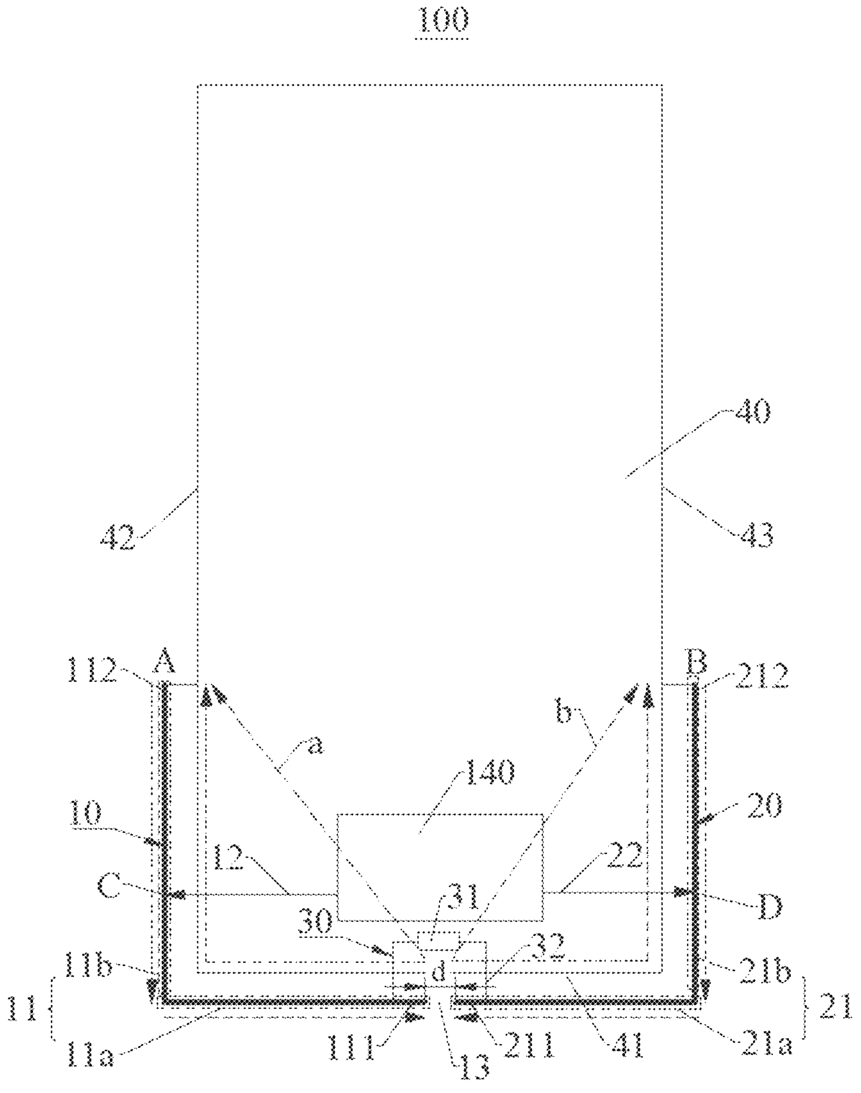
FIG. 3 is a schematic diagram of a topology structure of an antenna structure according to an implementation of this application.

Refer to FIG. 2 and FIG. 3. FIG. 3 is a schematic diagram of a topology structure of an antenna structure 100 according to an embodiment of this application. The antenna structure 100 includes a first antenna 10, a second antenna 20, a decoupling circuit 30, and a ground 40.

Figure 4A:
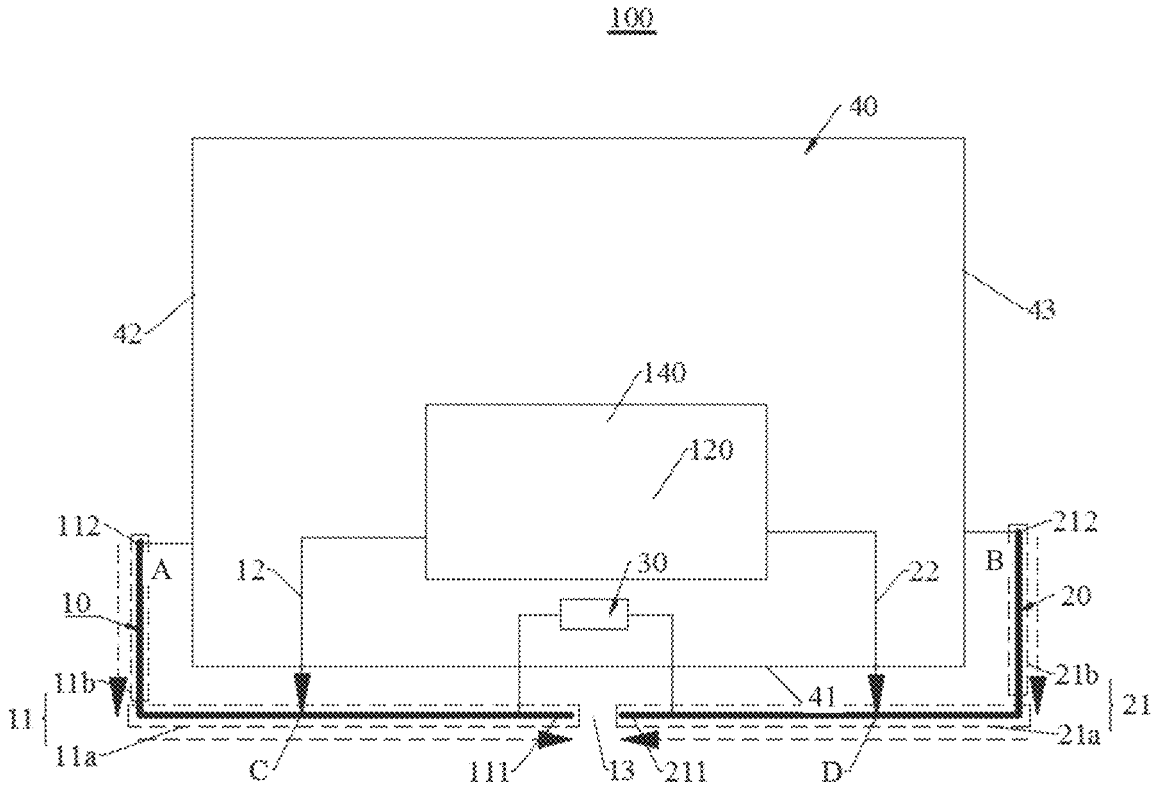
FIG. 4*a* is a schematic diagram of a topology structure of an antenna structure according to another implementation of this application.
Figure 4B:
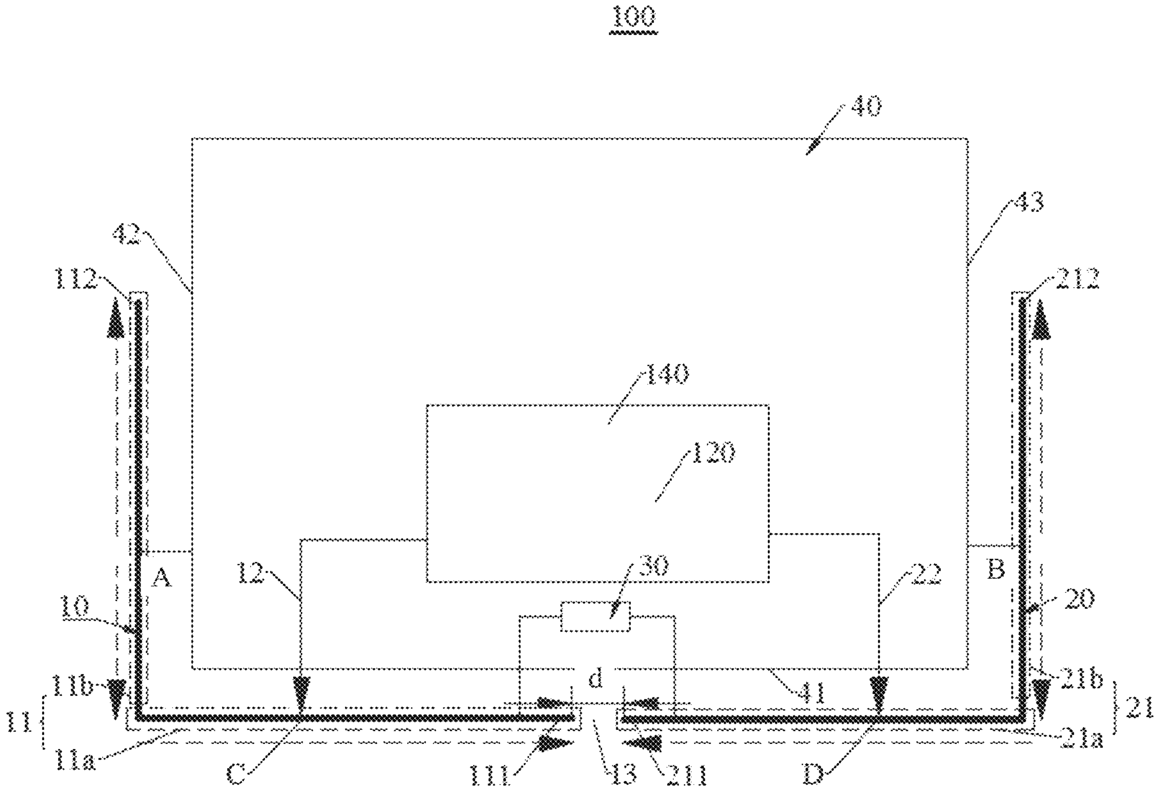
FIG. 4*b* is a schematic diagram of a topology structure of an antenna structure according to another implementation of this application.

In this application, the ground 40 can be used as a reference ground of the electronic device 1000. In some implementations of this application, the ground 40 may include any one of a grounded middle plate 112, a ground plane of a circuit board, and a built-in ground metal piece of the electronic device 1000, or may include a combination of two or more of the grounded middle plate 112, the ground plane of the circuit board, and the built-in ground metal piece of the electronic device 1000. In this implementation, the middle plate 112 of the middle frame 110 is grounded, and the middle plate 112 is used as the ground 40 of the antenna structure 100 in this implementation. Alternatively, in some other implementations of this application, the mainboard 120 in the electronic device 1000 includes a ground plane, and the ground plane of the mainboard 120 may be used as the ground 40, or the ground plane of the mainboard 120 and the middle plate 112 are electrically connected to serve as at least a part of the ground 40 together. Alternatively, in some implementations, the electronic device 1000 may include one or more middle plates 112, and/or ground planes of one or more circuit boards, and/or one or more ground metal pieces. The ground in this application may be a combination of any two or more of the foregoing. For example, the electronic device 1000 may further include a sub-board, and the sub-board is also a circuit board including a ground plane. In this case, the sub-board in the electronic device 1000 may be used as a ground plane. When the ground plane of the sub-board is electrically connected to the ground plane of the mainboard 120 or the ground 40, the ground plane of the sub-board and the ground plane of the mainboard 120 or the middle plate 112 may be electrically connected to serve as the ground 40 of the electronic device 1000 together. In an implementation of this application, the ground 40 includes a first edge 41, a second edge 42, and a third edge 43. The first edge 41 is connected between the second edge 42 and the third edge 43, the second edge 42 intersects the first edge 41, and the third edge 43 intersects the first edge 41. In an implementation of this application, the ground 40 is a rectangular plate. The first edge 41, the second edge 42, and the third edge 43 are three adjacent sides of the rectangular ground. In this implementation, the first edge 41 is one short side of the ground 40, and the second edge 42 and the third edge 43 are two opposite long sides of the ground 40. Both the first edge 42 and the third edge 43 perpendicularly intersect the first edge 41. It should be noted that in this implementation, the first edge 41, the second edge 42, and the third edge 43 are names of sides of the ground 40 for ease of description of the ground 40. It may be understood that in another implementation of this application, one long side of the ground 40 may be named as the first edge 41, and two opposite short sides of the ground 40 may be named as the second edge 42 and the third edge 43. For example, refer to FIG. 4*a* and FIG. 4*b*. FIG. 4*a* is a schematic diagram of a topology structure of an antenna structure 100 according to another implementation of this application. FIG. 4*b* is a schematic diagram of a topology structure of an antenna structure 100 according to another implementation of this application. In the implementations shown in FIG. 4*a* and FIG. 4*b*, one long side of the ground 40 is the first edge 41, and two opposite short sides of the ground 40 are the second edge 42 and the third edge 43. It should be noted that, in an implementation of this application, that the ground 40 is rectangular means that an overall contour of the ground 40 is rectangular. Edges of the ground 40 may be based on an actual requirement, and four edges of the rectangular contour may have regular or irregular slits/slots, protrusions/bulges, or the like. There may be a plurality of bent edges from the first edge 41 to the fourth edge 44. This is not limited in this application.

This application is described by using an example in which the overall contour of the ground 40 is rectangular. It may be understood that the overall contour of the ground 40 may not be rectangular, for example, may be in another regular or irregular shape. The ground 40 in this application has three contour edges that sequentially intersect at angles, and the angles at which the edges intersect may be within a range of 80° to 100°. As shown in FIG. 3, the first edge 41, the second edge 42, and the third edge 43 are sequentially perpendicular to each other. It should be noted that "perpendicular" described in this application is not 90° in a strict mathematical sense, and a specific deviation may be allowed.

In this application, the first antenna 10 includes a first radiator 11 and a first feed circuit 12. A first feedpoint C is disposed on the first radiator 11, one end of the first feed circuit 12 is connected to the radio frequency front end 140, and the other end of the first feed circuit 12 is connected to the first feedpoint C on the first radiator 11, to transmit a radio frequency signal processed by the radio frequency front end 140 to the first radiator 11, or transmit a radio frequency signal received by the first radiator 11 to the radio frequency front end 140 for signal processing. It should be noted that in this implementation, the first feedpoint C is a location at which the first feed circuit 12 is connected to the first radiator 11 on the first radiator 11. In this implementation, the first feed circuit 12 is a feed cable. It may be understood that in another implementation of this application, the first feed circuit 12 may alternatively include a tuning element like a capacitor or an inductor, to adjust an electrical length of the first radiator 11, so that the first radiator 11 can operate in a required operating band.

The second antenna 20 includes a second radiator 21 and a second feed circuit 22. A second feedpoint D is disposed on the second radiator 21, one end of the second feed circuit 22 is connected to the radio frequency front end 140, and the other end of the second feed circuit 22 is connected to the second feedpoint D on the second radiator 21, to transmit a radio frequency signal processed by the radio frequency front end 140 to the second radiator 21, or transmit a radio frequency signal received by the second radiator 21 to the radio frequency front end 140 for signal processing. It should be noted that in this implementation, the second feedpoint D is a location at which the second feed circuit 22 is connected to the second radiator 21 on the second radiator 21. In this implementation, the second feed circuit 22 is a feed cable. It may be understood that in another implementation of this application, the second feed circuit 22 may alternatively include a tuning element like a capacitor or an inductor, to adjust an electrical length of the second radiator 21, so that the second radiator 21 can operate in a required operating band.

In this implementation, the frame 111 is made of a conductive material. For example, the frame 111 is made of a metal material. A part of the frame 111 can be used as the first radiator 11 and the second radiator 21 of the antenna structure 100, so that space occupied by the antenna structure 100 in the electronic device 1000 can be reduced. In addition, in this implementation, there is a specific distance between the part used as the first radiator 11 and the second radiator 21 in the frame 111 and the middle plate 112 used as the ground 40, to ensure that the first antenna 10 and the second antenna 20 can have specific clearance, and ensure that the first antenna 10 and the second antenna 20 can have good antenna efficiency.

Figure 5:
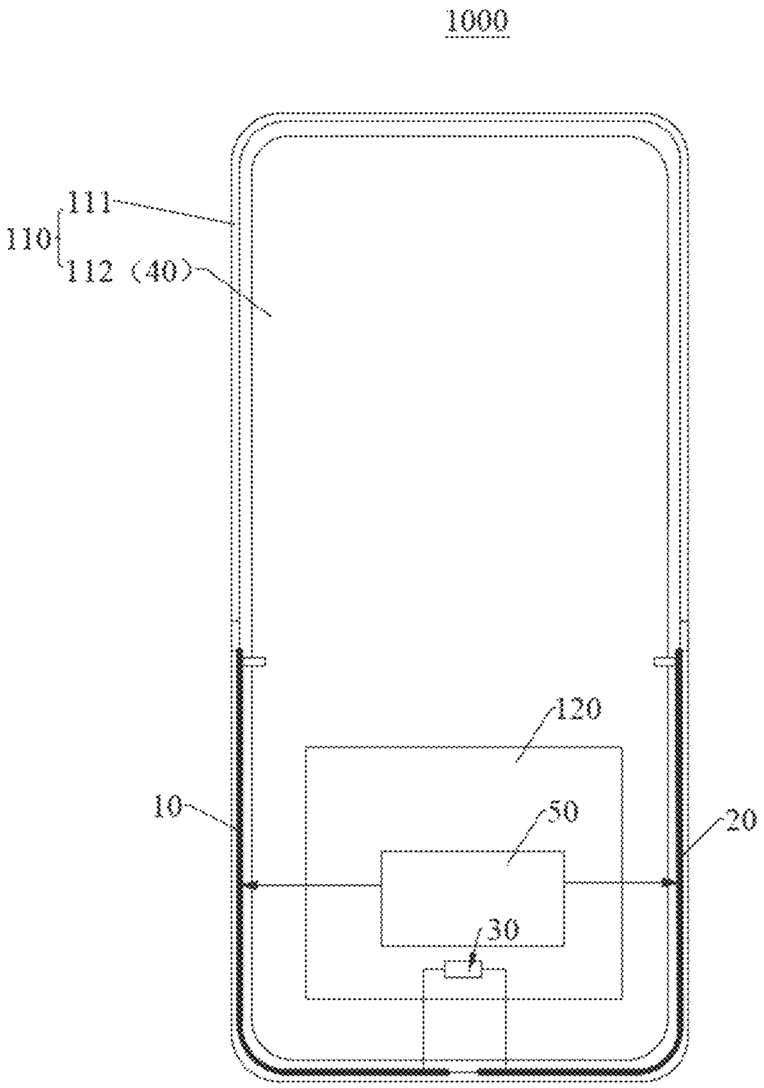
FIG. 5 is a schematic diagram of an internal structure of an electronic device according to another implementation of this application.

It may be understood that in some other implementations of this application, the frame 111 of the middle frame 110 may alternatively be made of another material, and the frame 111 may not be used as the first radiator 11 or the second radiator 21 of the antenna structure 100. Refer to FIG. 5. FIG. 5 is a schematic diagram of an internal structure of an electronic device 1000 according to another implementation of this application. In the implementation shown in FIG. 5, the frame 111 may be made of a non-conductive material. The frame 111 may be made of an insulating material. For example, the frame 111 is made of plastic or glass. The frame 111 may be used as an antenna support for installing the first radiator 11 and the second radiator 21 of the antenna structure 100, and the first radiator 11 and the second radiator 21 of the antenna structure 100 may be fixedly installed on an inner surface that is of the frame 111 and that faces accommodation space of the electronic device 1000.

Refer to FIG. 2 and FIG. 3 again. In an implementation of this application, the first radiator 11 and the second radiator 12 each include two opposite end portions. An end portion of a radiator (the first radiator 11 or the second radiator 21) is a part of the radiator that is connected to an end face of the radiator (for example, according to different lengths of the radiator, the end portion of the radiator may be a radiator whose length from the end face is within 5 mm, 2 mm, or 1 mm). The end face is a plane at two ends of the radiator. It should be noted that the plane described in this application is not a plane in a strict mathematical sense, and a specific deviation may be allowed. Two end portions of the first radiator 11 include at least one open end, and two end portions of the second radiator 21 also include at least one open end. An open end is an end portion at an ungrounded end of a radiator. In this implementation of this application, the "ungrounded end" means that there is no ground point or a coupled ground region on a radiator whose length from an end face at the end is ¼ wavelength. In this implementation, the open end is a radiator whose length from the end face is within 5 mm, 2 mm, or 1 mm at the ungrounded end. In an implementation of this application, the at least one open end of the first radiator 11 includes a first open end, and the at least one open end of the second radiator 21 includes a second open end. The first open end and the second open end are opposite and form a gap 13. As shown in FIG. 3, a size d of the gap 13 is a distance from an end face of the first open end of the first radiator 11 to an end face of the second open end of the second radiator 21. The decoupling circuit 30 is connected between the first open end and the second open end. For example, one end of the decoupling circuit 30 is connected to the end face of the first open end of the first radiator 11 or the first open end including the end face, and the other end of the decoupling circuit 30 is connected to the end face of the second open end of the second radiator 21 or the second open end including the end face. For another example, one end of the decoupling circuit 30 is connected to a location that is on the first radiator 11 and that is within 5 mm from the end face of the first open end, for example, a location within 2 mm or 1 mm. The other end of the decoupling circuit 30 is connected to a location that is on the second radiator 21 and that is within 5 mm from the end face of the second open end, for example, a location within 2 mm or 1 mm. In an implementation of this application, the decoupling circuit 30 may include an inductor 31 and a cable 32 that connects the inductor 31 to the first open end and the second open end. Alternatively, the decoupling circuit 30 may be an inductive decoupling circuit. The inductor 31 may be a lumped inductor or a distributed inductor. In an implementation of this application, the decoupling circuit 30 may be a band-stop decoupling circuit, and the decoupling circuit 30 can prevent coupling between an operating band generated by the first radiator 11 and an operating band generated by the second radiator 21. Therefore, isolation between the first antenna 10 and the second antenna 20 is improved.

In an implementation of this application, a difference between a resonant band of the first radiator 11 in a first operating mode and an operating band of the second radiator 21 in a second operating mode is less than 1 GHz. For example, the resonant band of the first operating mode is the same as the operating band of the second operating mode. An operating band of the first radiator 11 in the first operating mode and the operating band of the second radiator 21 in the second operating mode each may be any operating band of sub-6G. This is described in detail in a specific implementation of this application, and details are not described herein.

In an implementation of this application, the decoupling circuit 30 may be disposed on the mainboard 40. In some implementations, the cable 32 of the band-stop structure circuit 30 is disposed on the mainboard 40, and the inductor 31 is disposed (for example, bonded) on the mainboard 40 and is connected to the cable disposed on the mainboard 40. In some implementations, a spring 60 is fastened to each of the first open end of the first radiator 11 and the second open end of the second radiator 21, and the spring 60 is connected to the cable 32 on the mainboard 40. In this way, the first open end of the first radiator 11 and the second open end of the second radiator 21 are connected to the decoupling circuit 30. It may be understood that in another implementation of this application, the first open end of the first radiator 11 and the second open end of the second radiator 21 may be connected to the decoupling circuit 30 in another manner. Details are not described herein. It may be understood that the decoupling circuit 30 may alternatively be disposed on another substrate, for example, a printed circuit board (Printed Circuit Board, which may be referred to as a PCB) or a flexible printed circuit (Flexible Printed Circuit, which may be referred to as an FPC) that is separated from the mainboard. The substrate on which the decoupling circuit 30 is disposed may be electrically connected to the mainboard by using a flexible transmission line. Details are not described herein.

In this application, there is a gap 13 between the end face of the first open end and the end face of the second open end, and an equivalent capacitor may be formed between the end face of the first open end and the end face of the second open end. The decoupling circuit 30 is connected between the first open end and the second open end. The decoupling circuit 30 can form a band-stop filter with the equivalent capacitor formed between the end faces of the two open ends. The band-stop filter can prevent current coupling between the first antenna 10 and the second antenna 20, so that isolation between the first antenna 10 and the second antenna 20 is improved.

In an implementation of this application, an inductance value of the inductor 31 included in the decoupling circuit 30 or an inductance value of the inductive decoupling circuit may be considered as an equivalent inductance value of the decoupling circuit 30. When the gap 13 between the first radiator 11 of the first antenna 10 and the second radiator 21 of the second antenna 20 has different widths, an equivalent capacitance value between an endpoint of the first open end and an endpoint of the second open end has different values. The equivalent inductance value of the decoupling circuit 30 and the equivalent capacitance value between the open ends may be set based on operating bands of the first antenna 10 and the second antenna 20, to achieve relatively good isolation between the first antenna 10 and the second antenna 20 at operating frequencies of the first antenna 10 and the second antenna 20. In this implementation, the operating bands of the first antenna 10 and the second antenna 20 include any band in sub-6G. For example, the first antenna 10 and the second antenna 20 may operate in a low band (500 MHz to 1 GHz), and/or an intermediate band (1 GHz to 3 GHz), and/or a high band (3 GHz to 6 GHz). In an embodiment of this application, at least one operating band of the first antenna 10 and at least one operating band of the second antenna 20 are the same or have a difference less than 1 GHz. The decoupling circuit 30 is connected between the first open end and the second open end, so that isolation between the first antenna 10 and the second antenna 20 can be improved. "Same operating band" in this application may be understood as "same frequency". It should be understood that "same operating band" and "same frequency" mean that at least one operating band of the first antenna 10 enables the electronic device 1000 to support a first band, and at least one operating band of the second antenna 20 may also enable the electronic device 1000 to support the first band, but do not mean that the first antenna 10 and the second antenna 20 have at least one identical operating frequency range. In some implementations, a difference between the operating band of the first radiator 11 and the operating band of the second radiator 21 may be less than 1 GHz. For example, in some implementations, the difference between the operating band of the first radiator 11 and the operating band of the second radiator 21 may be 0.9 GHz, or may be 0.5 GHz. It should be understood that the difference between the operating band of the first radiator 11 and the operating band of the second radiator 21 is a difference between a center frequency of the operating band of the first radiator 11 and a center frequency of the operating band of the second radiator 21.

It should be noted that in an implementation of this application, when the operating band of the first radiator 11 is the same as the operating band of the second radiator 21, or the difference between the operating band of the first radiator 11 and the operating band of the second radiator 21 is relatively small, isolation between the first antenna 10 and the second antenna 20 is improved by using the decoupling circuit 30 connecting the first open end of the first radiator 11 to the second open end of the second radiator 21. The center frequency of the operating band of the first radiator 11 or the center frequency of the operating band of the second radiator 21 is a decoupling frequency of the antenna structure 100 in this application. It may be understood that in some implementations of this application, both the first radiator 11 and the second radiator 21 may have a plurality of operating bands. When the plurality of operating bands of the first radiator 11 and the second radiator 21 are the same or are close to each other, the antenna structure 100 may also have a plurality of decoupling frequencies.

Figure 6A:
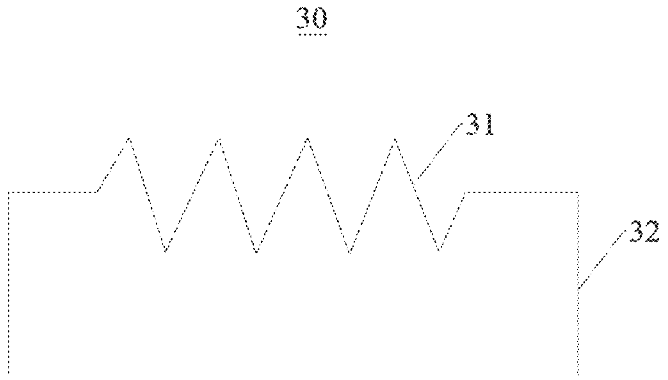
FIG. 6*a* is a schematic diagram of a structure of a decoupling circuit according to another implementation of this application.

In an implementation of this application, when the inductor 31 included in the decoupling circuit 30 is a lumped inductor, the lumped inductor may be a component represented by the inductor 30 in FIG. 3. When the inductor 31 included in the decoupling circuit 30 is a distributed inductor, the distributed inductor may be an inductor including a cable and/or a winding. For example, refer to FIG. 6*a*. FIG. 6*a* is a schematic diagram of a structure of a decoupling circuit 30 according to another implementation of this application. An inductor 31 included in the decoupling circuit 30 in the implementation shown in FIG. 6*a* represents a distributed inductor formed by winding a metal cable.

Figure 6B:
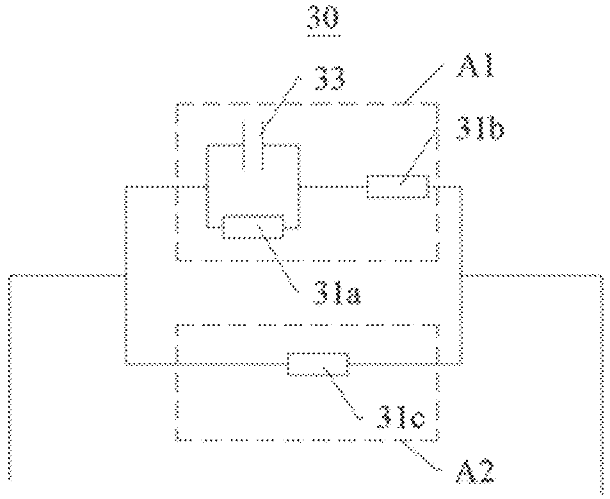
FIG. 6*b* is a schematic diagram of a structure of a decoupling circuit according to another implementation of this application.

In some implementations of this application, when the decoupling circuit 30 is an inductive decoupling circuit, the inductive decoupling circuit may be formed by connecting one or more inductors and one or more capacitors in parallel and/or in series. Refer to FIG. 6*b*. FIG. 6*b* is a schematic diagram of a structure of a decoupling circuit 30 according to another implementation of this application. The decoupling circuit 30 in the implementation shown in FIG. 6*b* is an inductive decoupling circuit, including a first branch A1 and a second branch A2 that are disposed in parallel. The first branch A1 is an inductive filter circuit. The second branch A2 includes a lumped inductor or a distributed inductor. An inductance value of the first branch A1 is different from an inductance value of the second branch A2. An inductance value of the decoupling circuit in a case that the decoupling frequency of the antenna structure 100 is greater than a threshold is different from an inductance value of the decoupling circuit in a case that the decoupling frequency of the antenna structure 100 is less than the threshold. Therefore, when an operating frequency of the antenna structure 100 (that is, an operating frequency of the first radiator 11 and the second radiator 21) changes, the inductance value of the decoupling circuit 30 connected between the first open end of the first radiator 11 and the second open end of the second radiator 21 can change correspondingly, to ensure that there is always relatively good isolation between the first antenna 10 and the second antenna 20. Specifically, in some implementations of this application, the decoupling circuit 30 includes three inductors and one capacitor 33. The three inductors are respectively a first inductor 3l a, a second inductor 31*b*, and a third inductor 31*c*. The first branch A1 includes the capacitor 33, the first inductor 31*aa*, and the second inductor 31*b*. The capacitor 33 is connected in parallel to the first inductor 31*a* and then is connected in series to the second inductor 31*b*. In this implementation, the first branch A1 formed by connecting the capacitor 33 in parallel to the first inductor 31*a* and then in series to the second inductor 31*b* is equivalent to a filter circuit. The second branch A2 includes the third inductor 31*c*, the second branch A2 and the first branch A1 are connected in parallel, and an equivalent inductance value of the filter circuit of the first branch A1 is different from an inductance value of the second branch A2. In addition, in this implementation, the equivalent inductance of the filter circuit is different from an inductance value of the third inductor 31*c*. When two ends of the decoupling circuit 30 in this implementation are respectively connected to the first open end of the first radiator 11 and the second open end of the second radiator 21, and the operating frequencies of the first radiator 11 and the second radiator 21 are within a threshold range (that is, when the decoupling frequency of the antenna structure 100 is less than a threshold), the filter circuit is equivalent to an open circuit. This is equivalent to connecting the third inductor 31*c* between the first open end of the first radiator 11 and the second open end of the second radiator 21. When the operating frequencies of the first radiator 11 and the second radiator 21 exceed the threshold range (that is, when the decoupling frequency of the antenna structure 100 is greater than the threshold), the filter circuit can allow a signal of the first radiator 11 to be transmitted to the second radiator 21. This is equivalent to that a value of the inductor connected between the first open end of the first radiator 11 and the second open end of the second radiator 21 is a value of the equivalent inductance of the filter circuit, to ensure that when the operating frequencies of the first radiator 11 and the second radiator 21 change, the inductance value of the decoupling circuit connected between the first open end of the first radiator 11 and the second open end of the second radiator 21 can change correspondingly, so as to ensure that there is always relatively good isolation between the first antenna 10 and the second antenna 20.

It should be noted that, in an implementation of this application, the operating frequency of the first antenna 10 is a frequency of a signal generated by resonance of the first radiator 11. Similarly, the operating frequency of the second antenna 20 is a frequency of a signal generated by resonance of the second radiator 21.

Figure 6C:
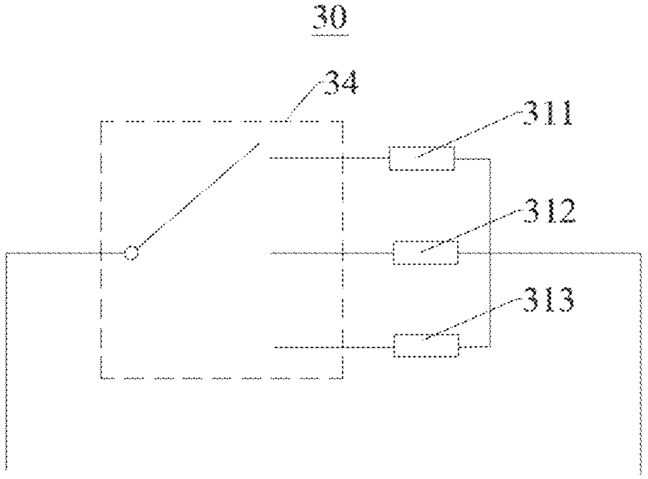
FIG. 6*c* is a schematic diagram of a structure of a decoupling circuit according to another implementation of this application.

Refer to FIG. 6*c*. FIG. 6*c* is a schematic diagram of a structure of a decoupling circuit 30 according to another implementation of this application. In an implementation of this application, the decoupling circuit 30 may alternatively include a plurality of inductors 311, 312, and 313 with different inductance values, and a switching switch 34. When the operating frequencies of the first radiator 11 and the second radiator 21 change, the switching switch 34 can be switched to connect to different inductors. Therefore, it is ensured that when the operating frequencies of the first radiator 11 and the second radiator 21 change, the first antenna 10 and the second antenna 20 can always have relatively good isolation. In this implementation, the decoupling circuit 30 includes three inductors with different inductance values, and the three inductors are disposed in parallel. The switching switch 34 is a single-pole three-throw switch, and can be switched to connect to any one of the three inductors according to a requirement.

Refer to FIG. 2 and FIG. 3 again. In the implementations shown in FIG. 2 and FIG. 3, two end portions included in the first radiator 11 are respectively a first end 111 and a second end 112, and two end portions included in the second radiator 21 are respectively a third end 211 and a fourth end 212. The second end 112 of the first radiator 11 is away from the second radiator 21 relative to the first end 111, and the fourth end 212 of the second radiator 21 is away from the first radiator 11 relative to the first end 111. In this implementation, the first radiator 11 and the second radiator 21 each have only one open end. The first end 111 is a first open end of the first radiator 11, the third end 211 is a second open end of the second radiator 21, the first end 111 is opposite to the third end 211, and there is a gap 13 between the first end 111 and the third end 211. The decoupling circuit 30 is connected to the first end 111 and the third end 211. Both the second end 112 and the fourth end 212 are connected to the ground 40, that is, both the second end 112 and the fourth end 212 are grounding ends. In this implementation, a spring 60 may be fastened on each of the second end 112 and the fourth end 212, and the spring 60 is connected to the ground 40. Alternatively, metal sheets are disposed (for example, bonded), so that the metal sheets connect the second end 112 to the ground 40, and connect the fourth end 212 to the ground 40. Alternatively, a protrusion portion at the second end 112 of the first radiator 11 and a protrusion portion at the fourth end 212 of the second radiator 12 are connected to the ground 40. It may be understood that in another implementation of this application, the second end 112 and the fourth end 212 may be connected to the ground 40 in another manner like metal wire bonding. In this implementation, the first radiator 11 and the second radiator 21 each include one open end and one grounding end. It may be understood that in another implementation of this application, the first radiator 11 may include two open ends, that is, both the first end 111 and the second end 112 may be open ends. The second radiator 21 may also include two open ends, that is, both the third end 211 and the fourth end 212 may be open ends.

In an implementation of this application, the first radiator 11 is of an "L"-shaped structure, the first radiator 11 of the "L"-shaped structure includes a first section and a second section, and the first section and the second section intersect in the "L"-shaped structure. The first section and the second section in the "L"-shaped structure are respectively located on two adjacent sides (for example, two adjacent edges) of the ground 40. Specifically, in an implementation of this application, the first section is located on a side of the first edge 41 and is spaced from the first edge 41, and the second section is located on a side of the second edge 42 and is spaced from the second edge 42. Compared with those in the solution in which both the first radiator 11 and the second radiator 21 are located on a same side of the ground 40, a ground current generated by the ground 40 under excitation of the first radiator 11 and a ground current generated by the ground 40 under excitation of the second radiator 11 are not reverse in a large area. Therefore, in this implementation, after the decoupling circuit 30 is connected between the first radiator 11 and the second radiator 21, when isolation between the first antenna 10 and the second antenna 20 is improved, performance of the first antenna 10 or the second antenna 20 is not greatly affected. Moreover, the first radiator 11 is of the "L"-shaped structure. Therefore, the ground current generated by the ground 40 under excitation of the first radiator 11 and the ground current generated by the ground 40 under excitation of the second radiator 21 can intersect at a specific angle, instead of exciting the ground 40 to respectively generate two opposite currents. Therefore, isolation between the first antenna 10 and the second antenna 20 can be further improved. In some implementations of this application, the angle at which the ground current generated by the ground 40 under excitation of the first radiator 11 and the ground current generated by the ground 40 under excitation of the second radiator 21 intersect is within a range of 60° to 120° (for example, orthogonal). Therefore, good isolation can be achieved between the first antenna 10 and the second antenna 20. In addition, in this implementation of this application, radiation patterns of the first antenna 10 and the second antenna 20 can be complementary. Therefore, an envelope correlation coefficient (ECC) between the first antenna 10 and the second antenna 20 can be relatively small.

In an implementation, the first radiator 11 and the second radiator 21 each are of an "L"-shaped structure. The first radiator 11 includes a first section 11*a* and a second section 11*b* that intersect, and the second radiator 21 includes a third section 21*a* and a fourth section 21*b* that intersect. In this implementation, an end that is of the first section 11*a* and that is away from the second section 11*b* is the first end 111, and an end that is of the second section 11*b* and that is away from the first section 11*a* is the second end 112. An end that is of the third section 21*a* and that is away from the fourth section 21*b* is the third end 211, and an end that is of the fourth section 21*b* and that is away from the third section 21*a* is the fourth end 212. In this implementation, both the first section 11*a* and the third section 21*a* are located on a side of the first edge 41 of the ground 40, the second section

11*b* is located on a side of the second edge 42 of the ground 40, and the fourth section 21*b* is located on a side of the third edge 43 of the ground 40.

Figure 7:
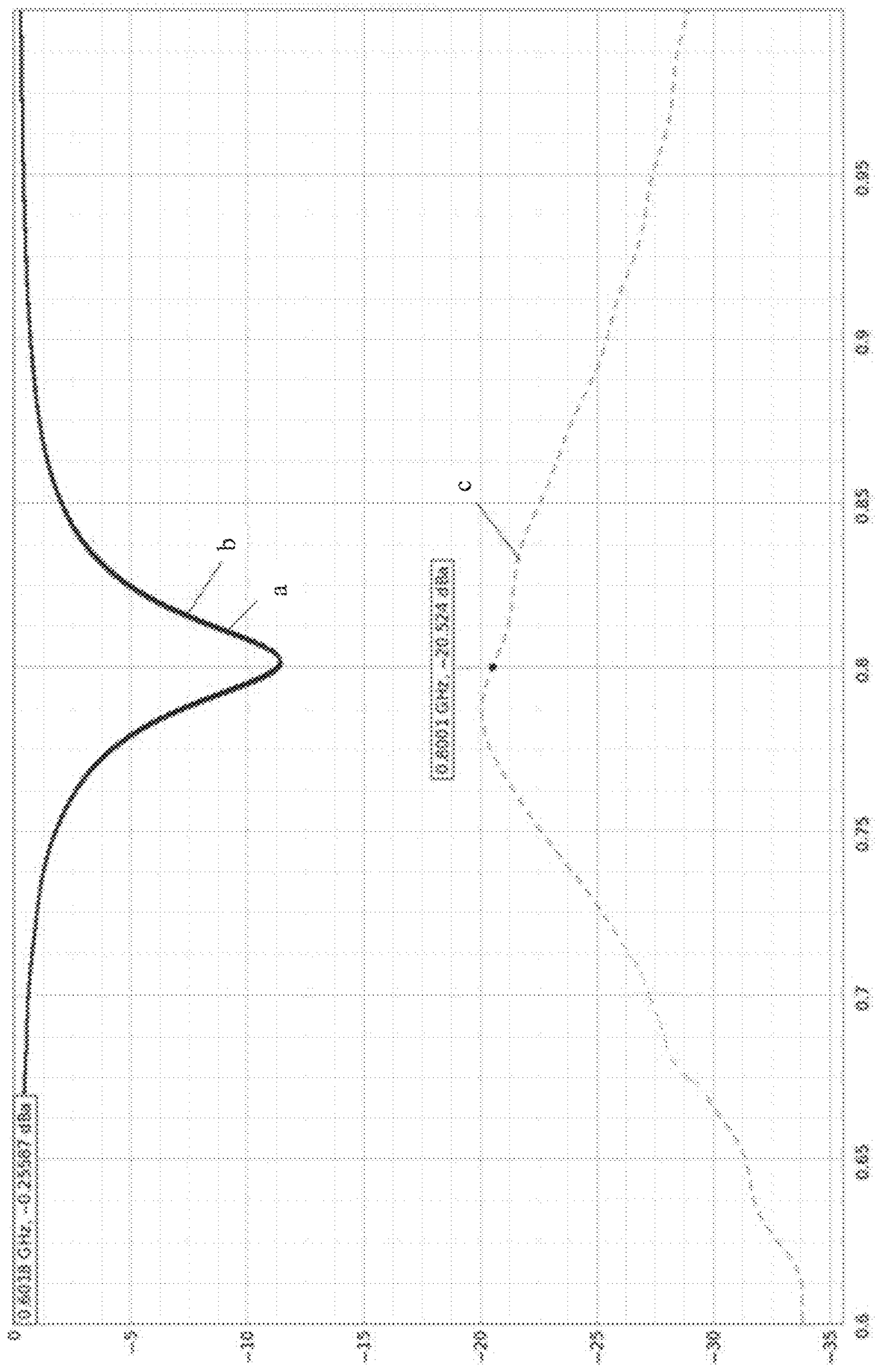
FIG. 7 is a return loss curve diagram and an isolation curve diagram of the antenna structure in the implementation shown in FIG. 3.

Continue to refer to FIG. 3. An arrow in FIG. 3 shows a pattern of a current generated when the antenna structure 100 according to an implementation of this application operates. An arrow a shows an equivalent current direction of the ground current generated by the ground 40 under excitation of the first radiator 11, and an arrow b shows an equivalent current direction of the ground current generated by the ground 40 under excitation of the second radiator 21. The equivalent current direction a of the ground current generated by the ground 40 under excitation of the first radiator 11 and the equivalent current direction b of the ground current generated by the ground 40 under excitation of the second radiator 21 intersect at a specific angle, for example, 600 to 120°; for example, 80° to 10°; or for example, 90°. Therefore, there can be relatively good isolation between the first antenna 10 and the second antenna 20. Specifically, refer to FIG. 7. FIG. 7 is a return loss curve diagram and an isolation curve diagram of the antenna structure 100 in the implementation shown in FIG. 3. A curve a is a return loss curve of the first antenna 10, and a curve b is a return loss curve of the second antenna 20. Abscissas of the curve a and the curve b represent frequency, and a unit is GHz. Ordinates of the curve a and the curve b represent return loss coefficient, and a unit is dB. A curve c is an isolation curve between the first antenna 10 and the second antenna 20. An abscissa represents frequency, and a unit is GHz. An ordinate represents isolation coefficient, and a unit is dB. In this implementation, a structure of the first radiator 11 is basically the same as that of the second radiator 21, and the first radiator 11 and the second radiator 21 are symmetrically disposed on two sides of the ground 40. Therefore, operating bands of the first antenna 10 and the second antenna 20 are basically the same. In this implementation, a length of the first edge 41 of the ground 40 is about 80 mm. To make both the first radiator 11 and the second radiator 21 have an "L"-shaped structure, the first section 11*a* of the first radiator 11 and the third section 21*a* of the second radiator 21 are located on the side of the first edge 41 of the ground 40, the second section 11*b* of the first radiator 11 is located on the side of the second edge 42 of the ground 40, and the fourth section 21*b* of the second radiator 21 is located on the side of the third edge 43 of the ground 40. Radiation apertures of the first radiator 11 and the second radiator 21 are relatively large. In this implementation, operating frequencies of resonance-generated signals of the first radiator 11 and the second radiator 21 are low frequencies in sub-6G. In this implementation, center operating frequencies of both the first radiator 11 and the second radiator 21 are about 0.8 GHz. In this implementation, 0.8 GHz is the decoupling frequency of the antenna structure 100 in this application. That is, the decoupling circuit 30 can prevent coupling between an antenna pattern that is generated by the first radiator 11 and whose operating frequency is about 0.8 GHz and an antenna pattern that is generated by the second radiator 21 and whose operating band is about 0.8 GHz, so that isolation between the first antenna 10 and the second antenna 20 is improved. In this implementation, the first antenna 10 and the second antenna 20 can be used as multiple-input multiple-output (Multiple-input Multiple-Output, MIMO) antennas of the electronic device 1000, and the electronic device 1000 can perform MIMO transmission of a signal. It may be understood that in another implementation of this application, a size of the ground 40 may change, and sizes, grounding locations, and the like of the first radiator 11 and the second radiator 21 may also change. The operating frequency of the first radiator 11 may be the same as or different from the operating frequency of the second radiator 21. The radiation apertures of the first radiator 11 and the second radiator 21 may also change according to an actual requirement. Therefore, an operating frequency of a signal generated by resonance of the first radiator 11 and the second radiator 21 may be an intermediate frequency or a high frequency in sub-6G.

In this implementation, isolation between the first antenna 10 and the second antenna 20 at the center operating frequency is about −15 dB, that is, the first antenna 10 and the second antenna 20 can have a same operating band, and the first antenna 10 and the second antenna 20 can have good isolation.

In this implementation, both the first section 11*a* of the first radiator 11 and the third section 21*a* of the second radiator 21 are located on the side of the first edge 41 of the ground 40, the second section 11*b* of the first radiator 11 is located on the side of the second edge 42 of the ground 40, and the fourth section 21*b* of the second radiator 21 is located on the side of the third edge 43 of the ground 40. Compared with those in the solution in which both the first radiator 11 and the second radiator 21 are located on one side of the ground 40, the first radiator 11 and the second radiator 21 can not only excite the ground 40 to generate horizontal current modes, but also can excite the ground 40 to generate longitudinal current modes, and the longitudinal current modes generated by the ground 40 under excitation of the first radiator 11 and the second radiator 21 are in a same direction, so that performance of the first antenna 10 and the second antenna 20 can be improved. Because the first radiator 11 and the second radiator 21 can not only excite the ground 40 to generate the horizontal current modes in opposite directions, but also can excite the ground 40 to generate the longitudinal current modes in the same direction, after the decoupling circuit 30 is connected between the first open end of the first radiator 11 and the second open end of the second radiator 21, a ground current can still be fully excited, so that antenna efficiency of the first antenna 10 and the second antenna 20 does not deteriorate seriously. In an implementation of this application, when the decoupling circuit 30 is connected between the first open end of the first radiator 11 and the second open end of the second radiator 21 to improve isolation between the first antenna 10 and the second antenna 20, the antenna efficiency of the first antenna 10 and the second antenna 20 does not deteriorate seriously. In this implementation of this application, because the radiation pattern of the first antenna 10 and the radiation pattern of the second antenna 20 are complementary, an envelope correlation coefficient (ECC) between the first antenna 10 and the second antenna 20 in this implementation of this application is better than that in the solution in which both the first radiator 11 and the second radiator 21 are located on one side of the ground 40.

Figure 8:
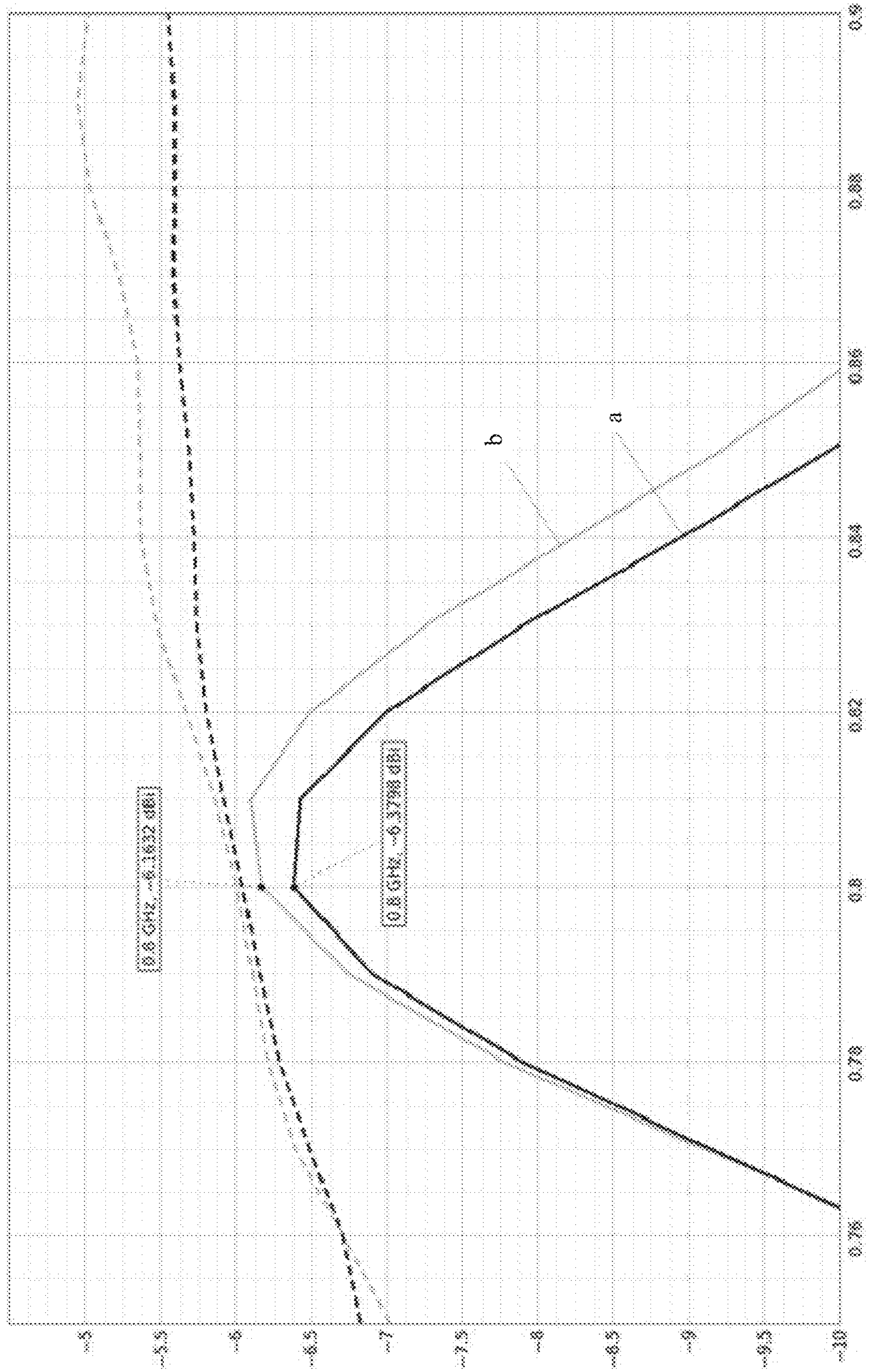
FIG. 8 is a diagram of comparison between efficiency of a first antenna during operating of the antenna structure in the implementation shown in FIG. 3 and efficiency of the first antenna during separate operating of the first antenna.
Figure 9:
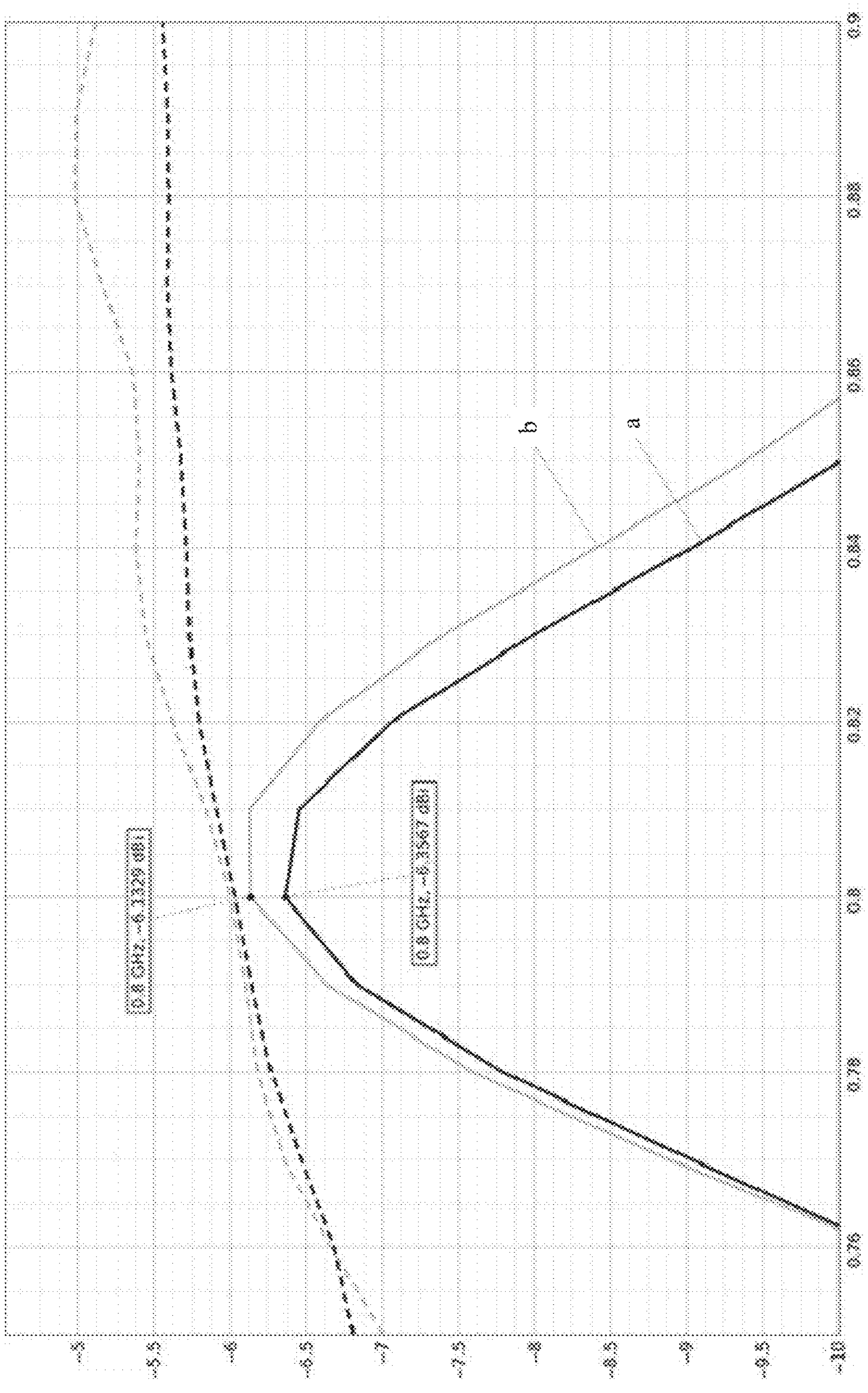
FIG. 9 is a diagram of comparison between efficiency of a second antenna during operating of the antenna structure in the implementation shown in FIG. 3 and efficiency of the second antenna during separate operating of the second antenna.

Specifically, refer to FIG. 8. FIG. 8 is a diagram of comparison between efficiency of the first antenna 10 during operating of the antenna structure 100 in the implementation shown in FIG. 3 and efficiency of the first antenna 10 during separate operating of the first antenna 10. An abscissa in FIG. 8 represents frequency, and a unit is GHz. An ordinate represents efficiency, and a unit is dBi. A curve a in FIG. 8 is an efficiency curve of the first antenna 10 of the antenna structure 100 in this implementation, and a curve b in FIG. 8 is a curve when the first antenna 10 separately operates. The antenna efficiency of the first antenna 10 of the antenna structure 100 in this implementation is reduced by about 0.2 dB compared with the antenna efficiency during separate operating of the first antenna 10. In other words, in this implementation, after the decoupling circuit 30 is connected between the first antenna 10 and the second antenna 20, the antenna operating efficiency of the first antenna 10 decreases by about 0.2 dB. Compared with that in the solution in which both the first radiator 11 and the second radiator 21 are located on one side of the ground 40, in this implementation, after the decoupling circuit 30 is connected between the first antenna 10 and the second antenna 20, the operating efficiency of the first antenna 10 decreases to a relatively small extent. Refer to FIG. 9. FIG. 9 is a diagram of comparison between efficiency of the second antenna 20 during operating of the antenna structure 100 in the implementation shown in FIG. 3 and efficiency of the second antenna 20 during separate operating of the second antenna 20. An abscissa in FIG. 9 represents frequency, and a unit is GHz. An ordinate represents efficiency, and a unit is dBi. A curve a in FIG. 9 is an efficiency curve of the second antenna 20 of the antenna structure 100 in this implementation, and a curve b in FIG. 9 is a curve when the second antenna 20 separately operates. The antenna efficiency of the second antenna 20 of the antenna structure 100 in this implementation is reduced by about 0.2 dB compared with the antenna efficiency during separate operating of the second antenna 20. In other words, in this implementation, after the decoupling circuit 30 is connected between the first antenna 10 and the second antenna 20, the antenna operating efficiency of both the first antenna 10 and the second antenna 20 decreases by about 0.2 dB. Compared with that in the solution in which both the first radiator 11 and the second radiator 21 are located on one side of the ground 40, in this implementation, after the decoupling circuit 30 is connected between the first antenna 10 and the second antenna 20, the operating efficiency of both the first antenna 10 and the second antenna 20 decreases to a relatively small extent. That is, in this implementation, the decoupling circuit 30 is connected between the first antenna 10 and the second antenna 20, so that isolation between the first antenna 10 and the second antenna 20 can be improved, and great impact on the operating efficiency of the first antenna 10 and the second antenna 20 can be avoided.

Figure 10:
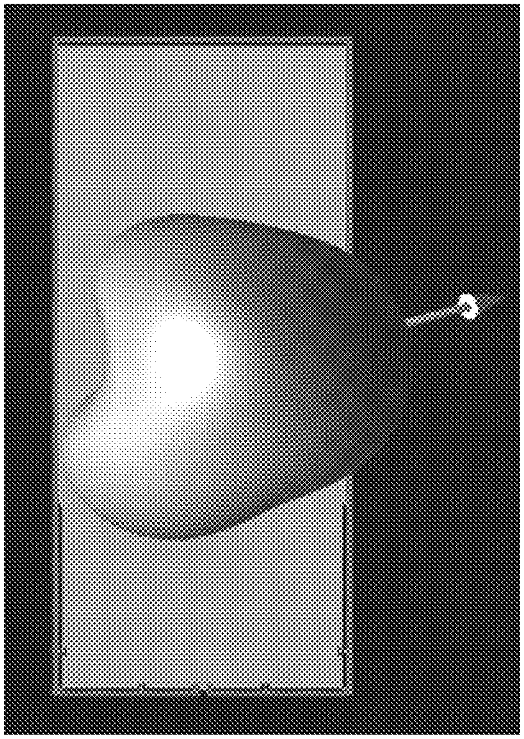
FIG. 10 is a radiation pattern of a first antenna of the antenna structure in the implementation shown in FIG. 3.
Figure 11:
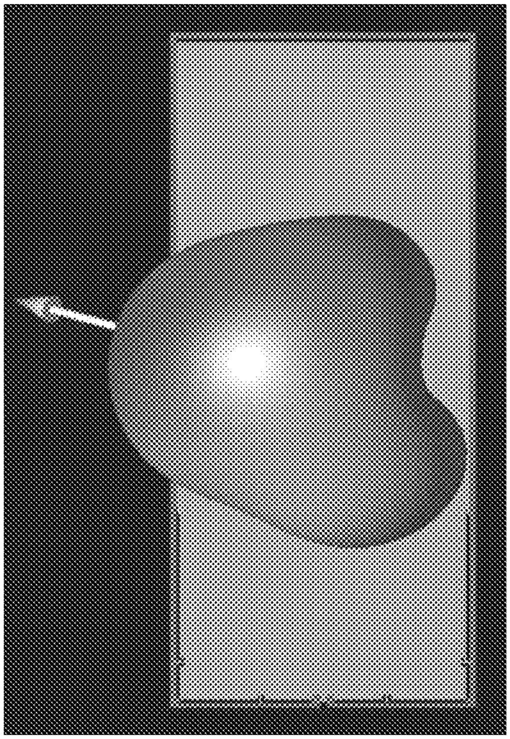
FIG. 11 is a radiation pattern of a second antenna of the antenna structure in the implementation shown in FIG. 3.

Refer to FIG. 10 and FIG. 11. FIG. 10 is a radiation pattern of the first antenna 10 of the antenna structure 100 in the implementation shown in FIG. 3, and FIG. 11 is a radiation pattern of the second antenna 20 of the antenna structure 100 in the implementation shown in FIG. 3. In this implementation, the radiation patterns of the first antenna 10 and the second antenna 20 are complementary. Therefore, an envelope correlation coefficient (envelope correlation coefficient, ECC) between the first antenna 10 and the second antenna 20 in this implementation can be relatively good, and the ECC is about 0.06.

Figure 12:
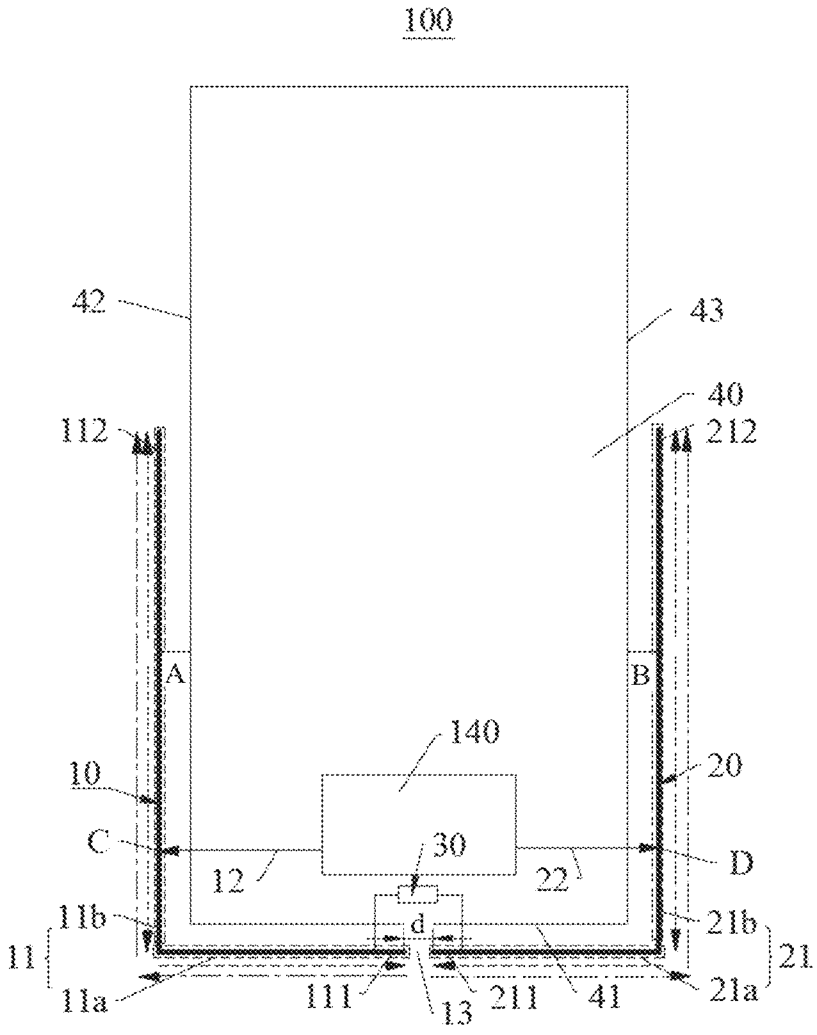
FIG. 12 is a schematic diagram of a topology structure of an antenna structure according to another implementation of this application.

Refer to FIG. 12. FIG. 12 is a schematic diagram of a topology structure of an antenna structure 100 according to another implementation of this application. In this implementation, a difference between the antenna structure 100 and the antenna structure 100 shown in FIG. 3 lies in that in this implementation, two end portions of each of the first radiator 11 and the second radiator 21 of the antenna structure 100 are open ends. Two open ends included in the first radiator 11 are a first open end and a third open end, and two open ends included in the second radiator 21 are a second open end and a fourth open end. Specifically, in this implementation, the first end 111 of the first radiator 11 is the first open end, and the second end 112 is the third open end. The third end 211 of the second radiator 21 is the second open end, and the fourth end 212 is the fourth open end. In other words, in this implementation, neither the first end 111 nor the second end 112 of the first radiator 11 is connected to the ground 40, and neither the third end 211 nor the fourth end 212 of the second radiator 21 is connected to the ground 40. For definitions of the open end, the first end 111, the second end 112, the third end 211, the fourth end 212, and the end face, refer to the foregoing embodiments. Details are not described herein again. In this implementation, the decoupling circuit 30 is connected between the first open end and the second open end, that is, the decoupling circuit 30 is connected to the first end 111 of the first radiator 11 and the third end 211 of the second radiator 21. In this implementation, there is a first ground point A between the first end 111 and the second end 112 of the first radiator 11, and there is a second ground point B between the third end 211 and the fourth end 212 of the second radiator 21. The first ground point A and the second ground point B are connected to the ground 40. In other words, a location of a ground point of the first radiator 11 in this implementation is between the first end 111 and the second end 112, and a location of a ground point of the second radiator 21 is between the third end 211 and the fourth end 212.

In this implementation, resonance in a ¼ wavelength mode can be generated in a section between the first ground point A of the first radiator 11 and an end face that is of the first radiator 11 and that is close to the first end 111, and the first radiator 11 can generate resonance in a ½ wavelength mode in a section between the end face close to the first end 111 and an end face close to the second end 112. In other words, the first radiator 11 in this implementation can generate resonant signals having wavelengths in two different modes. Refer to FIG. 12. A direction of a dashed line arrow near the first radiator 11 in FIG. 12 indicates a schematic direction of a current when the first radiator 11 operates and generates resonance in a ¼ wavelength mode. A direction of a dash-dot line arrow indicates a schematic direction of a current when the first radiator 11 operates and generates resonance in a ½ wavelength mode. In this implementation, the second radiator 21 and the first radiator 11 are of a symmetrical structure disposed on two sides of the ground 40. The resonance in the ¼ wavelength mode can be generated in a section between the second ground point B of the second radiator 21 and an end face that is of the second radiator 21 and that is close to the third end 211. In addition, a resonance band in the ¼ wavelength mode generated by the second radiator 21 is basically the same as a resonance band in the ¼ wavelength mode generated by the first radiator 11. Moreover, the resonance in the ½ wavelength mode can be generated in a section between the end face close to the third end 211 and an end face close to the fourth end 212 that are of the second radiator 21 in this implementation. In addition, a resonance frequency in the ½ wavelength mode generated by the second radiator 21 is basically the same as a resonance frequency in the ½ wavelength mode generated by the first radiator 11. In other words, both the first antenna 10 and the second antenna 20 in this implementation can form in-band double resonance, and both the first antenna 10 and the second antenna 20 can generate resonance with basically the same operating frequencies in the ¼ wavelength mode and resonance with basically the same operating frequencies in the ½ wavelength mode. In this way, bandwidth and efficiency during operating of the antenna of the antenna structure 100 in this implementation are improved. Refer to FIG. 12. A direction of a dashed line arrow near the second radiator 12 in FIG. 12 indicates a schematic direction of a current when the first radiator 11 operates and generates resonance in a ¼ wavelength mode. A direction of a dash-dot line arrow indicates a schematic direction of a current when the second radiator 12 operates and generates resonance in a ½ wavelength mode. In embodiments of this application, that the first radiator 11 and the second radiator 21 are of a "symmetrical structure" means that the first radiator 11 and the second radiator 21 can be basically symmetrical along a virtual symmetry axis, and "basically symmetrical" means that a specific angular error and/or a size error are/is allowed, but does not mean absolute symmetry in a strict mathematical sense. It may be understood that in another implementation of this application, the first radiator 11 and the second radiator 21 may alternatively be of an asymmetric structure. A structure of the first radiator 11 or the second radiator 21 is adjusted, a tuning element is added, or locations of the first ground point A and the second ground point B are changed, so that the first radiator 11 and the second radiator 21 can generate different resonance modes. Alternatively, adjusting structures of the first radiator 11 and the second radiator 21, adding a tuning element, or changing the locations of the first ground point A and the second ground point B can enable the first radiator 11 and the second radiator 21 to generate two other types of same resonance modes, to implement in-band double resonance between the first antenna 10 and the second antenna 20.

In an implementation, a distance between the first open end of the first radiator 11 and the second open end of the second radiator 21 is about 20 mm, an inductance value of the decoupling circuit 30 is about 65 nH, and relatively good isolation effect is achieved between the first antenna 10 and the second antenna 20.

Figure 13:
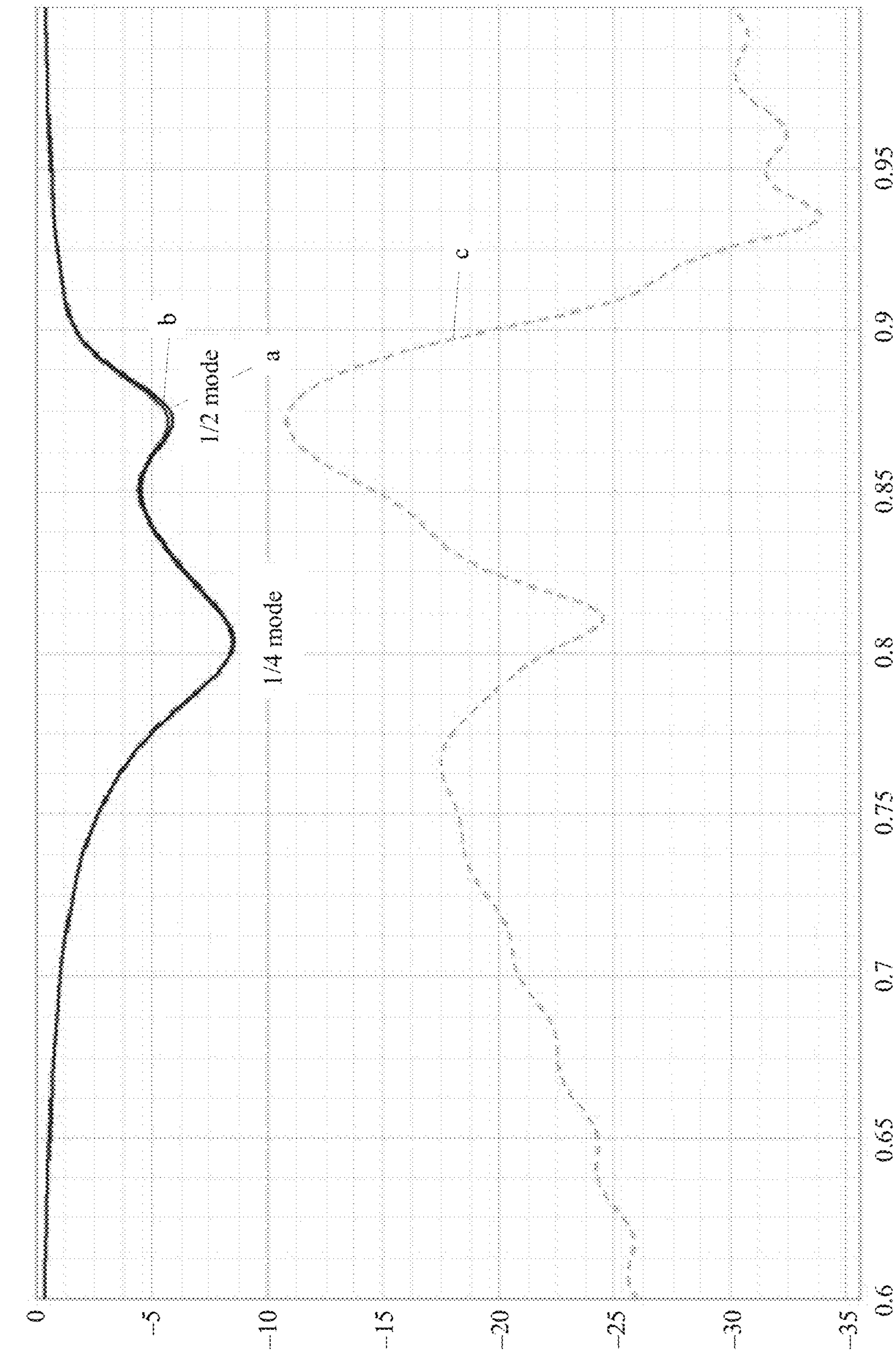
FIG. 13 is a return loss curve diagram and an isolation curve diagram of the antenna structure in the implementation shown in FIG. 12.

In an implementation, both the first antenna 10 and the second antenna 20 have two resonance modes, to form in-band double resonance. Refer to FIG. 13. FIG. 13 is a return loss curve diagram and an isolation curve diagram of the antenna structure 100 in the implementation shown in FIG. 12. A curve a is a return loss curve of the first antenna 10, and a curve b is a return loss curve of the second antenna 20. Abscissas of the curve a and the curve b represent frequency, and a unit is GHz. Ordinates of the curve a and the curve b represent return loss coefficient, and a unit is dB. A curve c is an isolation curve between the first antenna 10 and the second antenna 20. An abscissa represents frequency, and a unit is GHz. An ordinate represents isolation coefficient, and a unit is dB. It can be learned from FIG. 13 that in this implementation, an operating band of the first antenna 10 in the ¼ wavelength mode is basically the same as an operating band of the second antenna 20 in the ¼ wavelength mode, and center operating frequencies are about 0.81 GHz; and an operating band of the first antenna 10 in the ½ wavelength mode is basically the same as an operating band of the second antenna 20 in the ½ wavelength mode, and center operating frequencies are about 0.87 GHz.

In this implementation, isolation generated by the first antenna 10 and the second antenna 20 in the ¼ wavelength mode at the center operating frequency is about −22 dB, and isolation generated by the first antenna 10 and the second antenna 20 in the ½ wavelength mode at the center operating frequency is about −11 dB. That is, isolation between the first antenna 10 and the second antenna 20 is relatively good in both the ¼ wavelength mode and the ½ wavelength mode.

In this implementation, both the first antenna 10 and the second antenna 20 have two operating modes: the ¼ wavelength mode and the ½ wavelength mode. It may be understood that in another implementation of this application, the operating modes of the first antenna 10 and the second antenna 20 may alternatively be other operating modes. For example, in some implementations, the operating modes of the first antenna 10 and the second antenna 20 may alternatively be a ¾ wavelength mode, a composite right/left handed antenna mode (CRLH antenna mode), or the like. In addition, in some other implementations of this application, structures of the first antenna 10 and the second antenna 20 are adjusted, so that the first antenna 10 and the second antenna 20 can generate more operating modes. For example, in some implementations, the first antenna 10 and the second antenna 20 can generate three operating modes.

Figure 14:
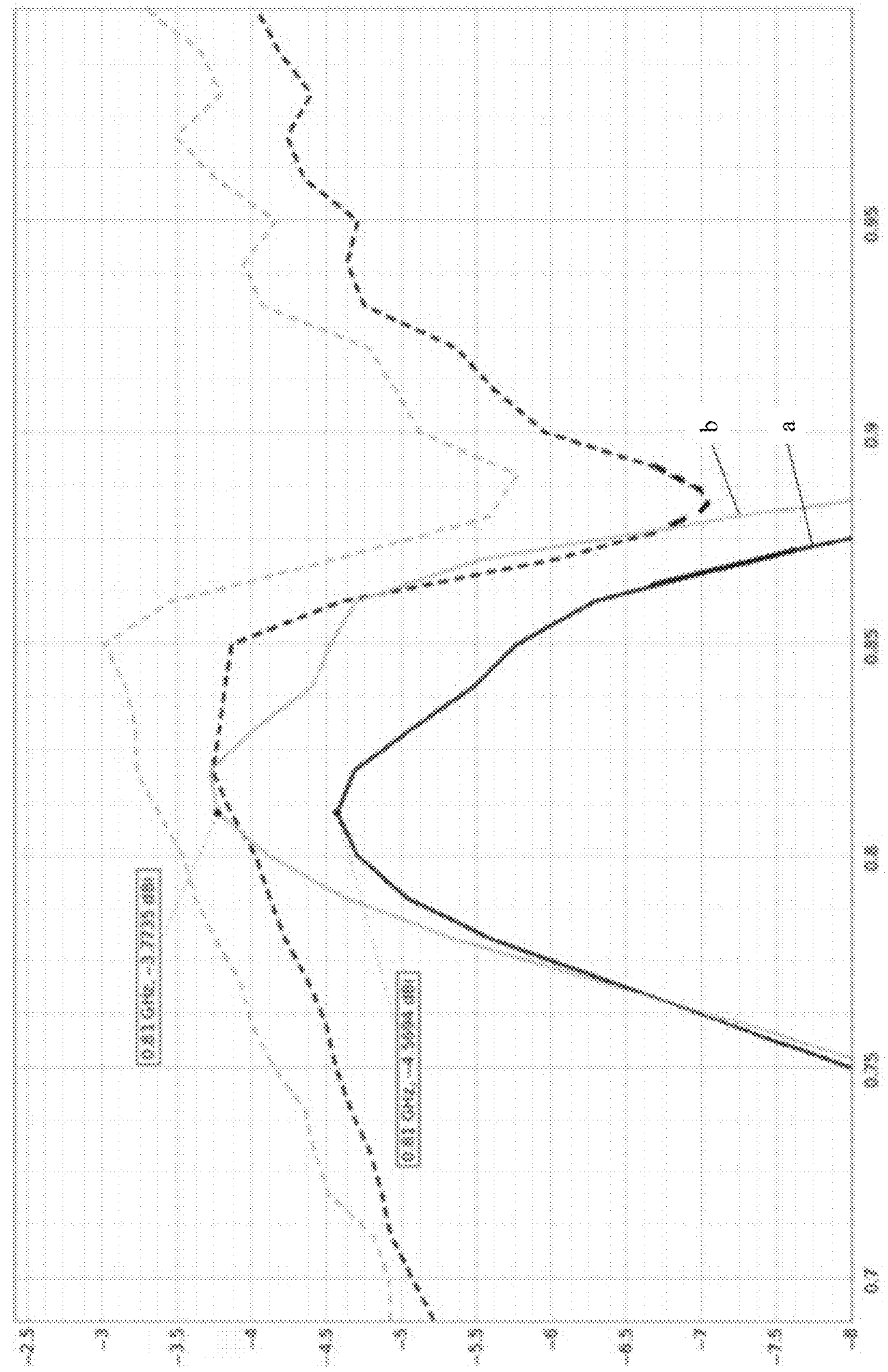
FIG. 14 is a diagram of comparison between antenna efficiency of a first antenna during operating of the antenna structure shown in FIG. 12 and antenna efficiency of the first antenna during separate operating of the first antenna.

Refer to FIG. 14. FIG. 14 is a diagram of comparison between antenna efficiency of the first antenna 10 during operating of the antenna structure 100 shown in FIG. 12 and antenna efficiency of the first antenna 10 during separate operating of the first antenna 10. An abscissa in FIG. 14 represents frequency, and a unit is GHz. An ordinate represents efficiency, and a unit is dBi. A curve a in FIG. 14 is an efficiency curve of the first antenna 10 of the antenna structure 100 shown in FIG. 12, and a curve b in FIG. 14 is a curve when the first antenna 10 separately operates. The antenna efficiency of the first antenna 10 of the antenna structure 100 in the ¼ wavelength mode in this implementation is reduced by about 0.8 dB compared with the antenna efficiency in the ¼ wavelength mode during separate operating of the first antenna 10. In other words, in this implementation, after the decoupling circuit 30 is connected between the first antenna 10 and the second antenna 20, the antenna operating efficiency of the first antenna 10 decreases by about 0.8 dB. Compared with that in the solution in which both the first radiator 11 and the second radiator 21 are located on one side of the ground 40, in this implementation, after the decoupling circuit 30 is connected between the first antenna 10 and the second antenna 20, the operating efficiency of the first antenna 10 decreases to a relatively small extent. Similarly, in this implementation, after the decoupling circuit 30 is connected between the first antenna 10 and the second antenna 20, operating efficiency of the second antenna 20 decreases to a relatively small extent. That is, in this implementation, the decoupling circuit 30 is connected between the first antenna 10 and the second antenna 20, so that isolation between the first antenna 10 and the second antenna 20 can be improved, and great impact on the operating efficiency of the first antenna 10 and the second antenna 20 can be avoided.

Figure 15:
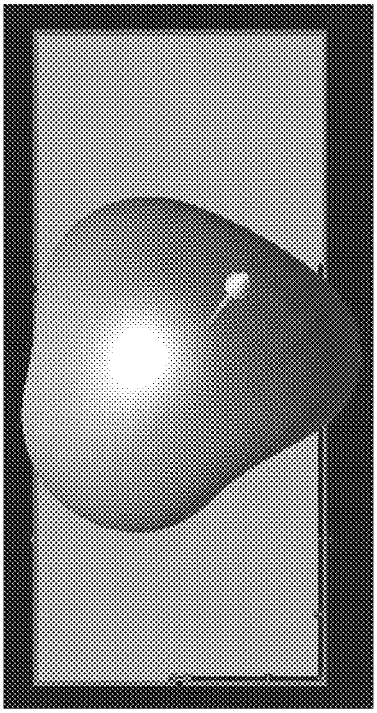
FIG. 15 is a radiation pattern in a case that an operating mode of a first antenna of the antenna structure shown in FIG. 12 is a ¼ wavelength mode.
Figure 16:
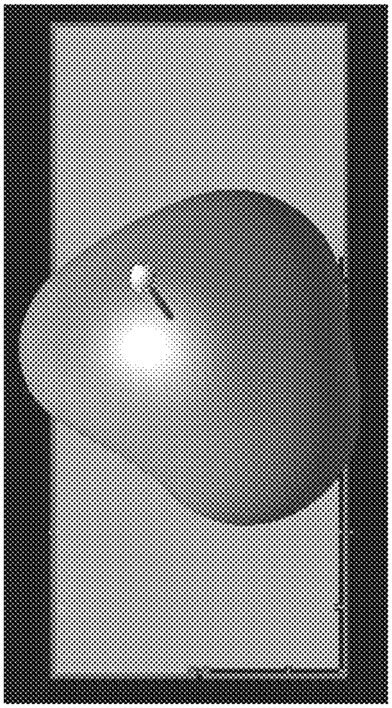
FIG. 16 is a radiation pattern in a case that an operating mode of a second antenna of the antenna structure shown in FIG. 12 is a ¼ wavelength mode.

Refer to FIG. 15 and FIG. 16. FIG. 15 shows a radiation pattern when an operating mode of the first antenna 10 of the antenna structure 100 shown in FIG. 12 is the ¼ wavelength mode. FIG. 16 shows a radiation pattern when an operating mode of the second antenna 20 of the antenna structure 100 shown in FIG. 12 is the ¼ wavelength mode. In this implementation, the radiation pattern of a radiation region of the first antenna 10 in the ¼ wavelength mode is complementary to the radiation pattern of a radiation region of the second antenna 20 in the ¼ wavelength mode. Therefore, an envelope correlation coefficient (envelope correlation coefficient, ECC) between the first antenna 10 and the second antenna 20 in this implementation can be relatively small, and the ECC is about 0.001.

Figure 17:
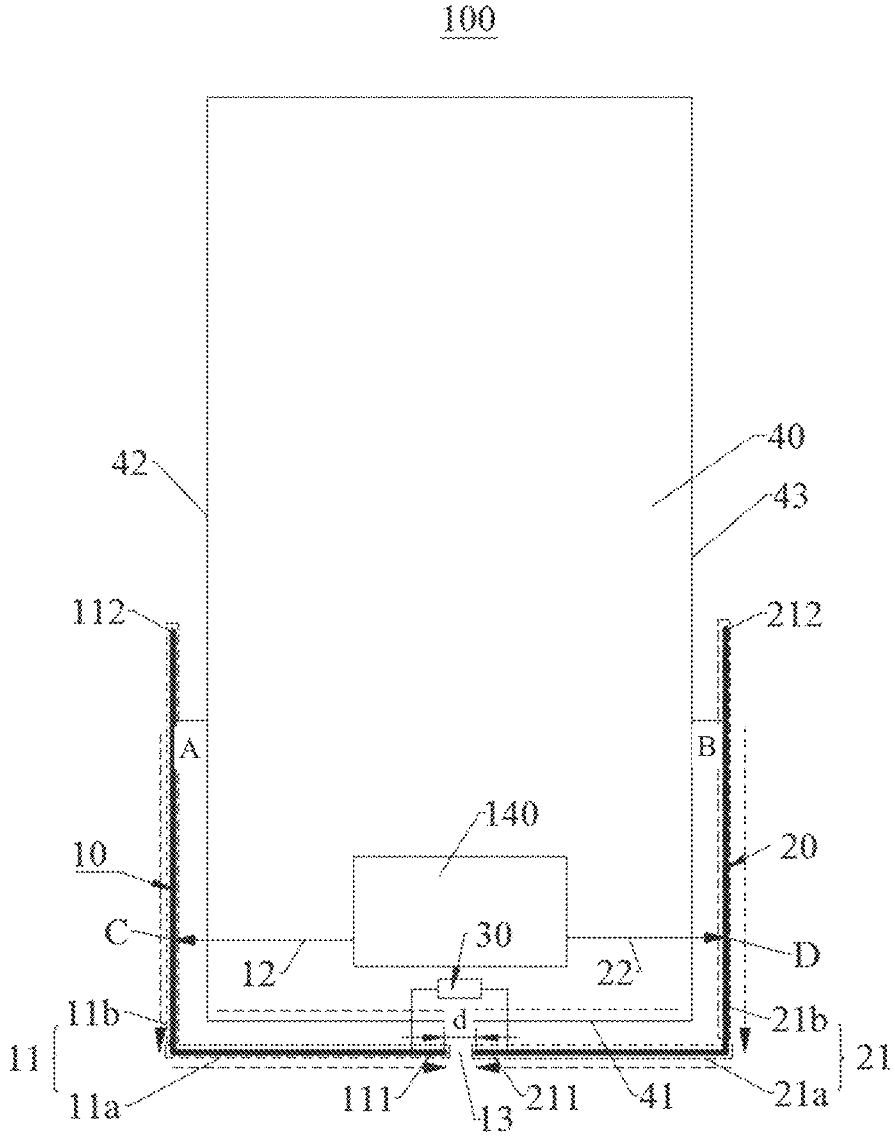
FIG. 17 is a schematic diagram of a topology structure of an antenna structure according to another implementation of this application.

Refer to FIG. 17. FIG. 17 is a schematic diagram of a topology structure of an antenna structure 100 according to another implementation of this application. In this implementation, a difference between the antenna structure 100 and the antenna structure 100 shown in FIG. 12 lies in that in this implementation, a distance between an end face that is of the first radiator 11 and that is close to the second end 112 and the first ground point A is less than the distance between the end face that is of the first radiator 11 and that is close to the second end 112 and the first ground point A in the implementation shown in FIG. 12. In addition, in this implementation, no other resonance mode is generated between the end face that is of the first radiator 11 and that is close to the second end 112 and the end face that is of the first radiator 11 and that is close to the first end 111, that is, the first radiator 11 in this implementation can generate resonance in only the ¼ wavelength mode. The resonance in the ¼ wavelength mode is resonance generated in a section between the first ground point A of the first radiator 11 and the end face that is of the first radiator 11 and that is close to the first end 111. Similarly, in this implementation, a distance between an end face that is of the second radiator 21 and that is close to the second end 212 and the second ground point B is less than the distance between the end face that is of the second radiator 21 and that is close to the second end 212 and the second ground point B in the implementation shown in FIG. 12. No other resonance mode is generated between the end face that is of the second radiator 21 and that is close to the third end 211 and the end face that is of the second radiator 21 and that is close to the fourth end 212, that is, the second radiator 21 in this implementation can generate resonance in only the ¼ wavelength mode. The resonance in the ¼ wavelength mode is resonance generated in a section between the second ground point B of the second radiator 21 and the end face that is of the second radiator 21 and that is close to the third end 211. In other words, in this implementation, two end portions of each of the first radiator 11 and the second radiator 21 are open ends, but both the first radiator 11 and the second radiator 21 in this implementation can generate resonance in only one wavelength mode. For definitions of the open end, the first end 111, the second end 112, the third end 113, the fourth end 114, and the end face, refer to the foregoing embodiments. Details are not described herein again.

In an implementation, a distance between the first open end of the first radiator 11 and the second open end of the second radiator 21 is about 20 mm, an inductance value of the decoupling circuit 30 is about 70 nH, and relatively good isolation effect is achieved between the first antenna 10 and the second antenna 20.

Figure 18:
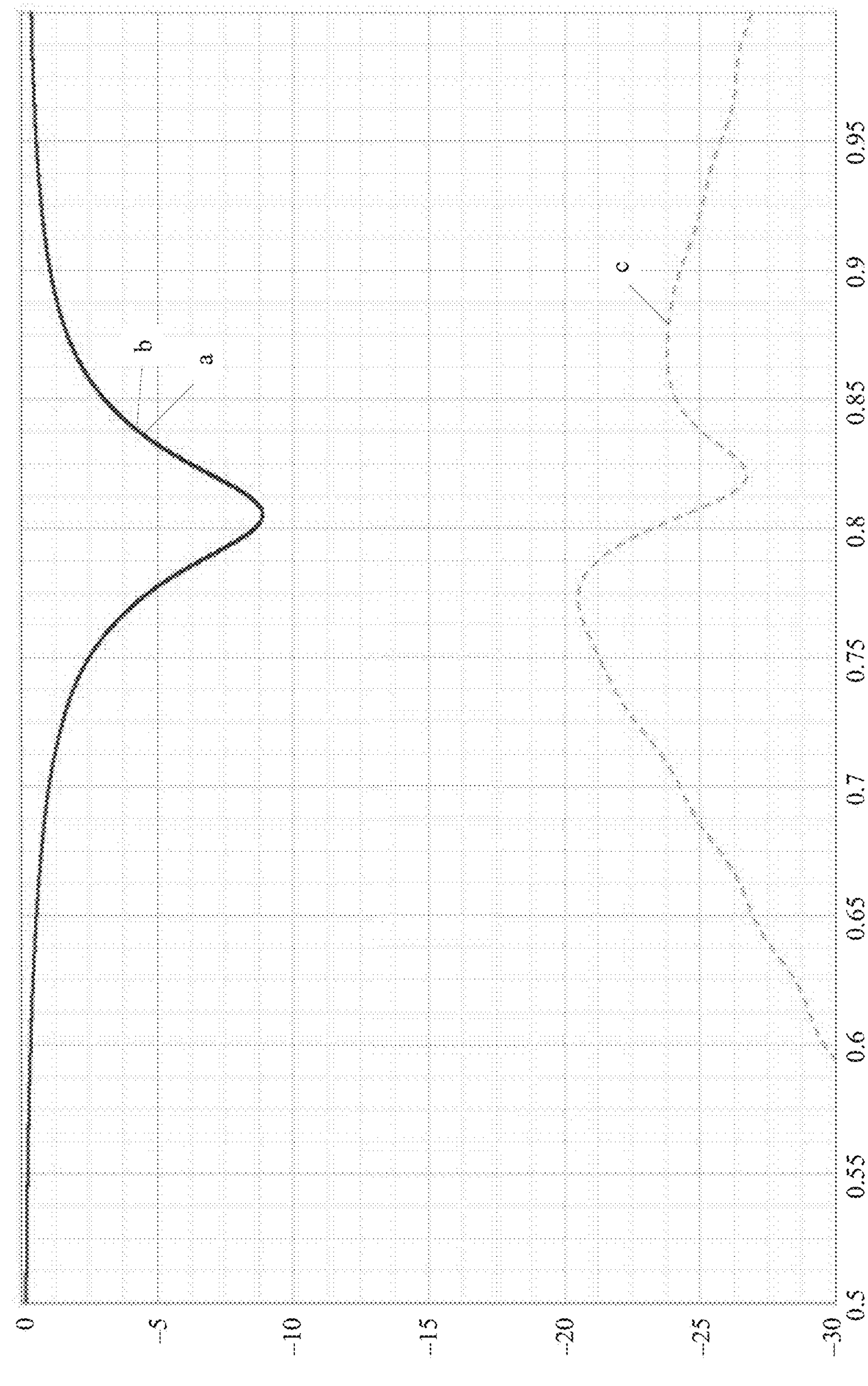
FIG. 18 is a return loss curve diagram and an isolation curve diagram of the antenna structure shown in FIG. 17.

Refer to FIG. 18. FIG. 18 is a return loss curve diagram and an isolation curve diagram of the antenna structure 100 shown in FIG. 17. A curve a is a return loss curve of the first antenna 10, and a curve b is a return loss curve of the second antenna 20. Abscissas of the curve a and the curve b represent frequency, and a unit is GHz. Ordinates of the curve a and the curve b represent return loss coefficient, and a unit is dB. A curve c is an isolation curve between the first antenna 10 and the second antenna 20. An abscissa represents frequency, and a unit is GHz. An ordinate represents isolation coefficient, and a unit is dB. It can be learned from FIG. 18 that in this implementation, both the first antenna 10 and the second antenna 20 can generate resonance in only one operating mode, operating bands generated by the first antenna 10 and the second antenna 20 are basically the same, and center operating frequencies are both about 0.81 GHz. In this implementation, isolation between the first antenna 10 and the second antenna 20 at the center operating frequency is about −26 dB, that is, there can be relatively good isolation between the first antenna 10 and the second antenna 20.

Figure 19:
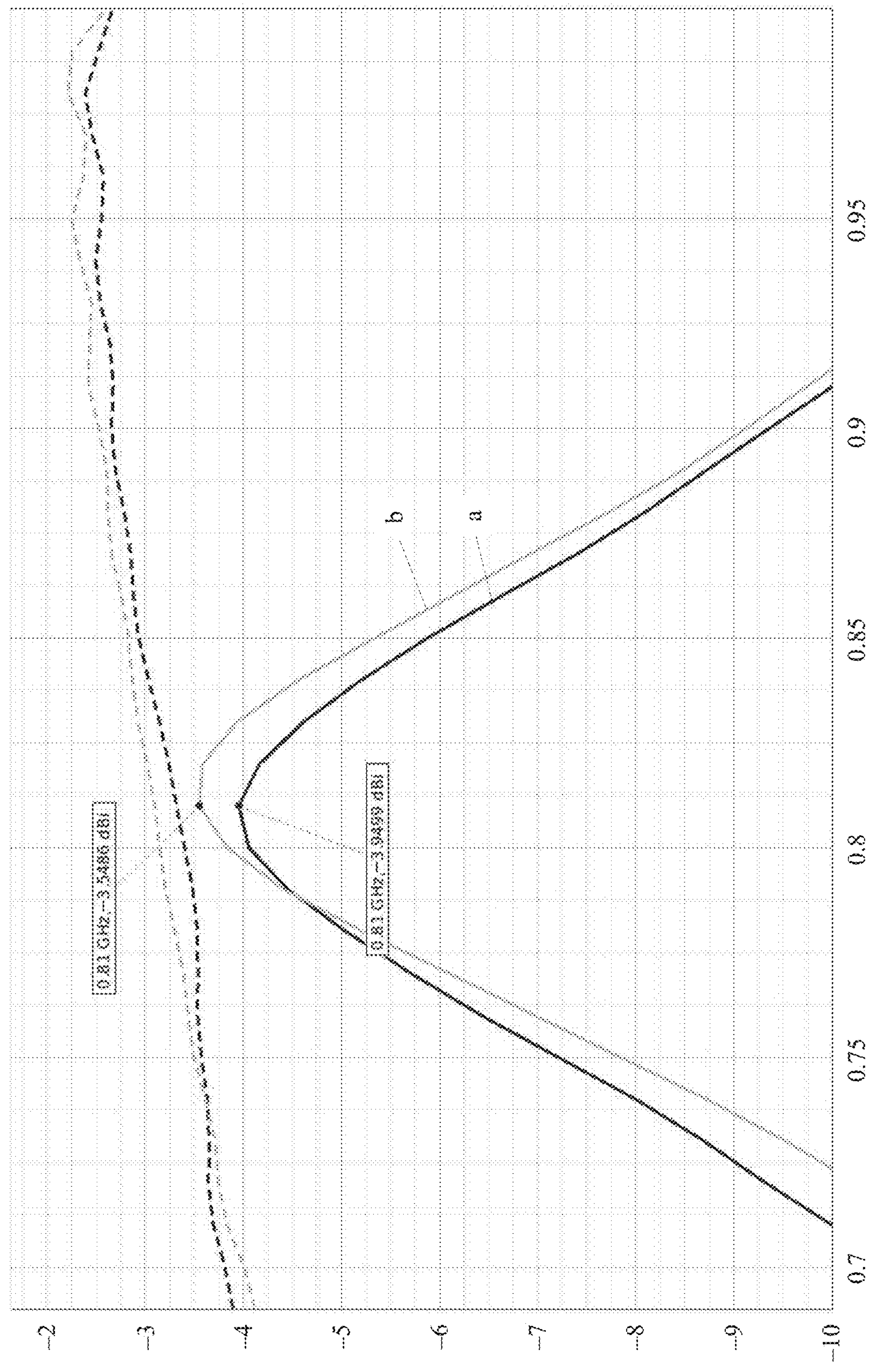
FIG. 19 is a diagram of comparison between efficiency of a first antenna during operating of the antenna structure shown in FIG. 17 and efficiency of the first antenna during separate operating of the first antenna.
Figure 20:
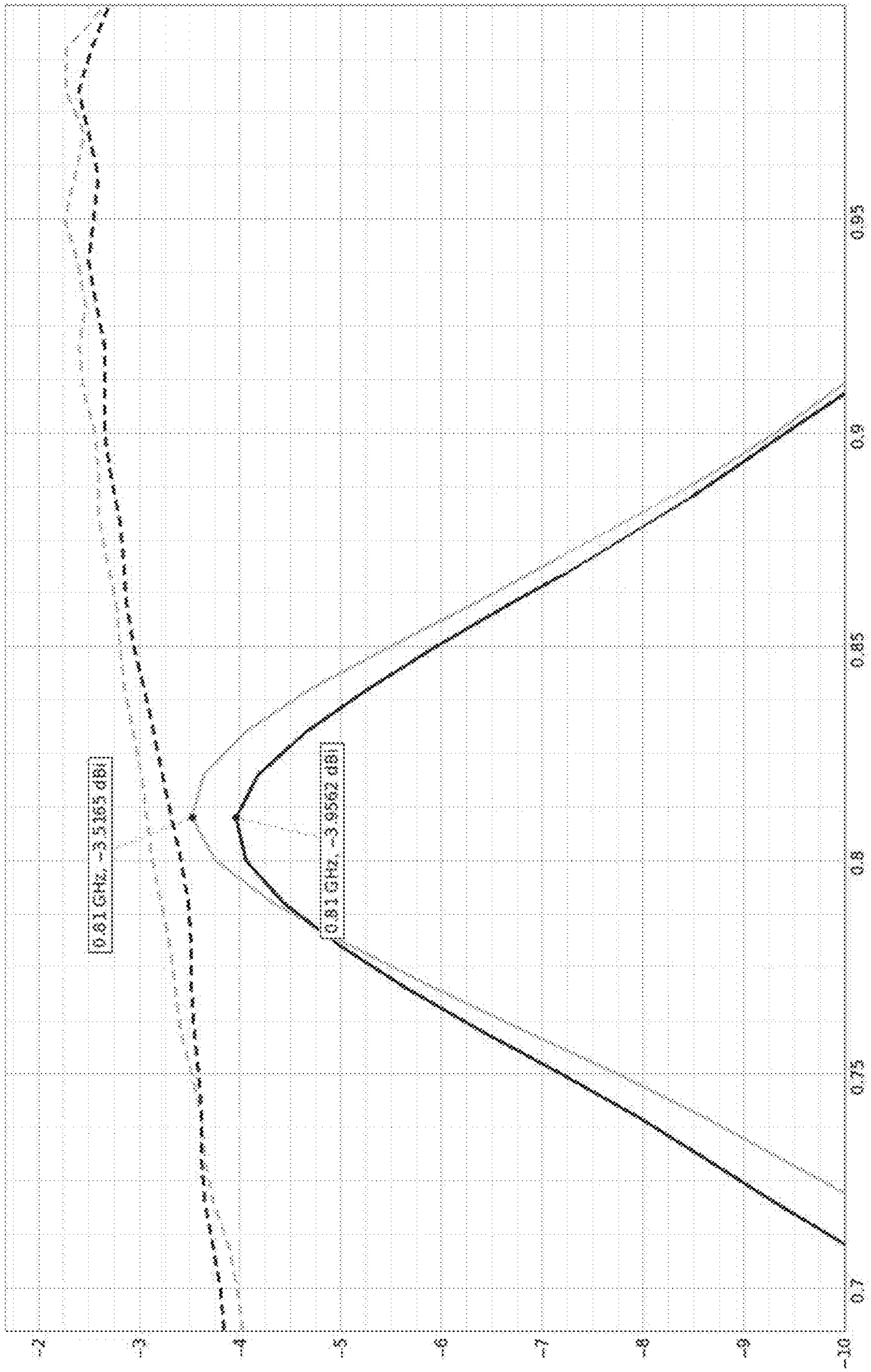
FIG. 20 is a diagram of comparison between efficiency of a second antenna during operating of the antenna structure shown in FIG. 17 and efficiency of the second antenna during separate operating of the second antenna.

Refer to FIG. 19. FIG. 19 is a diagram of comparison between efficiency of the first antenna 10 during operating of the antenna structure 100 shown in FIG. 17 and efficiency of the first antenna 10 during separate operating of the first antenna 10. An abscissa in FIG. 17 represents frequency, and a unit is GHz. An ordinate represents efficiency, and a unit is dBi. A curve a in FIG. 19 is an efficiency curve of the first antenna 10 of the antenna structure 100 in this implementation, and a curve b in FIG. 19 is a curve when the first antenna 10 separately operates. The antenna efficiency of the first antenna 10 of the antenna structure 100 in the ¼ wavelength mode in this implementation is reduced by about 0.3 dB compared with the antenna efficiency in the ¼ wavelength mode during separate operating of the first antenna 10. In other words, in this implementation, after the decoupling circuit 30 is connected between the first antenna 10 and the second antenna 20, the operating efficiency of the first antenna 10 in the ¼ wavelength mode decreases by about 0.3 dB. Compared with that in the solution in which both the first radiator 11 and the second radiator 21 are located on one side of the ground 40, in this implementation, after the decoupling circuit 30 is connected between the first antenna 10 and the second antenna 20, the operating efficiency of the first antenna 10 decreases to a relatively small extent. Refer to FIG. 20. FIG. 20 is a diagram of comparison between efficiency of the second antenna 20 during operating of the antenna structure 100 shown in FIG. 17 and efficiency of the second antenna 20 during separate operating of the second antenna 20. An abscissa in FIG. 20 represents frequency, and a unit is GHz. An ordinate represents efficiency, and a unit is dBi. A curve a in FIG. 20 is an efficiency curve of the second antenna 20 of the antenna structure 100 in this implementation, and a curve b in FIG. 20 is a curve when the second antenna 20 separately operates. The antenna efficiency of the second antenna 20 of the antenna structure 100 in the ¼ wavelength mode in this implementation is reduced by about 0.3 dB compared with the antenna efficiency in the ¼ wavelength mode during separate operating of the second antenna 20. In other words, in this implementation, after the decoupling circuit 30 is connected between the first antenna 10 and the second antenna 20, the operating efficiency of the first antenna 10 and the second antenna 20 in the ¼ wavelength mode decreases by about 0.3 dB. Compared with that in the solution in which both the first radiator 11 and the second radiator 21 are located on one side of the ground 40, in this implementation, after the decoupling circuit 30 is connected between the first antenna 10 and the second antenna 20, the operating efficiency of the first antenna 10 and the second antenna 20 decreases to a relatively small extent. That is, in this implementation, the decoupling circuit 30 is connected between the first antenna 10 and the second antenna 20, so that isolation between the first antenna 10 and the second antenna 20 can be improved, and great impact on the operating efficiency of the first antenna 10 and the second antenna 20 can be avoided.

Figure 21:
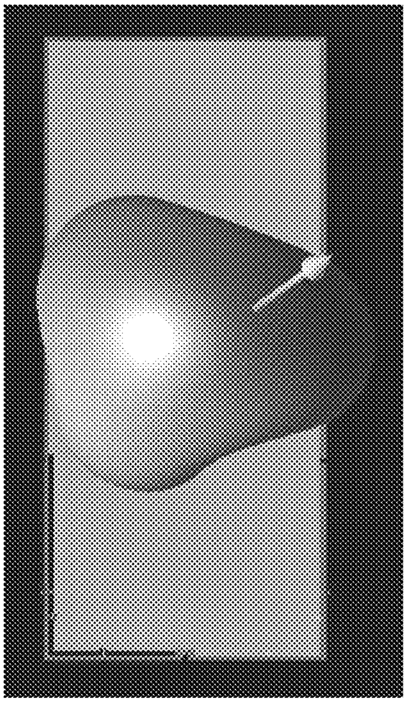
FIG. 21 is a radiation pattern of a first antenna of the antenna structure in the implementation shown in FIG. 17.
Figure 22:
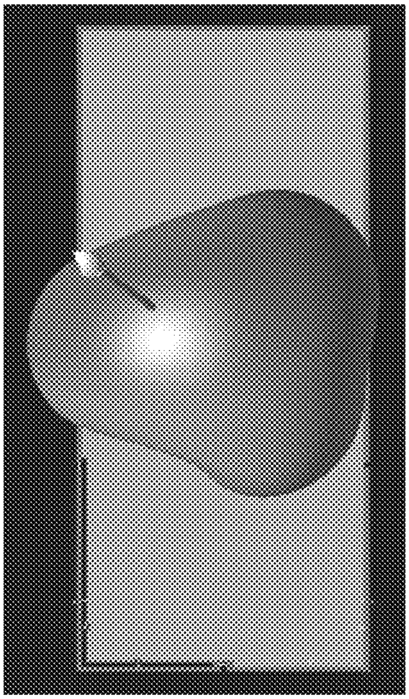
FIG. 22 is a radiation pattern of a second antenna of the antenna structure in the implementation shown in FIG. 17.

Refer to FIG. 21 and FIG. 22. FIG. 21 is a radiation pattern of the first antenna 10 of the antenna structure 100 in the implementation shown in FIG. 17, and FIG. 22 is a radiation pattern of the second antenna 20 of the antenna structure 100 in the implementation shown in FIG. 17. In this implementation, the radiation pattern of the first antenna 10 is complementary to the radiation pattern of a radiation region of the second antenna 20. Therefore, an envelope correlation coefficient (envelope correlation coefficient, ECC) between the first antenna 10 and the second antenna 20 in this implementation is relatively good, and the ECC is about 0.11.

Figure 23:
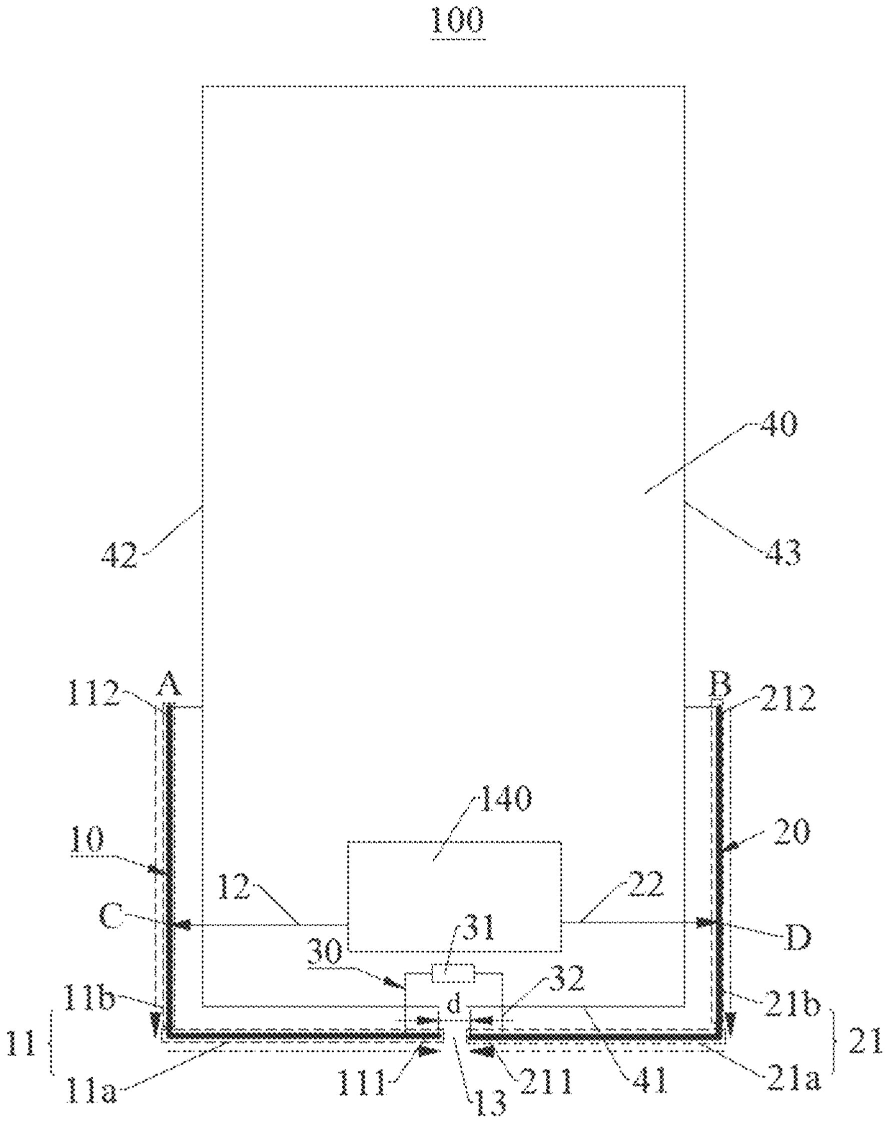
FIG. 23 is a schematic diagram of a structure of an antenna structure according to another implementation of this application.

Refer to FIG. 23. FIG. 23 is a schematic diagram of a structure of an antenna structure 100 according to another implementation of this application. A difference between the antenna structure 100 in the implementation shown in FIG. 23 and the antenna structure 100 in the implementation shown in FIG. 3 lies in that in this implementation, a size of the first edge 41 of the ground 40 is narrower than the size of the first edge 41 of the ground 40 in the implementation shown in FIG. 3. Therefore, when the first radiator 11 and the second radiator 21 are of an "L"-shaped structure, the first radiator 11 and the second radiator 21 can be designed to obtain relatively small electrical lengths, so that operating bands of the first antenna 10 and the second antenna 20 can be an intermediate band or a high band, for example, an intermediate band or a high band in sub-6G bands. In this implementation, the size of the first edge 41 of the ground 40 is about 30 mm.

Figure 24:
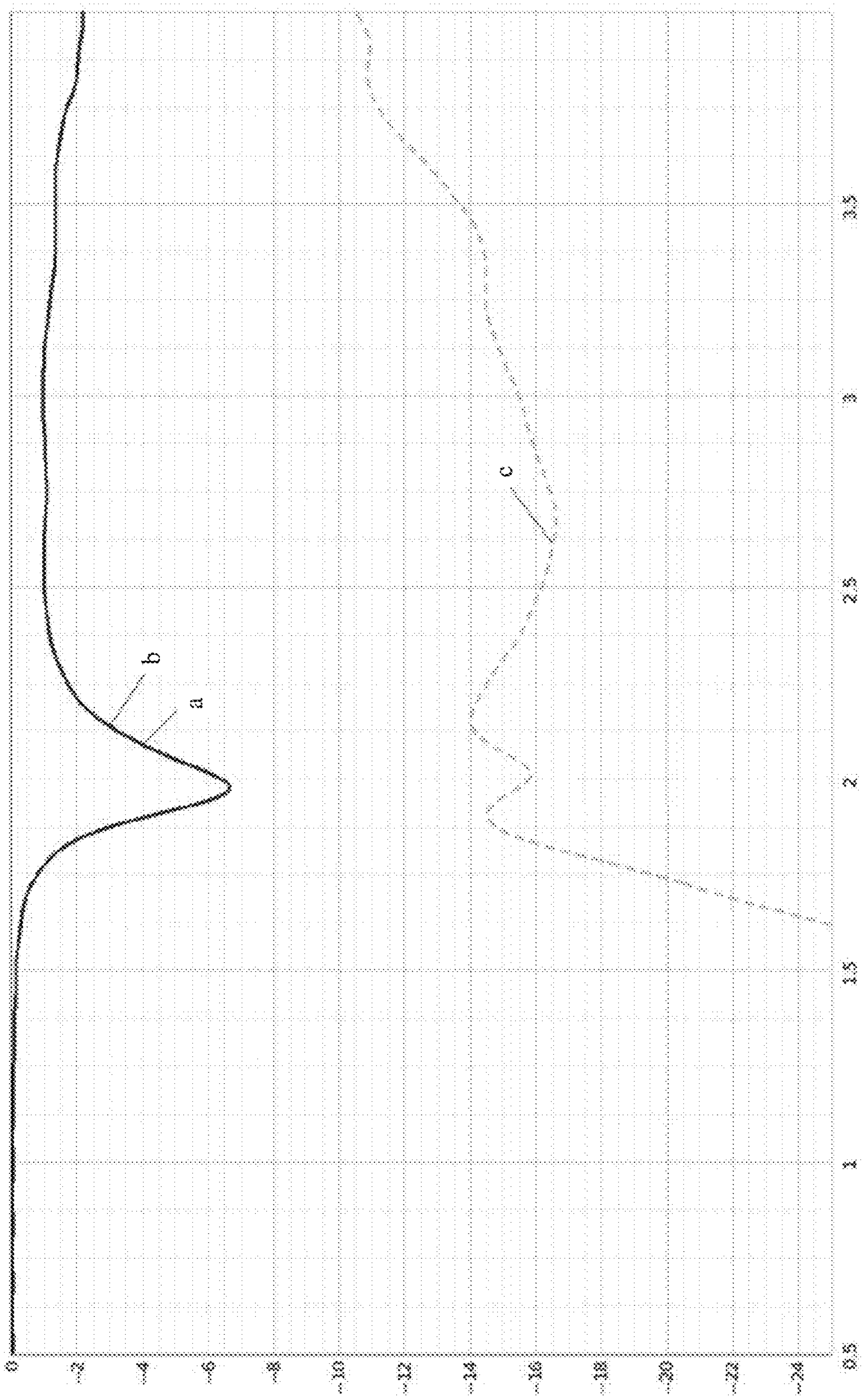
FIG. 24 is a return loss diagram and an isolation curve diagram of the antenna structure shown in FIG. 23.

In this implementation, an inductance value of the decoupling circuit 30 is about 20 nH, and relatively good isolation effect is achieved between the first antenna 10 and the second antenna 20. Refer to FIG. 24. FIG. 24 is a return loss diagram and an isolation curve diagram of the antenna structure 100 shown in FIG. 23. A curve a is a return loss curve of the first antenna 10, and a curve b is a return loss curve of the second antenna 20. Abscissas of the curve a and the curve b represent frequency, and a unit is GHz. Ordinates of the curve a and the curve b represent return loss coefficient, and a unit is dB. A curve c is an isolation curve between the first antenna 10 and the second antenna 20. An abscissa represents frequency, and a unit is GHz. An ordinate represents isolation coefficient, and a unit is dB. It can be learned from FIG. 24 that in this implementation, operating bands generated by the first antenna 10 and the second antenna 20 are basically the same, and center operating frequencies are both about 2 GHz, that is, operating bands of the first antenna 10 and the second antenna 20 are at high frequencies. In this implementation, isolation between the first antenna 10 and the second antenna 20 at the center operating frequency is about −15 dB, that is, there can be relatively good isolation between the first antenna 10 and the second antenna 20.

Figure 25:
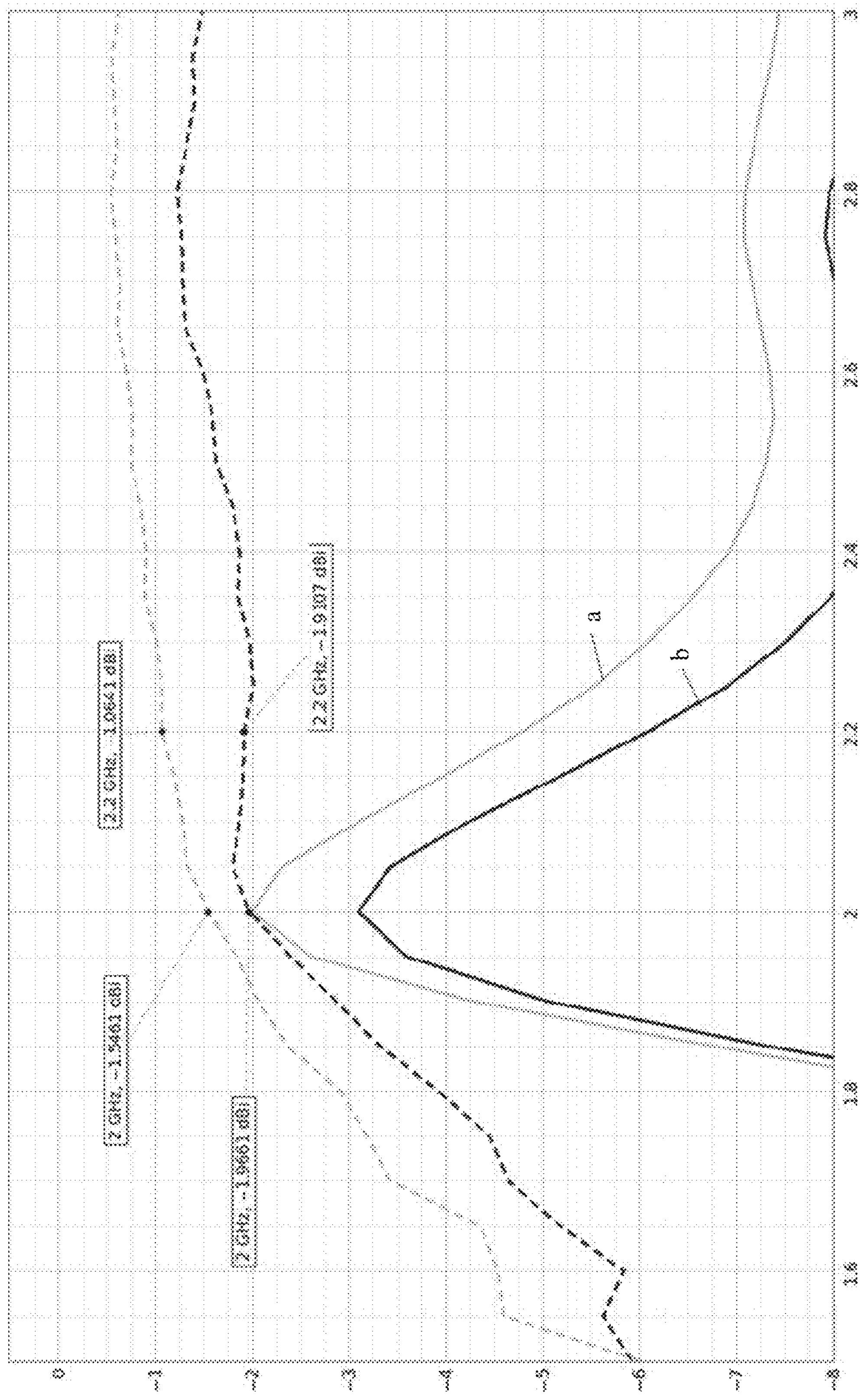
FIG. 25 is a diagram of comparison between antenna efficiency of a first antenna during operating of the antenna structure shown in FIG. 23 and antenna efficiency of the first antenna during separate operating of the first antenna.

Refer to FIG. 25. FIG. 25 is a diagram of comparison between antenna efficiency of the first antenna 10 during operating of the antenna structure 100 shown in FIG. 23 and antenna efficiency of the first antenna 10 during separate operating of the first antenna 10. An abscissa in FIG. 25 represents frequency, and a unit is GHz. An ordinate represents efficiency, and a unit is dBi. A curve a in FIG. 25 is an efficiency curve of the first antenna 10 of the antenna structure 100 shown in FIG. 23, and a curve b in FIG. 25 is a curve when the first antenna 10 separately operates. The antenna efficiency of the first antenna 10 of the antenna structure 100 in this implementation is reduced by about 0.5 dB compared with the antenna efficiency in an operating mode during separate operating of the first antenna 10. In other words, in this implementation, after the decoupling circuit 30 is connected between the first antenna 10 and the second antenna 20, the antenna operating efficiency of the first antenna 10 decreases by about 0.5 dB. Compared with that in the solution in which both the first radiator 11 and the second radiator 21 are located on one side of the ground 40, in this implementation, after the decoupling circuit 30 is connected between the first antenna 10 and the second antenna 20, the operating efficiency of the first antenna 10 decreases to a relatively small extent. Similarly, in this implementation, after the decoupling circuit 30 is connected between the first antenna 10 and the second antenna 20, operating efficiency of the second antenna 20 can also decrease to a relatively small extent. That is, in this implementation, the decoupling circuit 30 is connected between the first antenna 10 and the second antenna 20, so that isolation between the first antenna 10 and the second antenna 20 can be improved, and great impact on the operating efficiency of the first antenna 10 and the second antenna 20 can be avoided.

Figure 26:
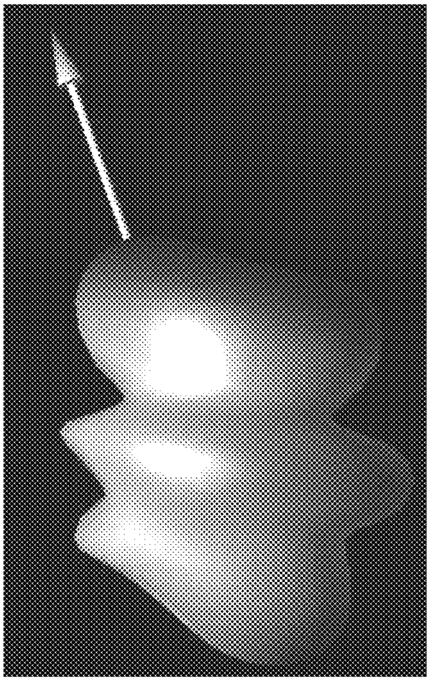
FIG. 26 is a radiation pattern of a first antenna of the antenna structure in the implementation shown in FIG. 23.
Figure 27:
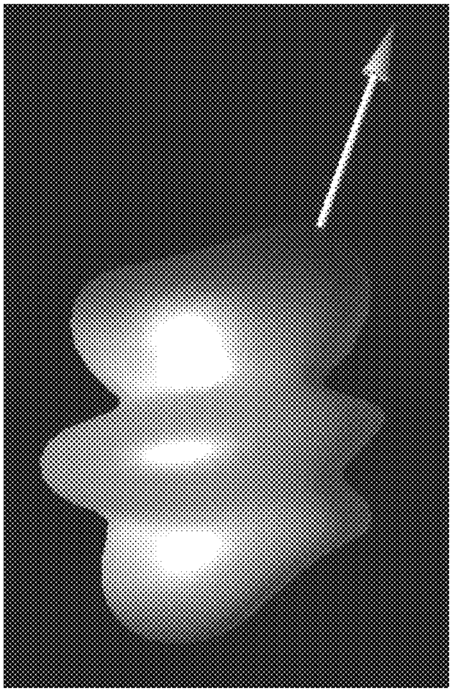
FIG. 27 is a radiation pattern of a second antenna of the antenna structure in the implementation shown in FIG. 23.

Refer to FIG. 26 and FIG. 27. FIG. 26 is a radiation pattern of the first antenna 10 of the antenna structure 100 in the implementation shown in FIG. 23, and FIG. 27 is a radiation pattern of the second antenna 20 of the antenna structure 100 in the implementation shown in FIG. 23. In this implementation, the radiation pattern of the first antenna 10 is complementary to the radiation pattern of the second antenna 20. Therefore, an envelope correlation coefficient (envelope correlation coefficient, ECC) between the first antenna 10 and the second antenna 20 in this implementation is relatively good, and the ECC is about 0.01.

Figure 28:
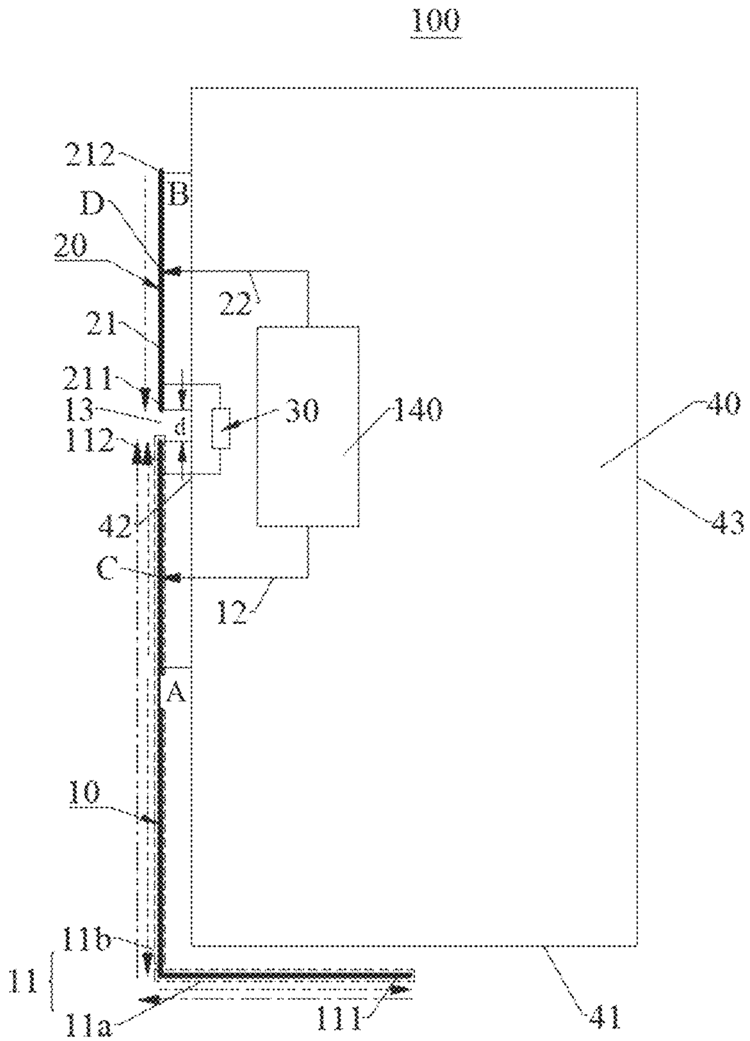
FIG. 28 is a schematic diagram of a structure of an antenna structure according to another implementation of this application.

Refer to FIG. 28. FIG. 28 is a schematic diagram of a structure of an antenna structure 100 according to another implementation of this application. A difference between the implementation shown in FIG. 28 and the implementation shown in FIG. 12 lies in that in this implementation, only the first radiator 11 is of an "L"-shaped structure, the second radiator 21 is of a linear structure, the first section 11*a* of the first radiator 11 is located on a side of the first edge 41, the second section 11*b* of the first radiator 11 is located on a side of the second edge 42, and the second radiator 21 is also located on the side of the second edge 42. It may be understood that, in some other implementations of this application, the second radiator 21 may alternatively be of an "L"-shaped structure, and the first radiator 11 may be of a linear structure. In this implementation, the first radiator 11 includes a first end 111 and a second end 112, the first end 111 is located at an end that is of the first section 11*a* of the first radiator 11 and that is away from the second section 11*b*, the second end 112 is located at an end that is of the second section 11*b* of the first radiator 11 and that is away from the first section 11*a*. The second radiator 21 includes a third end 211 and a fourth end 212 that are oppositely disposed, and the third end 211 is close to the first radiator 11 relative to the fourth end 212. Both the first end 111 and the second end 112 of the first radiator 11 are open ends, the third end 211 of the second radiator 21 is an open end, and the fourth end 212 of the second radiator 21 is connected to the ground 40. For definitions of the open end, the first end 111, the second end 112, the third end 211, the fourth end 212, and the end face, refer to the foregoing embodiments. Details are not described herein again. In this implementation, the second end 112 of the first radiator 11 is a first open end of the first radiator 11, and the first end III of the first radiator 11 is a third open end of the first radiator 11. The third end 211 of the second radiator 21 is a second open end, and the second end 112 of the first radiator 11 and the third end 211 of the second radiator 21 are opposite and form a gap 13. The decoupling circuit 30 is connected to the second end 112 of the first radiator 11 and the third end 211 of the second radiator 21.

Figure 29:
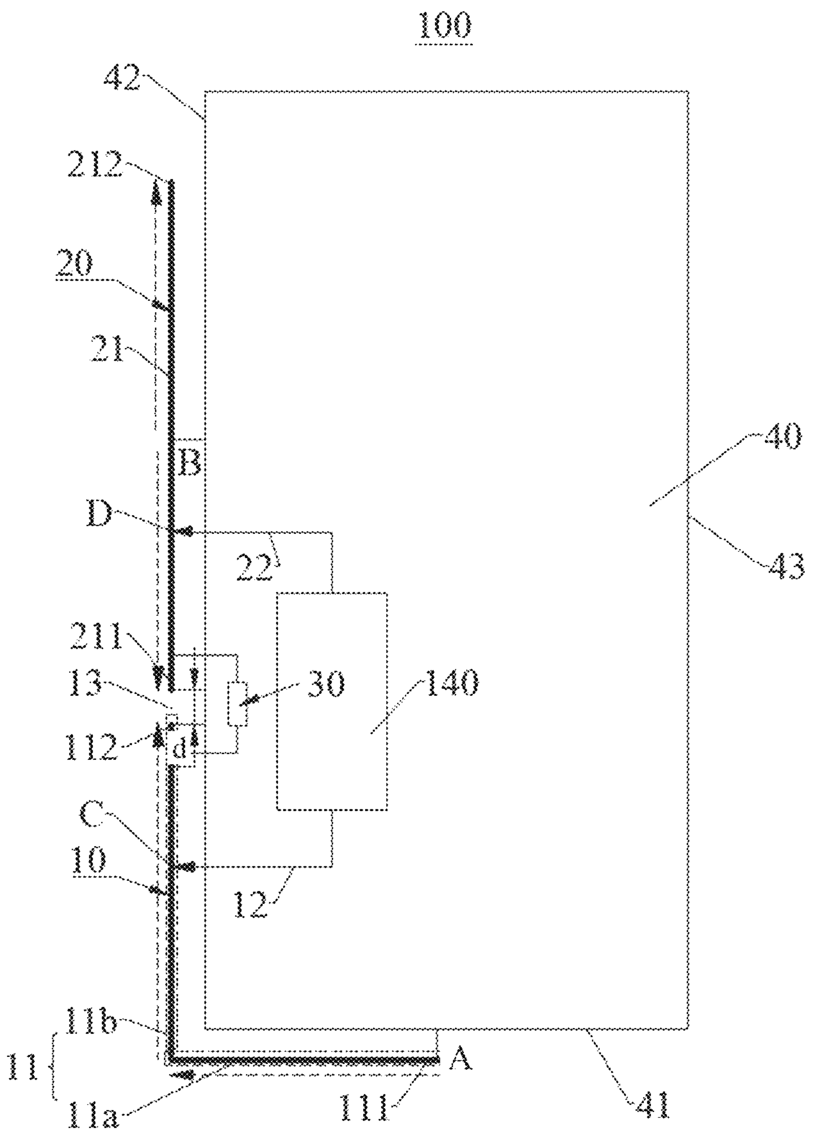
FIG. 29 is a schematic diagram of a structure of an antenna structure according to another implementation of this application.

It may be understood that in another implementation of this application, the first radiator 11 may have only one open end, and the second radiator 21 may have two open ends. For example, refer to FIG. 29. FIG. 29 is a schematic diagram of a structure of an antenna structure 100 according to another implementation of this application. A structural difference between the antenna structure 100 in this implementation and the antenna structure 100 shown in FIG. 28 lies in that in this implementation, the first radiator 11 includes only one open end, and the second radiator 21 includes two open ends. Specifically, the second end 112 of the first radiator 11 is a first open end of the first radiator 11, and the first end 111 of the first radiator 11 is connected to the ground 40. Both the third end 211 and the fourth end 212 of the second radiator 21 are open ends, the third end 211 of the second radiator 21 is a second open end, and the fourth end 212 is a fourth open end. An end face that is of the first radiator 11 and that is close to the second end 112 and an end face that is of the second radiator 21 and that is close to the third end 211 are opposite and form a gap 13. The decoupling circuit 30 is connected to the second end 112 of the first radiator 11 and the third end 211 of the second radiator 21.

Refer to FIG. 28 again. A direction of a dashed line arrow near the first radiator 11 in FIG. 28 indicates a schematic direction of a current when the first radiator 11 generates resonance in a ¼ wavelength mode. A direction of a dash-dot line arrow near the first radiator 11 in FIG. 28 indicates a schematic direction of a current when the first radiator 11 generates resonance in a ½ wavelength mode. In the implementation shown in FIG. 28, resonance in the ¼ wavelength mode can be generated in a section between the first ground point A of the first radiator 11 and an end face that is of the first radiator 11 and that is close to the first end 111, and the first radiator 11 can generate resonance in the ½ wavelength mode in a section between the end face close to the first end 111 and an end face close to the second end 112. In other words, the first radiator 11 in this implementation can generate resonant signals having wavelengths in two different modes. In this implementation, the second radiator 21 can generate resonance in the ¼ wavelength mode in a section (that is, the second radiator 21) between the end face close to the third end 211 and an end face close to the fourth end 212. In addition, an operating band of the resonance in the ¼ wavelength mode generated by the second radiator 21 in this implementation is basically the same as an operating band of the resonance in the ¼ wavelength mode generated by the first radiator 11.

Figure 30:
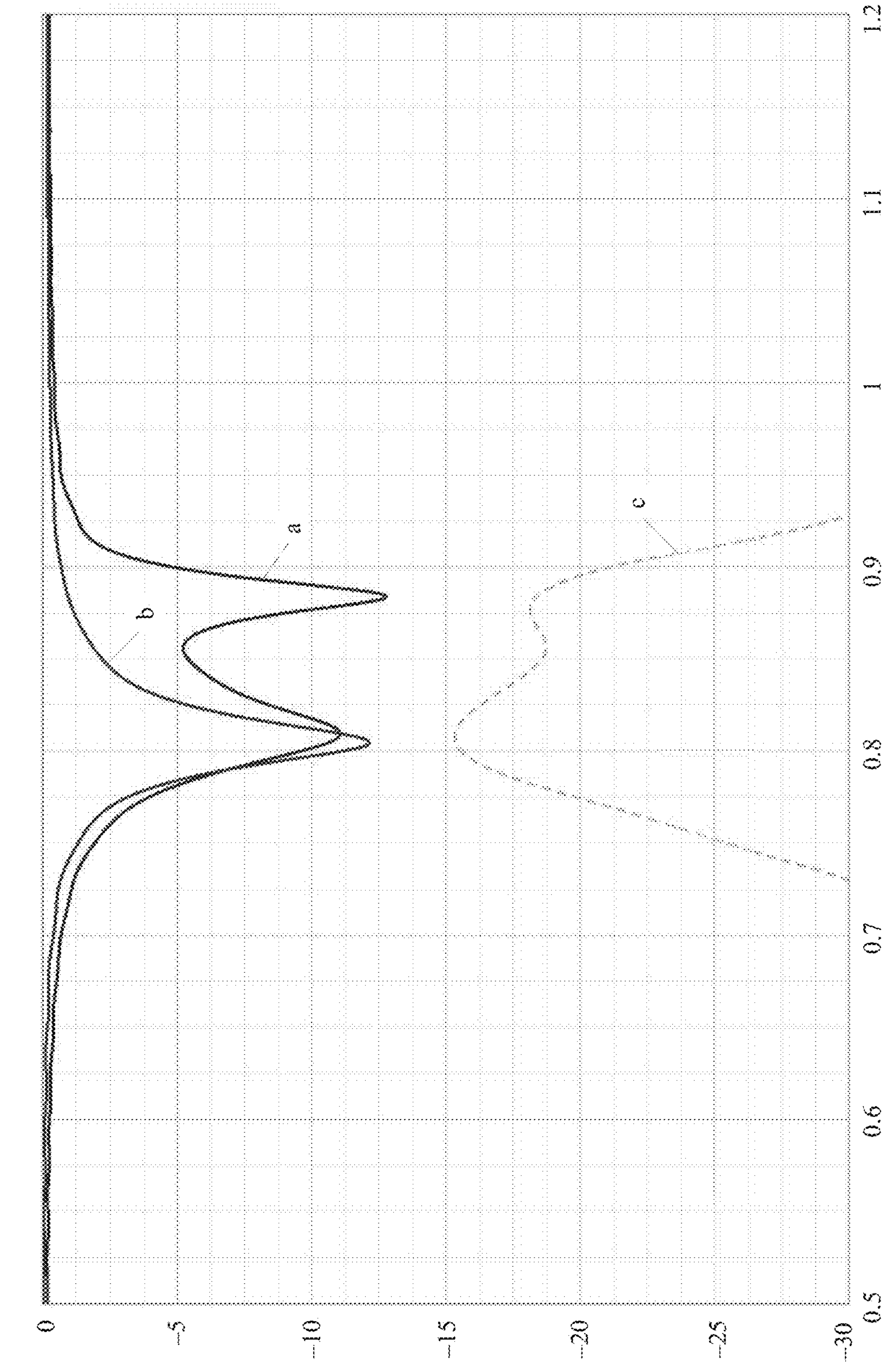
FIG. 30 is a return loss diagram and an isolation curve diagram of the antenna structure shown in FIG. 28.

Refer to FIG. 30. FIG. 30 is a return loss diagram and an isolation curve diagram of the antenna structure 100 shown in FIG. 28. A curve a is a return loss curve of the first antenna 10, and a curve b is a return loss curve of the second antenna 20. Abscissas of the curve a and the curve b represent frequency, and a unit is GHz. Ordinates of the curve a and the curve b represent return loss coefficient, and a unit is dB. A curve c is an isolation curve between the first antenna 10 and the second antenna 20. An abscissa represents frequency, and a unit is GHz. An ordinate represents isolation coefficient, and a unit is dB. It can be learned from FIG. 30 that in this implementation, an operating band of the first antenna 10 in the ¼ wavelength mode and an operating band generated by the second antenna 20 are basically the same, and center operating frequencies are both about 0.81 GHz. In this implementation, isolation between the first antenna 10 at the center operating frequency in the ¼ wavelength mode and the second antenna 20 at the center operating frequency is about −15 dB, that is, there can be relatively good isolation between the first antenna 10 and the second antenna 20.

Figure 31:
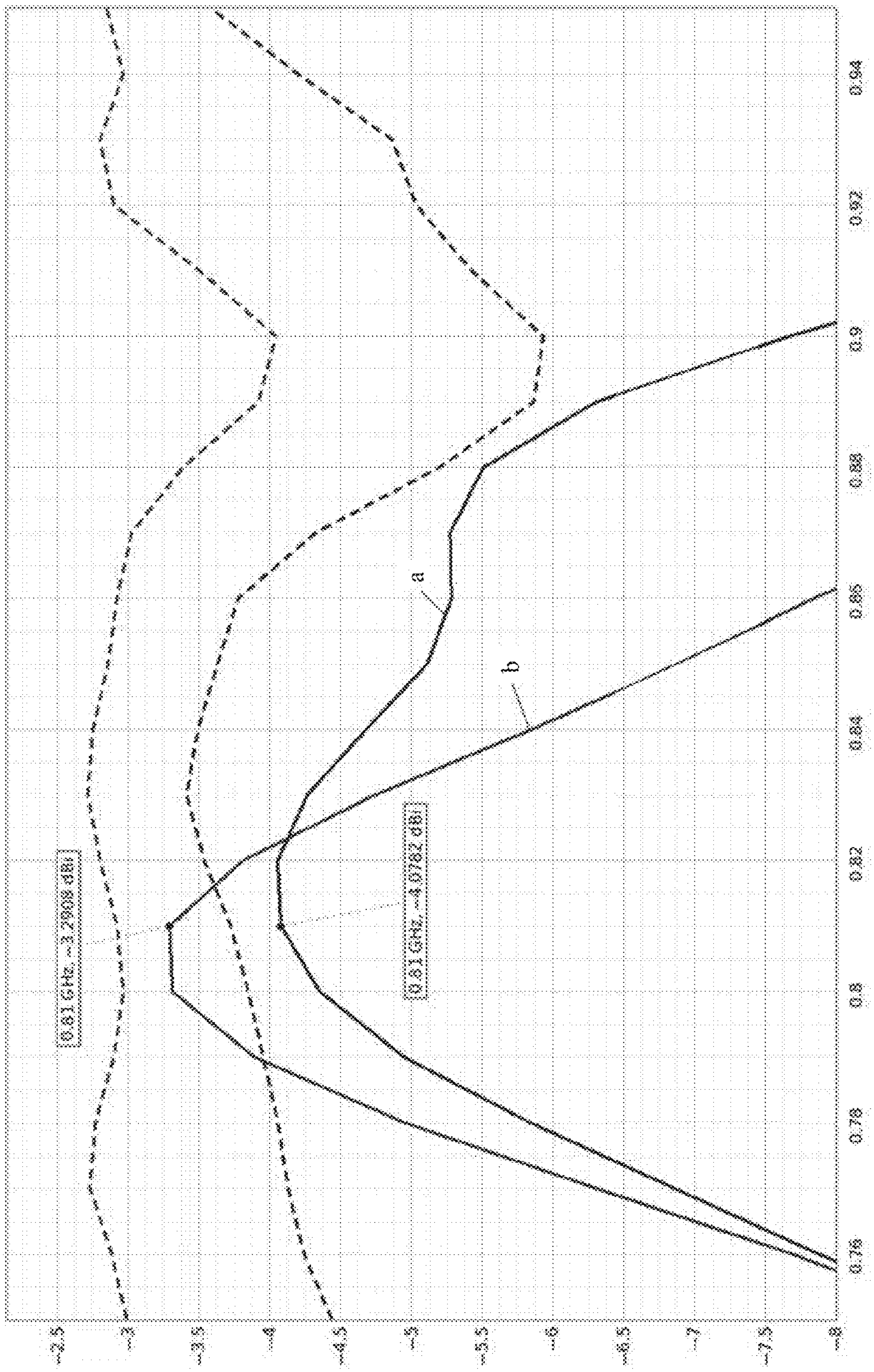
FIG. 31 is an antenna efficiency diagram of a first antenna and an antenna efficiency diagram of a second antenna in the antenna structure shown in FIG. 28.

Refer to FIG. 31. FIG. 31 is an antenna efficiency diagram of the first antenna 10 and an antenna efficiency diagram of the second antenna 20 in the antenna structure 100 shown in FIG. 28. An abscissa in FIG. 31 represents frequency, and a unit is GHz. An ordinate represents efficiency, and a unit is dBi. A curve a in FIG. 31 is an efficiency curve of the first antenna 10 in a free state of the antenna structure 100 shown in FIG. 28, and a curve b in FIG. 31 is an efficiency curve of the second antenna 20 in the free state of the antenna structure 100. In this implementation, the operating efficiency of the first antenna 10 in the free state of the antenna structure 100 is about −4 dBi, and the operating efficiency of the second antenna 20 in the free state of the antenna structure 100 is less than −3.3 dBi. In other words, both the first antenna 10 and the second antenna 20 in this implementation can have relatively good operating efficiency.

Figure 32:
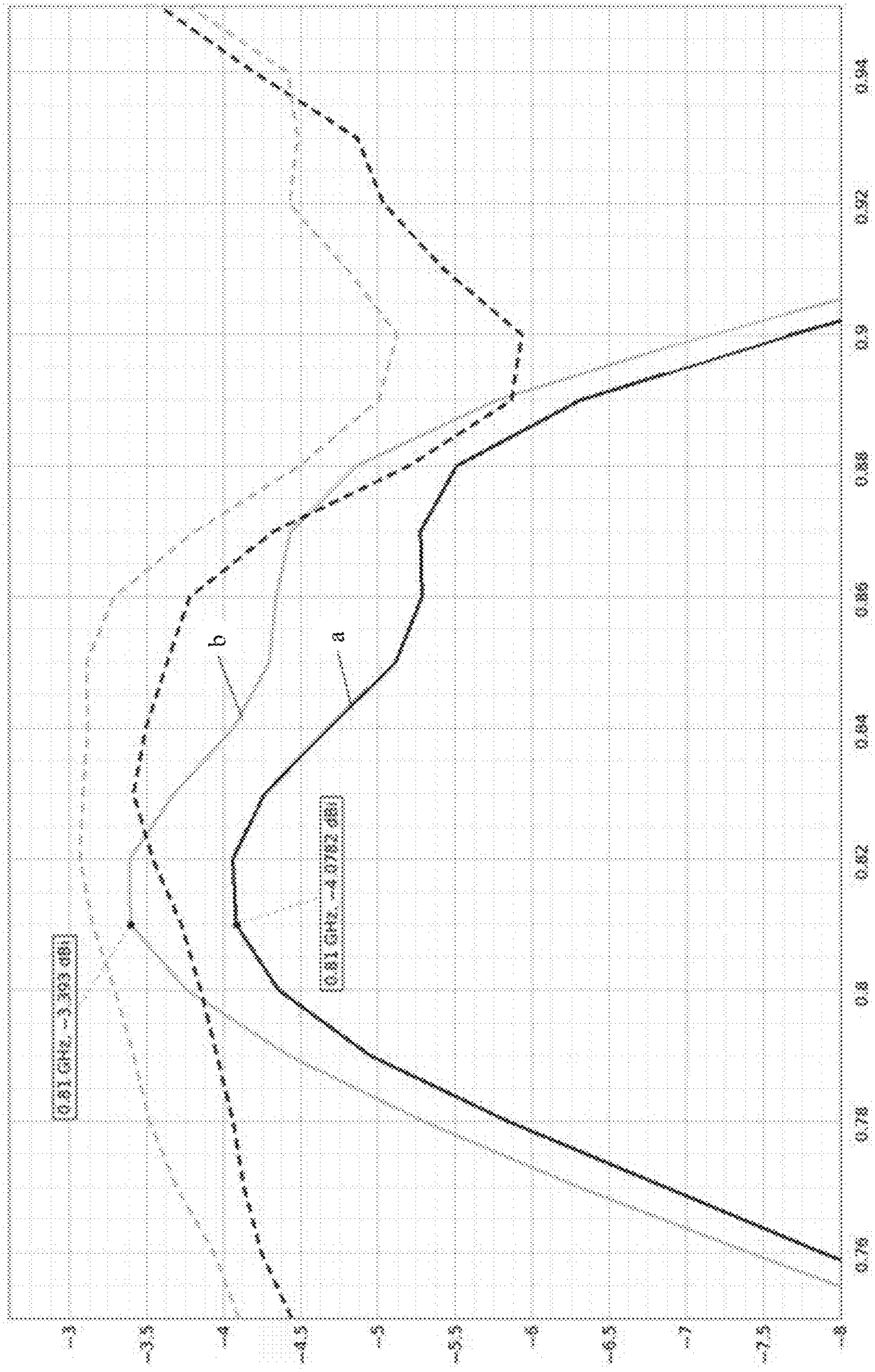
FIG. 32 is a diagram of comparison between antenna efficiency of a first antenna during operating of the antenna structure shown in FIG. 28 and antenna efficiency of the first antenna during separate operating of the first antenna.
Figure 33:
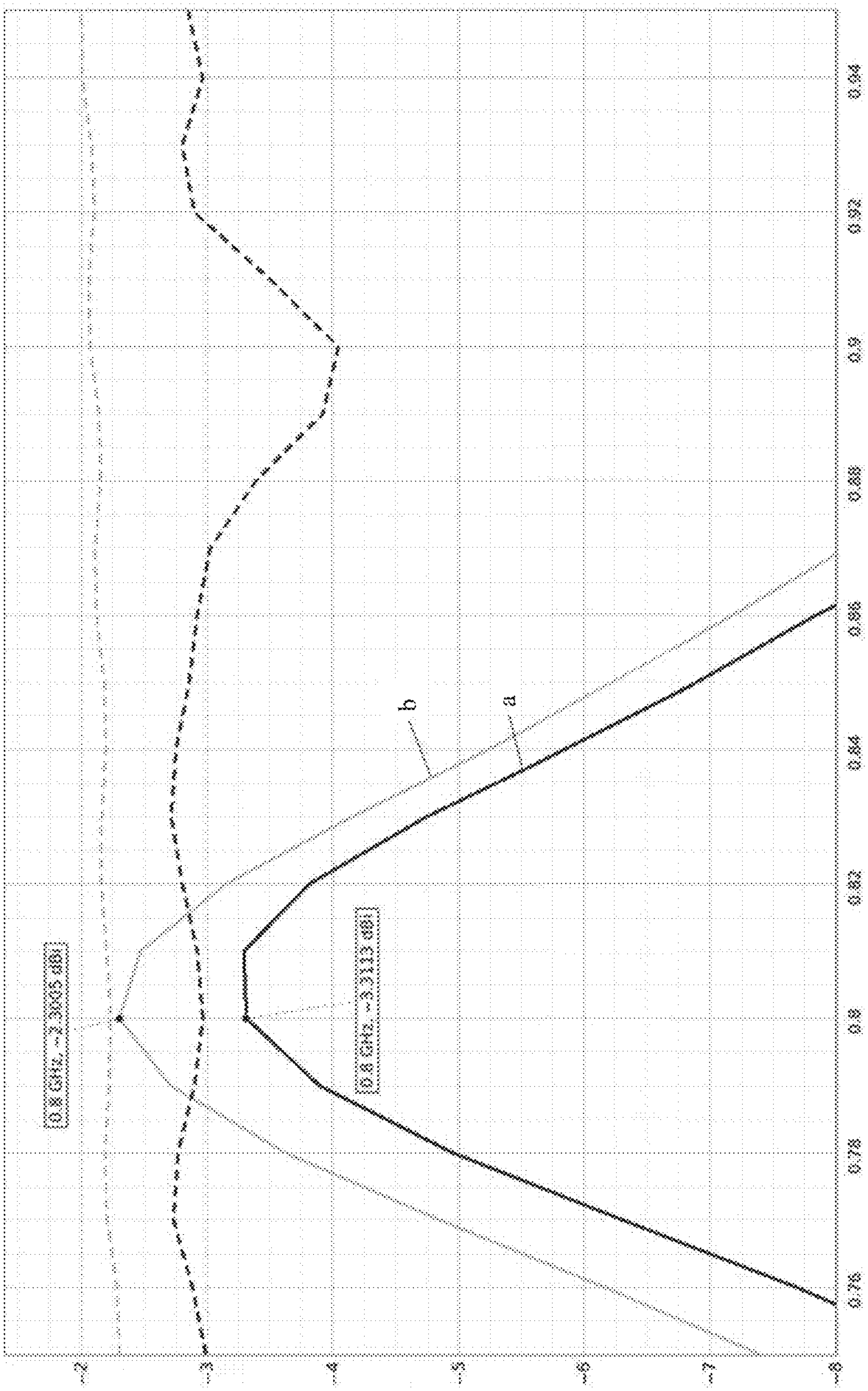
FIG. 33 is a diagram of comparison between antenna efficiency of a second antenna of the antenna structure shown in FIG. 28 and antenna efficiency of the second antenna during separate operating of the second antenna.

Refer to FIG. 32. FIG. 32 is a diagram of comparison between antenna efficiency of the first antenna 10 during operating of the antenna structure 100 shown in FIG. 28 and antenna efficiency of the first antenna 10 during separate operating of the first antenna 10. An abscissa in FIG. 32 represents frequency, and a unit is GHz. An ordinate represents efficiency, and a unit is dBi. A curve a in FIG. 32 is an efficiency curve of the first antenna 10 of the antenna structure 100 in this implementation, and a curve b in FIG. 32 is a curve when the first antenna 10 separately operates. The antenna efficiency of the first antenna 10 of the antenna structure 100 in this implementation is reduced by about 0.5 dB compared with the antenna efficiency during separate operating of the first antenna 10. In other words, in this implementation, after the decoupling circuit 30 is connected between the first antenna 10 and the second antenna 20, the antenna operating efficiency of the first antenna 10 decreases by about 0.5 dB. Compared with that in the solution in which both the first radiator 11 and the second radiator 21 are located on one side of the ground 40, in this implementation, after the decoupling circuit 30 is connected between the first antenna 10 and the second antenna 20, the operating efficiency of the first antenna 10 decreases to a relatively small extent. Refer to FIG. 33. FIG. 33 is a diagram of comparison between antenna efficiency of the second antenna 20 of the antenna structure 100 shown in FIG. 28 and antenna efficiency of the second antenna 20 during separate operating of the second antenna 20. An abscissa in FIG. 33 represents frequency, and a unit is GHz. An ordinate represents efficiency, and a unit is dBi. A curve a in FIG. 33 is an efficiency curve of the second antenna 20 of the antenna structure 100 in this implementation, and a curve b in FIG. 33 is a curve when the second antenna 20 separately operates. The antenna efficiency of the second antenna 20 of the antenna structure 100 in this implementation is reduced by about 1 dB compared with the antenna efficiency during separate operating of the second antenna 20. In other words, for the antenna structure 100 in this implementation, compared with that in the solution of the antenna structure in which both the first radiator 11 and the second radiator 21 are located on one side of the ground 40, in this implementation, after the decoupling circuit 30 is connected between the first antenna 10 and the second antenna 20, the operating efficiency of the first antenna 10 and the second antenna 20 decreases to a relatively small extent. That is, in this implementation, the decoupling circuit 30 is connected between the first antenna 10 and the second antenna 20, so that isolation between the first antenna 10 and the second antenna 20 can be improved, and great impact on the operating efficiency of the first antenna 10 and the second antenna 20 can be avoided.

Figure 34:
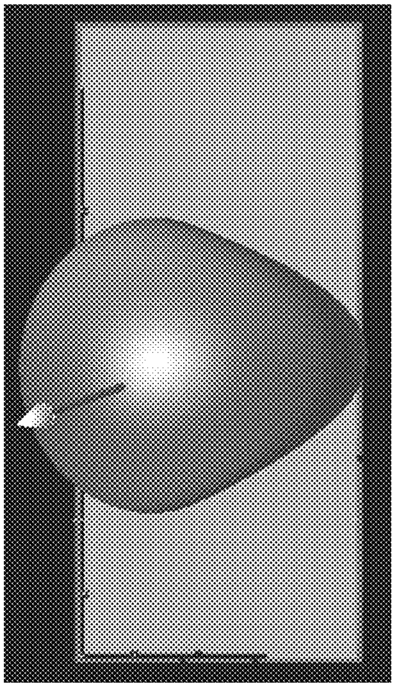
FIG. 34 is a radiation pattern of a first antenna of the antenna structure in the implementation shown in FIG. 28 operating in a ¼ wavelength mode.
Figure 35:
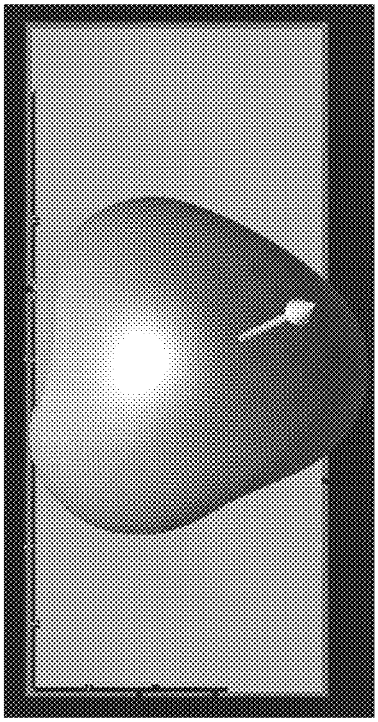
FIG. 35 is a radiation pattern of a second antenna of the antenna structure in the implementation shown in FIG. 28.

Refer to FIG. 34 and FIG. 35. FIG. 34 is a radiation pattern of the first antenna 10 of the antenna structure 100 in the implementation shown in FIG. 28 in a ¼ wavelength mode, and FIG. 35 is a radiation pattern of the second antenna 20 of the antenna structure 100 in the implementation shown in FIG. 28. In this implementation, the radiation pattern of the first antenna 10 in the ¼ wavelength mode is complementary to the radiation pattern of the second antenna 20. Therefore, an envelope correlation coefficient (envelope correlation coefficient, ECC) between the first antenna 10 and the second antenna 20 in this implementation is relatively good, and the ECC is about 0.15.

In an implementation of this application, the first antenna 10 and the second antenna 20 may be used as multiple-input multiple-output (Multiple-Input Multiple-Output, MIMO) antennas of the electronic device 1000, or the first antenna 10 and the second antenna 20 may be respectively used as a main antenna and a diversity antenna of the electronic device 1000.

Figure 36:
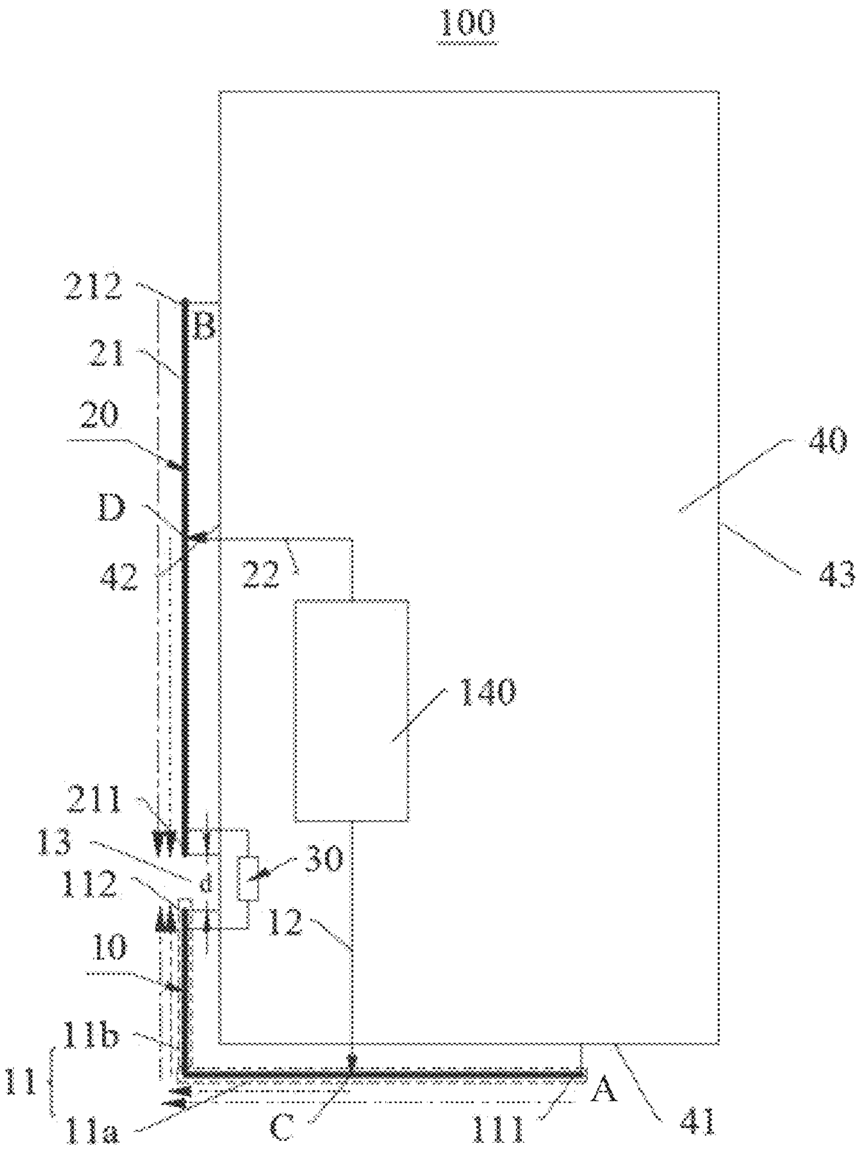
FIG. 36 is a schematic diagram of a structure of an antenna structure according to another implementation of this application.

Refer to FIG. 36. FIG. 36 is a schematic diagram of a structure of an antenna structure 100 according to another implementation of this application. A difference between the implementation shown in FIG. 36 and the implementation shown in FIG. 28 lies in that in this implementation, the first radiator 11 and the second radiator 21 each include one open end, and both the first radiator 11 and the second radiator 21 can generate two different operating modes. In addition, in this implementation, the decoupling filter circuit 30 is an inductive decoupling circuit. When the first radiator 11 and the second radiator 21 switch different operating frequencies, the decoupling filter circuit 30 can also present decoupling inductances with different values.

In this implementation, the first end 111 of the first radiator 11 is connected to the ground 40, and the second end 112 is an open end. The third end 211 of the second radiator 21 is an open end, and the fourth end 212 of the second radiator 21 is connected to the ground 40. The second end 112 of the first radiator 11 and the third end 211 of the second radiator 21 are opposite and form a gap 13. The decoupling circuit 30 is connected between the second end 112 of the first radiator 11 and the third end 211 of the second radiator 21.

In this implementation, the decoupling circuit 30 is the inductive decoupling circuit shown in FIG. 6*b*. Specifically, an inductance value of the first inductor 31*a* is about 29 nH, an inductance value of the second inductor 31*b* is about 15 nH, an inductance value of the third inductor 31*c* is about 72 nH, a capacitance value of the capacitor 33 is about 0.6 pF, and an equivalent inductance of the filter circuit is about 6.2 nH, which is different from the inductance value of the third inductor 31*c*.

In this implementation, both the first radiator 11 and the second radiator 21 can generate two operating modes. A direction of a dashed line arrow near the first radiator 11 and the second radiator 21 in FIG. 36 indicates a schematic direction of a current when the first radiator 11 and the second radiator 21 generate resonance in a ¼ wavelength mode. A direction of a dash-dot line arrow near the first radiator 11 and the second radiator 21 in FIG. 36 indicates a schematic direction of a current when the first radiator 11 and the second radiator 21 generate resonance in a ½ wavelength mode. In the implementation shown in FIG. 36, resonance in the ¼ wavelength mode can be generated in a section between the first feedpoint C of the first radiator 11 and an end face that is of the first radiator 11 and that is close to the second end 112, and the first radiator 11 can generate resonance in the ½ wavelength mode in a section between an end face close to the first end 111 and the end face close to the second end 112. In other words, the first radiator 11 in this implementation can generate resonant signals having wavelengths in two different modes. In this implementation, resonance in the ¼ wavelength mode can be generated in a section between the second feedpoint D of the second radiator 21 and an end face that is of the second radiator 11 and that is close to the third end 113. In addition, an operating band of the resonance in the ¼ wavelength mode generated by the second radiator 21 in this implementation is basically the same as an operating band of the resonance in the ¼ wavelength mode generated by the first radiator 11. The second radiator 21 can generate resonance in the ½ wavelength mode in a section between the end face close to the fourth end 212 and the end face close to the third end 213. In addition, an operating band of the resonance in the ½ wavelength mode generated by the second radiator 21 in this implementation is basically the same as an operating band of the resonance in the ½ wavelength mode generated by the first radiator 11.

Figure 37:
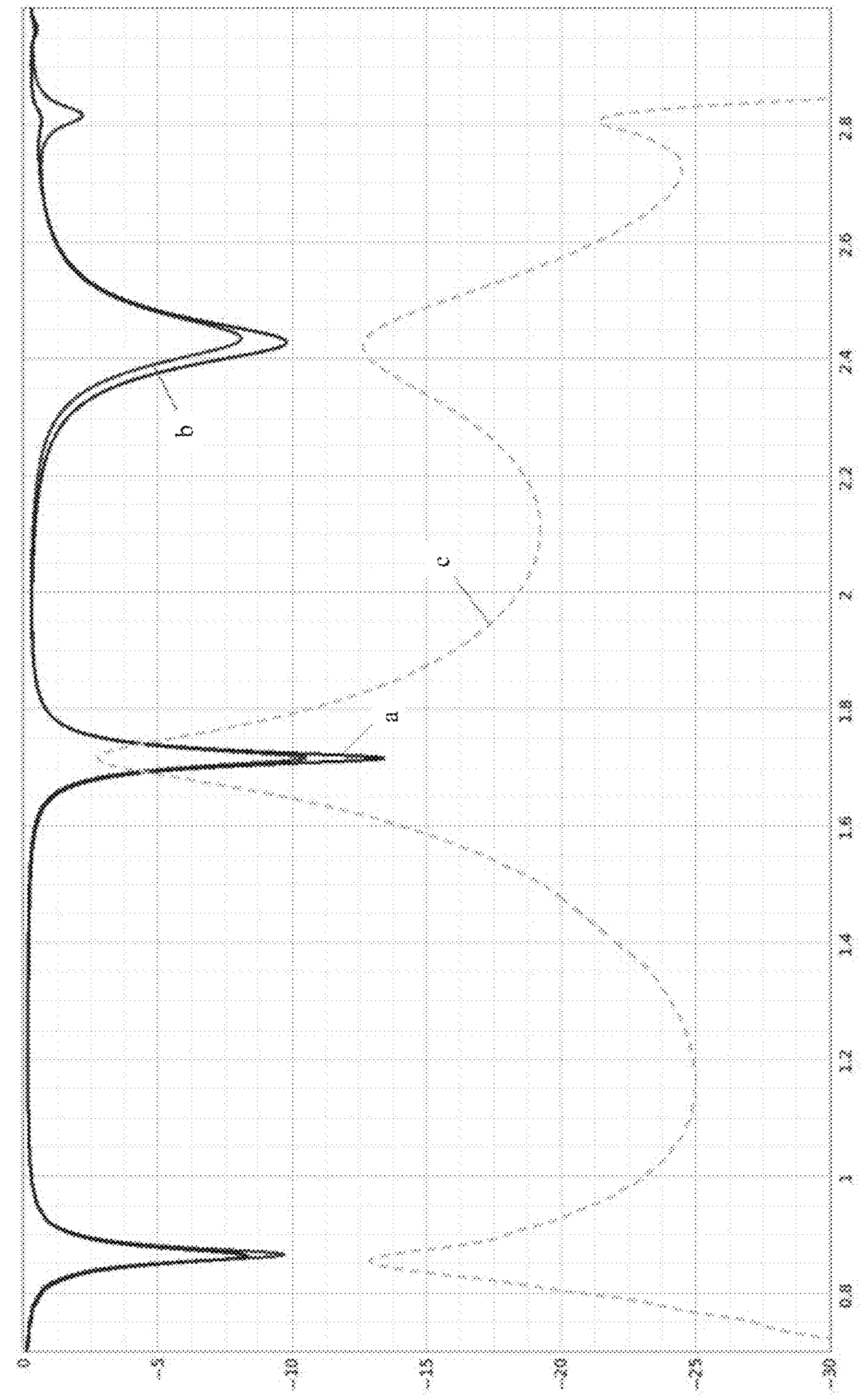
FIG. 37 is a return loss diagram and an isolation curve diagram of the antenna structure shown in FIG. 36.

Refer to FIG. 37. FIG. 37 is a return loss diagram and an isolation curve diagram of the antenna structure 100 shown in FIG. 36. A curve a is a return loss curve of the first antenna 10, and a curve b is a return loss curve of the second antenna 20. Abscissas of the curve a and the curve b represent frequency, and a unit is GHz. Ordinates of the curve a and the curve b represent return loss coefficient, and a unit is dB. A curve c is an isolation curve between the first antenna 10 and the second antenna 20. An abscissa represents frequency, and a unit is GHz. An ordinate represents isolation coefficient, and a unit is dB. It can be learned from FIG. 37 that in this implementation, an operating band of the first antenna 10 in the ¼ wavelength mode and an operating band of the second antenna 20 in the ¼ wavelength mode are basically the same, and center operating frequencies are both about 2.5 GHz. An operating band of the first antenna 10 in the ½ wavelength mode and an operating band of the second antenna 20 in the ½ wavelength mode are basically the same, and center operating frequencies are both about 0.85 GHz.

In this implementation, when both the operating modes of the first antenna 10 and the second antenna 20 are the ¼ wavelength mode, the operating frequencies of the first antenna 10 and the second antenna 20 are relatively high and are both about 2.5 GHz. This is applicable to an operating band of 2.4G Wi-Fi or N41. In this case, the decoupling frequency of the antenna module 100 is about 2.5 GHz, and a signal of the first radiator 11 is allowed to be transmitted to the second radiator 21. This is equivalent to that a value of an inductor connected between the first open end of the first radiator 11 and the second open end of the second radiator 21 is a value of an equivalent inductance of the filter circuit (about 6.2 nH). Therefore, it is ensured that the first antenna 10 in the ¼ wavelength mode has good isolation from the second antenna 20 in the ¼ wavelength mode. Specifically, in this implementation, isolation between the first antenna 10 in the ¼ wavelength mode and the second antenna 20 in the ¼ wavelength mode is about −13 dB.

When both the operating modes of the first antenna 10 and the second antenna 20 are the ½ wavelength mode, the operating frequencies of the first antenna 10 and the second antenna 20 are relatively low and are both about 0.85 GHz. In this case, the decoupling frequency of the antenna module 100 is about 0.85 GHz, and the filter circuit is equivalent to an open circuit. This is equivalent to that the third inductor 31*c* (about 72 nH) is connected between the first open end of the first radiator 11 and the second open end of the second radiator 21. Therefore, it is ensured that the first antenna 10 in the ½ wavelength mode has good isolation from the second antenna 20 in the ½ wavelength mode. Specifically, in this implementation, isolation between the first antenna 10 in the ½ wavelength mode and the second antenna 20 in the ½ wavelength mode is about −13 dB.

In this implementation, the inductive decoupling circuit 30 is connected between the first open end of the first radiator 11 and the second open end of the second radiator 21, to ensure that when the operating frequencies of the first radiator 11 and the second radiator 21 change, the inductance value of the equivalent inductor connected between the first open end of the first radiator 11 and the second open end of the second radiator 21 can change correspondingly, so as to ensure that there is always relatively good isolation between the first antenna 10 and the second antenna 20.

Figure 38:
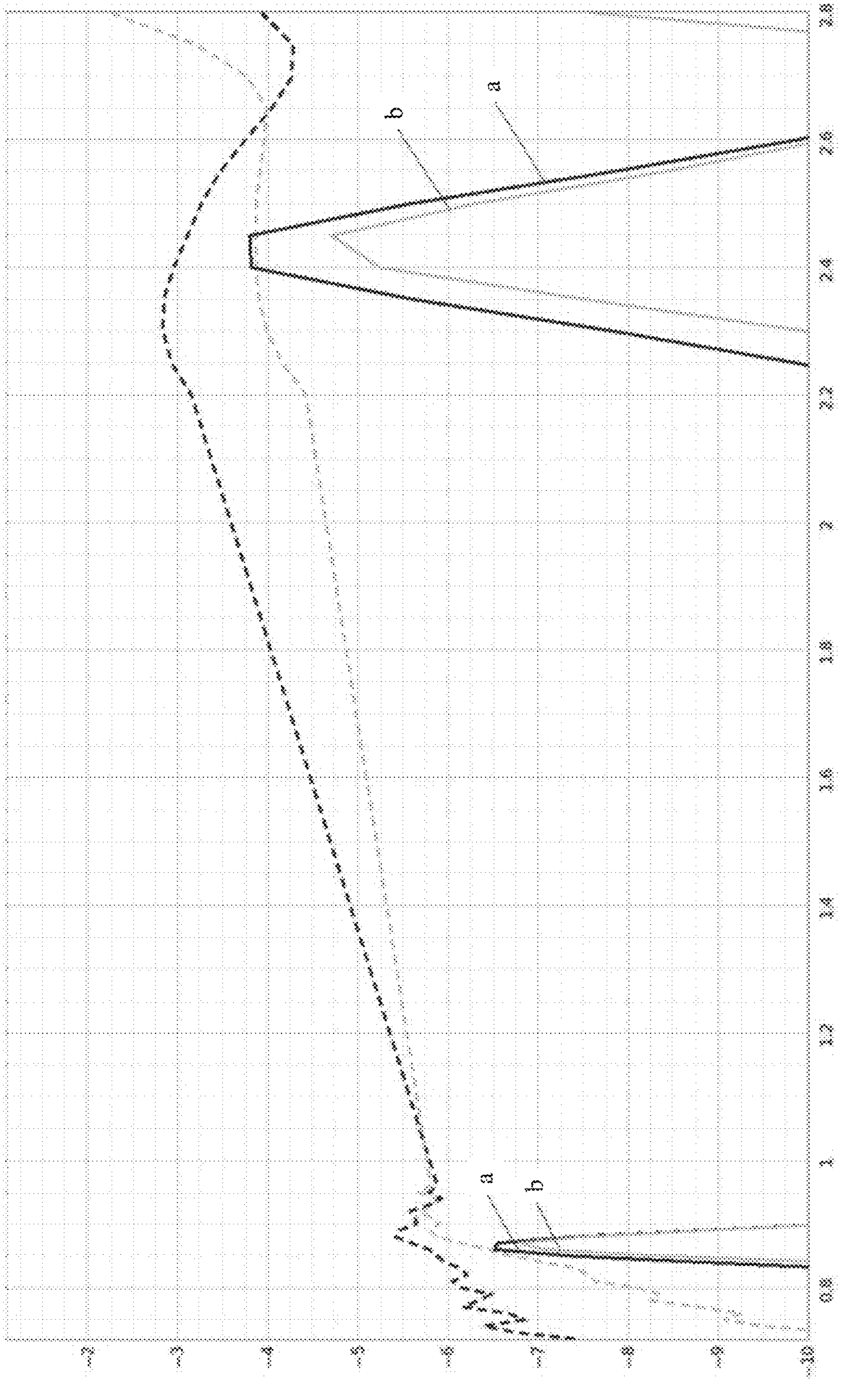
FIG. 38 is an antenna efficiency diagram of a first antenna and an antenna efficiency diagram of a second antenna in the antenna structure shown in FIG. 36.

Refer to FIG. 38. FIG. 38 is an antenna efficiency diagram of the first antenna 10 and an antenna efficiency diagram of the second antenna 20 in the antenna structure 100 shown in FIG. 36. An abscissa in FIG. 38 represents frequency, and a unit is GHz. An ordinate represents efficiency, and a unit is dBi. A curve a in FIG. 38 is an efficiency curve of the first antenna 10 in a free state of the antenna structure 100 shown in FIG. 36, and a curve b in FIG. 38 is an efficiency curve of the second antenna 20 in the free state of the antenna structure 100. In this implementation, the operating efficiency of the first antenna 10 in the free state of the antenna structure 100 is less than −3.8 dBi, and the operating efficiency of the second antenna 20 in the free state of the antenna structure 100 is less than −4.7 dBi. In other words, both the first antenna 10 and the second antenna 20 in this implementation can have relatively good operating efficiency.

In some implementations of this application, one of the first radiator 11 and the second radiator 21 includes a first sub-radiator and a second sub-radiator that are spaced from each other, the first sub-radiator is entirely located on one side of the second sub-radiator, and the other radiator in the first radiator and the second radiator is entirely located on the other side of the second sub-radiator. An end that is of the second sub-radiator and that is away from the first sub-radiator is the open end of the first radiator 11 or the second radiator 21, and one end of the coupling circuit is connected to the end that is of the second sub-radiator and that is away from the first sub-radiator. In addition, the second sub-radiator is not grounded, and a grounding location of the first radiator 11 or the second radiator 21 is on the first sub-radiator. In this implementation of this application, the first radiator 11 or the second radiator 21 includes the first sub-radiator and the second sub-radiator that are spaced from each other. When the electronic device 1000 is used, and a hand of a user or another structure blocks a gap 13 between the first radiator 11 and the second radiator 21, and then the hand of the user or the another structure connects an open end of the first radiator 11 to an open end of the second radiator 21, isolation between the first antenna 10 and the second antenna 20 does not deteriorate sharply.

Figure 39:
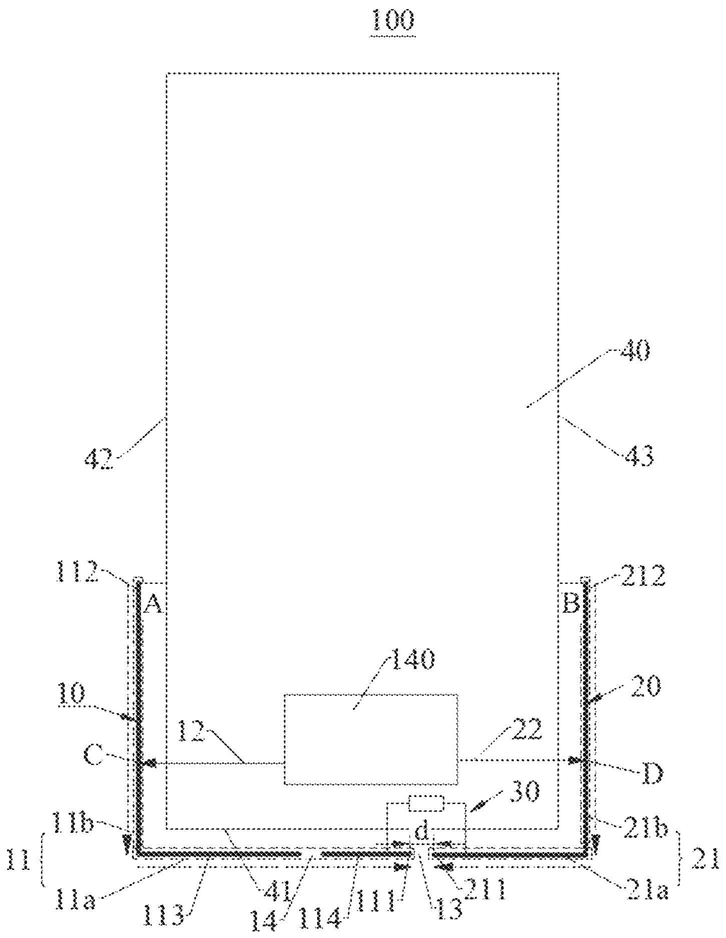
FIG. 39 is a schematic diagram of a structure of an antenna structure according to another implementation of this application.
Figure 40:
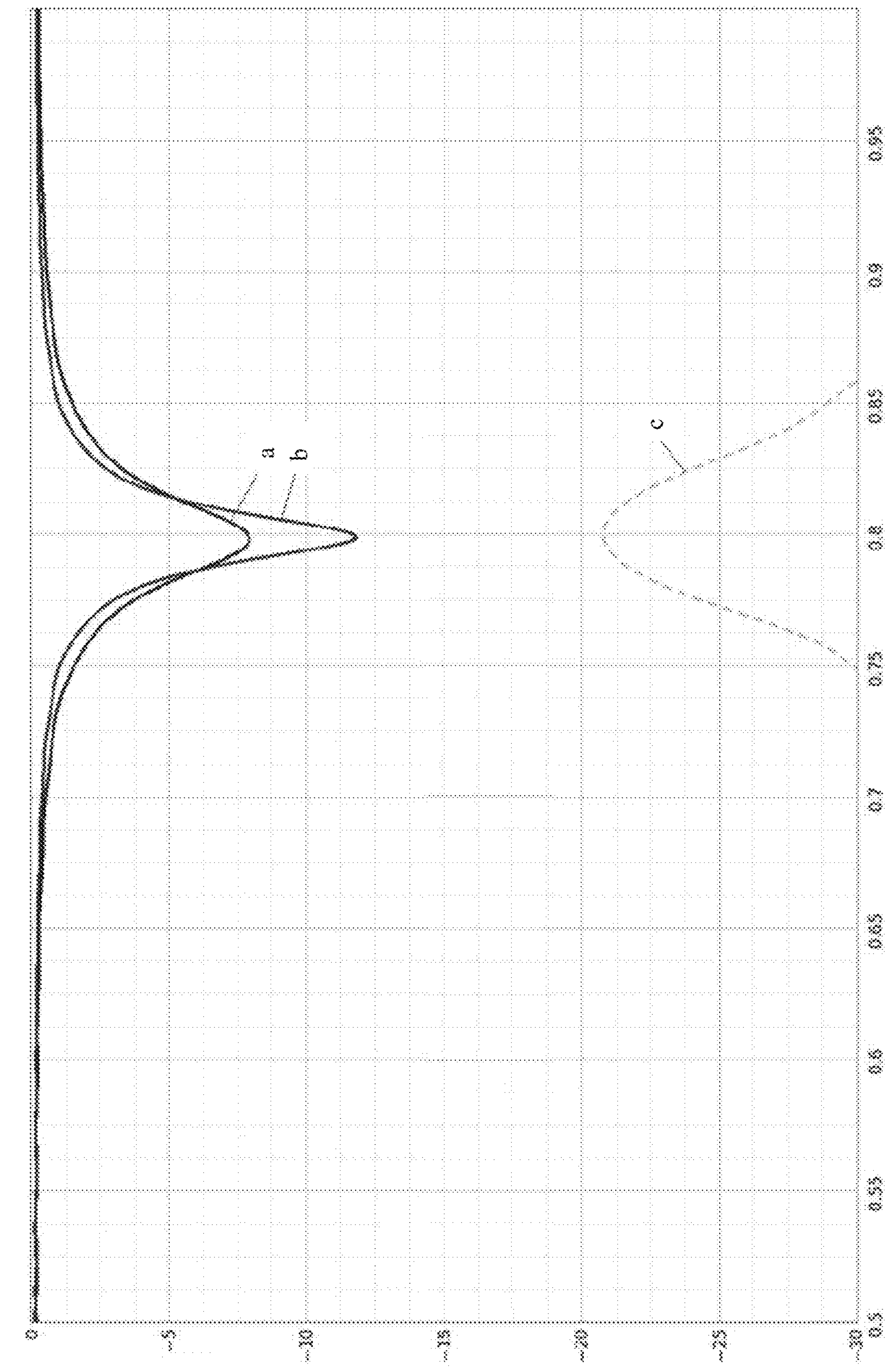
FIG. 40 is a return loss curve diagram and an isolation curve diagram of the antenna structure shown in FIG. 39.

For example, refer to FIG. 39. FIG. 39 is a schematic diagram of a structure of an antenna structure 100 according to another implementation of this application. A difference between the implementation shown in FIG. 39 and the implementation shown in FIG. 3 lies in that in this implementation, the first radiator 11 includes a first sub-radiator 113 and a second sub-radiator 114 that are spaced from each other, the second sub-radiator 114 is close to the second radiator 21 relative to the first sub-radiator 113, and the first sub-radiator 113 and the second sub-radiator 114 can be coupled to each other. The first sub-radiator 113 and the second sub-radiator 114 are respectively located on two sides of a gap 14. In this implementation, both a grounding location A and a feeding location of the first radiator 11 are on the first sub-radiator 113. In this implementation, an end that is of the second sub-radiator 114 and that is away from the first sub-radiator 113 is a first open end of the first radiator 11. One end of the band-stop coupling circuit 30 in this implementation is connected to the second sub-radiator 114, and the other end is connected to the second radiator 21. In this implementation, both the first radiator 11 and the second radiator 21 are of an "L"-shaped structure, a part of the first section 11*a* of the first radiator 11 is the second sub-radiator 114, and a part of the first section 11*a* and the second section 11*b* of the first radiator 11 form the first sub-radiator 113. In this implementation, the first sub-radiator 113 and the second radiator 21 are of a symmetrical structure, and are symmetrically disposed on two opposite sides of the ground 40. Specifically, in this implementation, a structure of the first sub-radiator 113 of the first radiator 11 is the same as that of the second radiator 21 (including a same shape and size). In addition, the second section 11*b* of the first radiator 11 and the fourth section 21*b* of the second radiator 21 are respectively disposed on a side of the second edge 42 and a side of the third edge 43 of the ground 40. Apart of the first section 11*a* included in the first sub-radiator 113, the second sub-radiator 114, and the fourth section 21*b* of the second radiator 21 are all disposed on a side of the first edge 41 of the ground 40. In embodiments of this application, that the first sub-radiator 113 and the second radiator 21 are of a "symmetrical structure" means that the first sub-radiator 113 and the second radiator 21 can be basically symmetrical along a virtual symmetry axis, and "basically symmetrical" means that a specific angular error and/or a size error are/is allowed, but does not mean absolute symmetry in a strict mathematical sense. Refer to FIG. 40. FIG. 40 is a return loss curve diagram and an isolation curve diagram of the antenna structure 100 shown in FIG. 39. A curve a is a return loss curve of the first antenna 10, and a curve b is a return loss curve of the second antenna 20. Abscissas of the curve a and the curve b represent frequency, and a unit is GHz. Ordinates of the curve a and the curve b represent return loss coefficient, and a unit is dB. A curve c is an isolation curve between the first antenna 10 and the second antenna 20. An abscissa represents frequency, and a unit is GHz. An ordinate represents isolation coefficient, and a unit is dB. It can be learned from FIG. 40 that in this implementation, an operating band of the first antenna 10 and an operating band of the second antenna 20 are basically the same, and center operating frequencies are both about 0.8 GHz. In this implementation, isolation between the first antenna 10 and the second antenna 20 at the center operating frequency is about −21 dB, that is, there is relatively good isolation between the first antenna 10 and the second antenna 20.

Figure 41:
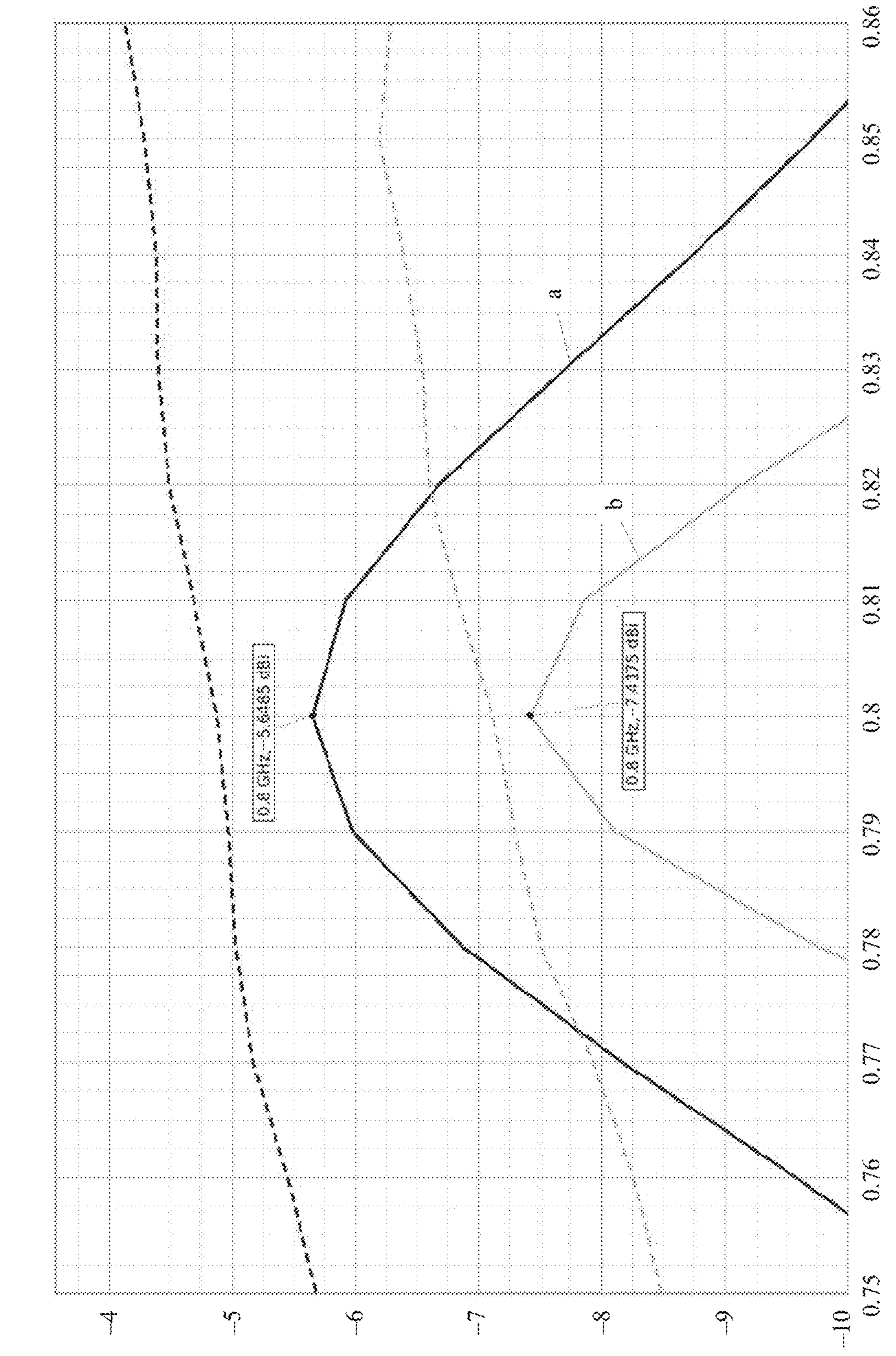
FIG. 41 is an antenna efficiency diagram of a first antenna and an antenna efficiency diagram of a second antenna in a free state of the antenna structure shown in FIG. 39.

Refer to FIG. 41. FIG. 41 is an antenna efficiency diagram of the first antenna 10 and an antenna efficiency diagram of the second antenna 20 in a free state of the antenna structure 100 shown in FIG. 39. An abscissa in FIG. 41 represents frequency, and a unit is GHz. An ordinate represents efficiency, and a unit is dBi. A curve a in FIG. 41 is an efficiency curve of the first antenna 10 in a free state of the antenna structure **1*t*0 shown in FIG. 12, and a curve b in FIG. 41 is an efficiency curve of the second antenna 20 in a free state of the first antenna 10. In this implementation, the operating efficiency of the first antenna 10 in the free state of the antenna structure 100 is less than −5.6 dBi, and the operating efficiency of the second antenna 20 in the free state of the antenna structure 100 is less than −7.4 dBi. In other words, in this implementation, when the antenna structure 100 is in the free state, both the first antenna 10 and the second antenna 20** can have relatively good operating efficiency.

Figure 42:
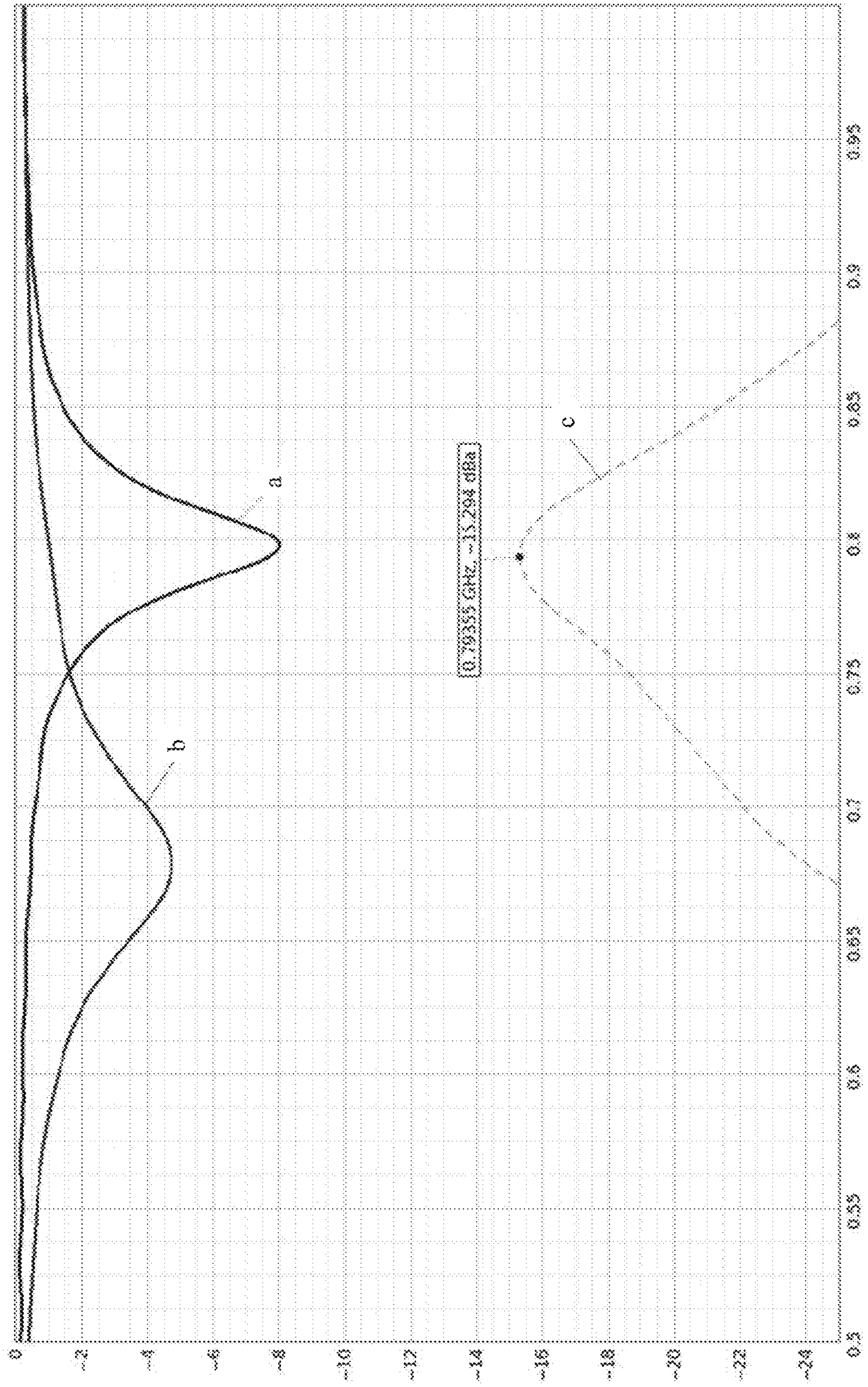
FIG. 42 is a return loss curve diagram and an isolation curve diagram of the antenna structure shown in FIG. 39 in a case that a gap between a first radiator and a second radiator of the antenna structure is blocked.
Figure 43:
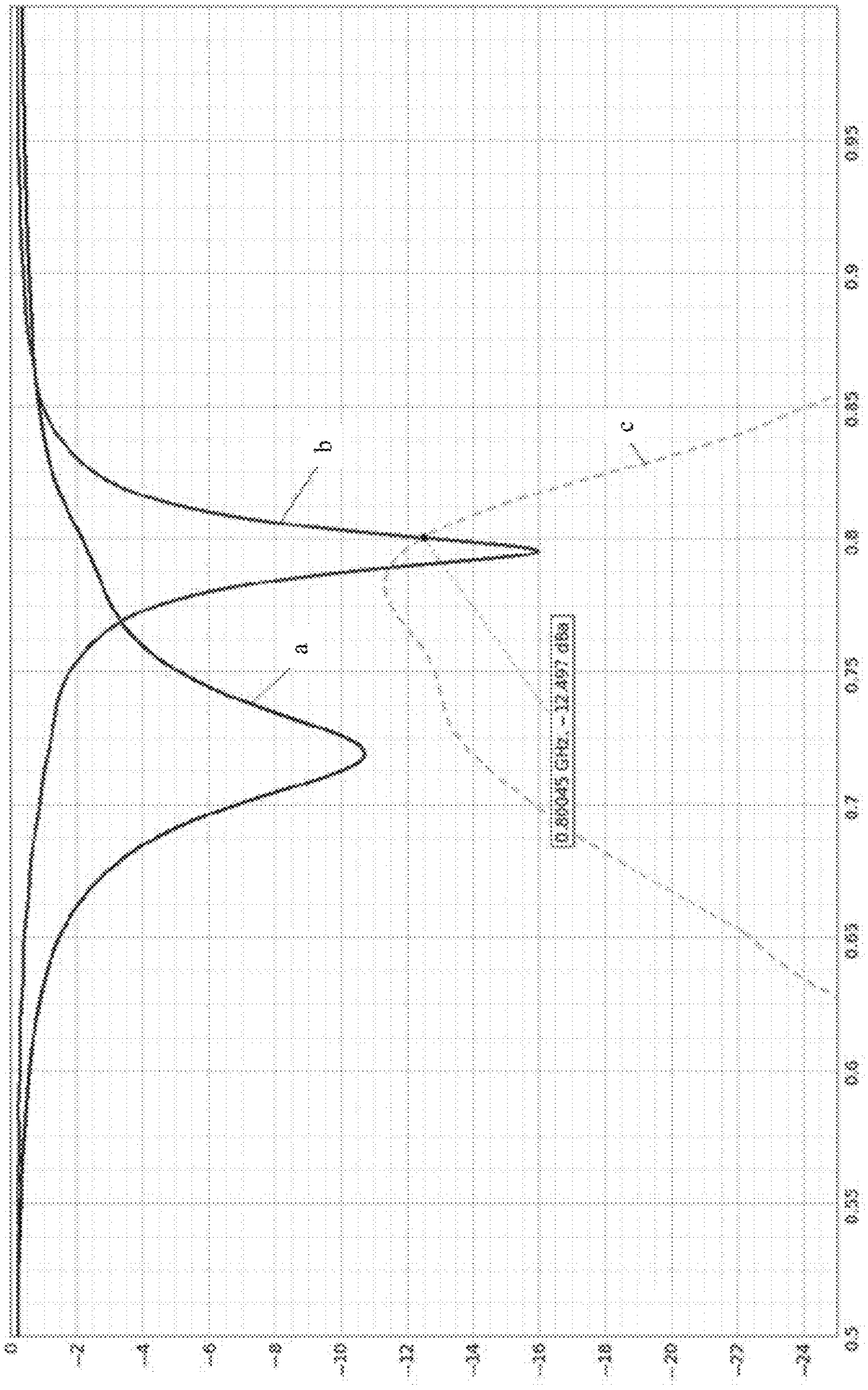
FIG. 43 is a return loss curve diagram and an isolation curve diagram of the antenna structure shown in FIG. 39 in a case that a gap between a first sub-radiator and a second sub-radiator of a first radiator of the antenna structure is blocked.

Refer to FIG. 42 and FIG. 43. FIG. 42 is a return loss curve diagram and an isolation curve diagram of the antenna structure 100 shown in FIG. 39 in a case that a gap 13 between the first radiator 11 and the second radiator 21 of the antenna structure 100 is blocked. FIG. 43 is a return loss curve diagram and an isolation curve diagram of the antenna structure 100 shown in FIG. 39 in a case that a gap 14 between the first sub-radiator 113 and the second sub-radiator 114 of the first radiator 11 of the antenna structure 100 is blocked. A curve a in FIG. 42 and FIG. 43 is a return loss curve of the first antenna 10, and a curve b in FIG. 42 and FIG. 43 is a return loss curve of the second antenna 20. Abscissas of the curve a and the curve b represent frequency, and a unit is GHz. Ordinates of the curve a and the curve b represent return loss coefficient, and a unit is dB. A curve c in FIG. 42 and FIG. 43 is an isolation curve between the first antenna 10 and the second antenna 20. An abscissa represents frequency, and a unit is GHz. An ordinate represents isolation coefficient, and a unit is dB. In this implementation, when the gap 13 between the first radiator 11 and the second radiator 21 is blocked by using a hand of a user or another structure, the second antenna 20 generates a frequency offset, and isolation between the first antenna 10 and the second antenna 20 can be about −15 dB. When the gap 14 between the first sub-radiator 113 and the second sub-radiator 114 of the first radiator 11 is blocked by using a hand of a user or another structure, the first antenna 10 generates a frequency offset, and isolation between the first antenna 10 and the second antenna 20 can be about −12.5 dB. When the gap 13 between the first radiator 11 and the second radiator 21 in the implementation shown in FIG. 3 is blocked, isolation between the first antenna 10 and the second antenna 20 is only about −6 dB. In this implementation, the first antenna 10 is set to a structure including the first sub-radiator 113 and the second sub-radiator 114 that are spaced from each other, so that when the gap 14 between the first sub-radiator 113 and the second sub-radiator 114 of the first radiator 11 or the gap 13 between the first radiator 11 and the second radiator 21 is blocked by a hand of a user or another structure, a decrease in isolation between the first antenna 10 and the second antenna 20 can be alleviated. This ensures that there is always relatively good isolation between the first antenna 10 and the second antenna 20.

In some implementations of this application, an electrical length of the second sub-radiator 114 is less than ¼ of a wavelength of the decoupling band of the antenna structure 100, to avoid that an excessively long length of the second sub-radiator 11 affects arrangement of the first sub-radiator 113 and the second radiator 21, and ensure that at least one of the first sub-radiator 113 and the second radiator 21 can be of an “L”-shaped structure. In an implementation of this application, the decoupling band is an operating band of the first radiator 11 the same as that of the second radiator 21, or an operating band that is of the first radiator 11 and whose difference from an operating band of the second radiator 21 is less than 1 GHz. In this implementation, operating bands of both the first radiator 11 and the second radiator 21 are 0.8 GHz, that is, the decoupling band of the antenna structure 100 in this implementation is 0.8 GHz. The electrical length of the second sub-radiator 114 is less than ¼ of the wavelength of the antenna pattern in which an operating frequency is 0.8 GHz.

It should be noted that in an implementation of this application, a difference between FIG. 39 and FIG. 3 may also be applied to the foregoing embodiment. In other words, the first radiator 11 or the second radiator 21 of the antenna structure 100 in the implementations shown in FIG. 3 to FIG. 39 in this application may alternatively be set to a structure including the first sub-radiator 113 and the second sub-radiator 114.

Figure 44:
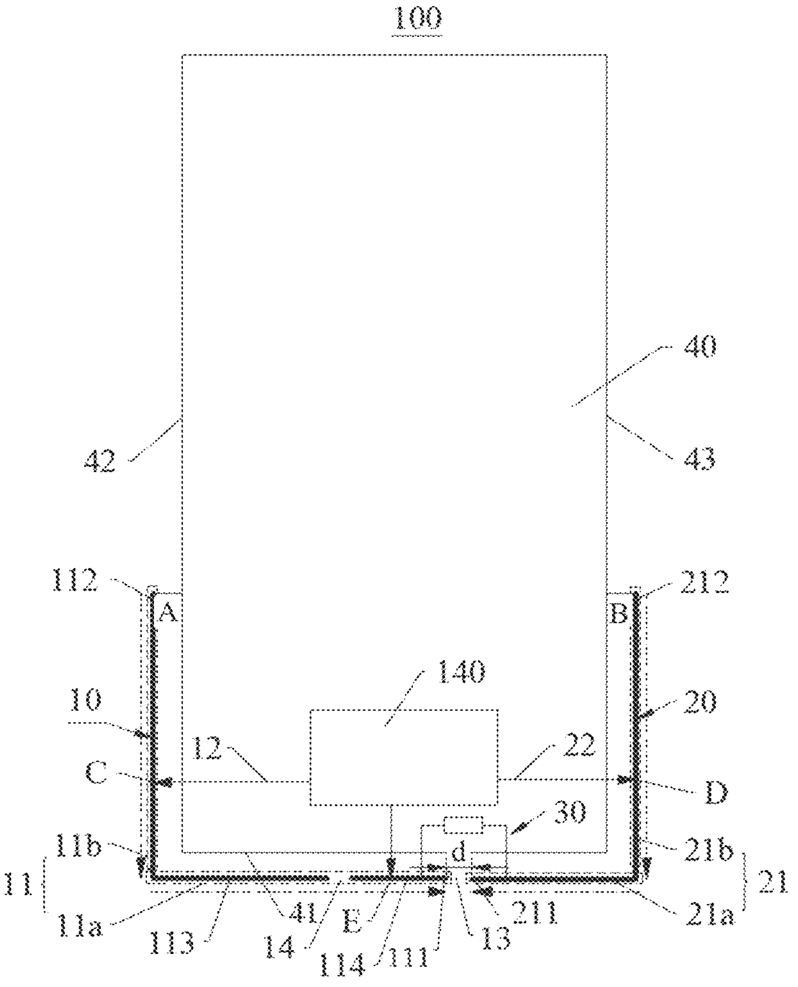
FIG. 44 is a schematic diagram of a topology structure of an antenna structure according to another implementation of this application.

In some other implementations of this application, a feedpoint may be further disposed on the second sub-radiator 114 located between the first sub-radiator 113 and the second radiator 21, and the radio frequency front end 140 may be connected to the feedpoint, to feed power to the second sub-radiator 114. In this way, the second sub-radiator 114 can be used as a separate radiation stub to perform signal radiation, to increase an operating mode of the antenna. For example, refer to FIG. 44. FIG. 44 is a schematic diagram of a structure of an antenna structure 100 according to another implementation of this application. A difference between the antenna structure 100 in this implementation and the antenna structure 100 shown in FIG. 39 lies in that in this implementation, a feedpoint E is disposed on the second sub-radiator 114. The radio frequency front end 140 is connected to feedpoints on the first sub-radiator 113, the second sub-radiator 114, and the second radiator 21, to feed power to the first sub-radiator 113, the second sub-radiator 114, and the second radiator 21. In this way, the first sub-radiator 113 and the second radiator 21 each can generate a low operating band (for example, a low band in sub-6G), and the second sub-radiator 114 can generate a high operating band (for example, a high band in sub-6G).

In this application, the decoupling circuit 30 is disposed between the first open end of the first radiator 11 and the second open end of the second radiator 21, so that isolation between the first antenna 10 and the second antenna 20 can be improved. In addition, at least one of the first radiator 11 and the second radiator 21 is of an “L”-shaped structure, and the first section and the second section of the first radiator 11 or the second radiator 21 of the “L”-shaped structure are respectively located on two adjacent sides of the ground 40 (for example, a side of the first edge 41 and a side of the second edge 42, or a side of the first edge 41 and a side of the third edge 43), so that isolation between the first antenna 10 and the second antenna 20 can be further improved, and an envelope correlation coefficient between the first antenna 10 and the second antenna 20 can be reduced. In addition, impact on operating efficiency of the first antenna 10 and the second antenna 20 caused by connecting the decoupling circuit 30 between the first open end of the first radiator 11 and the second open end of the second radiator 21 can be reduced. In addition, in some implementations, the first radiator 11 or the second radiator 21 is set to a structure including the first sub-radiator 113 and the second sub-radiator 114 that are spaced from each other. Therefore, a problem that isolation between the first antenna 10 and the second antenna 20 greatly decreases when the gap 13 between the first radiator 11 and the second radiator 21 is blocked by a hand of a user or another structure can be avoided.

The foregoing descriptions are example implementations of this application. It should be noted that a person of ordinary skill in the art may make several improvements or polishing without departing from the principle of this application and the improvements or polishing shall fall within the protection scope of this application.

What is claimed is:

1. An antenna structure comprising:

a ground comprising a first edge and a second edge that are adjacent and intersect at an angle that is within a range of 80° to 100°;

a first radiator comprising:

a first open end;

a first section disposed proximate to the first edge; and a second section that intersects with the first section and is disposed proximate to the second edge;

a second radiator comprising a second open end;

a gap formed between the first open end and the second open end and comprising:

a first side disposing the first radiator; and a second side disposing the second radiator; and a decoupling circuit connected to the first open end and the second open end and comprising:

a first branch comprising an inductive filter circuit; and a second branch parallel to the first branch and comprising a first inductor, wherein a first equivalent inductance value of the first branch is different from a second equivalent inductance value of the second branch.

2. The antenna structure of claim 1, wherein the ground further comprises a third edge, wherein the first edge is connected between the second edge and the third edge, wherein the third edge is adjacent to and intersects the first edge, and wherein an angle at which the first edge and the third edge intersect is within a range of 80° to 100°.

3. The antenna structure of claim 2, wherein the first radiator further comprises:

a first end that is the first open end, of the first section, and away from the second section, and a second end that is of the second section, away from the first section, and either connected to the ground or a third open end of the first radiator.

4. The antenna structure of claim 3, wherein the second radiator comprises a third section and a fourth section that intersect, wherein the third section is disposed proximate to the first edge, wherein the fourth section is disposed proximate to the third edge, and wherein the second radiator comprises:

a third end that is the third open end, of the third section, and away from the fourth section; and a fourth end that is of the fourth section, away from the third section, and either connected to the ground or a fourth open end of the second radiator.

5. The antenna structure of claim 1, wherein the second radiator is disposed proximate to the second edge and disposed proximate to a side of the second section that is away from the first section, wherein the first radiator comprises a first end and a second end, wherein the first end is of the first section and is away from the second section, wherein the second end is of the second section and is away from the first section, wherein the second radiator comprises a third end and a fourth end, wherein the third end is close to the first radiator relative to the fourth end, wherein the second end is the first open end, wherein the third end is the second open end, and wherein the decoupling circuit is connected to the second end and the third end.

6. The antenna structure of claim 5, wherein the first radiator further comprises a third open end, wherein the first end is the third open end, and wherein the fourth end is connected to the ground.

7. The antenna structure of claim 1, wherein the first radiator is configured to operate in a first operating mode, wherein the second radiator is configured to operate in a second operating mode, and wherein a first operating band of the first radiator in the first operating mode and a second operating band of the second radiator in the second operating mode are within a range of 500 megahertz (MHz) to 1 gigahertz (GHz).

8. The antenna structure of claim 7, wherein the first radiator or the second radiator comprises a first sub-radiator and a second sub-radiator that are spaced apart from each other, wherein the first sub-radiator is located on one side of the second sub-radiator, wherein the second radiator is located on the other side of the second sub-radiator, wherein the first sub-radiator is coupled to the second sub-radiator, and wherein an end of the second sub-radiator that is away from the first sub-radiator is the first open end or the second open end.

9. The antenna structure of claim 8, wherein an electrical length of the second sub-radiator is less than ¼ of a wavelength of a decoupling band of the antenna structure, and wherein the decoupling band is the same as the first operating band or the second operating band.

10. The antenna structure of claim 8, further comprising a feedpoint disposed on the second sub-radiator and configured to receive signal feed-in.

11. The antenna structure of claim 1, wherein the first inductor comprises a lumped inductor.

12. The antenna structure of claim 1, wherein the inductive filter circuit comprises a capacitor, a second inductor, and a third inductor, wherein the capacitor is connected in parallel to the second inductor and connected in series to the third inductor, and wherein the second branch comprises a fourth inductor.

13. The antenna structure of claim 1, wherein the first radiator is configured to operate in a first operating mode and the second radiator is configured to operate in a second operating mode, and wherein a center frequency of a first operating band of the first radiator in the first operating mode and a center frequency of a second operating band of the second radiator in the second operating mode are the same or have a difference of less than 1 gigahertz (GHz).

14. The antenna structure of claim 13, wherein the first operating band and the second operating band are sub-6G operating bands.

15. The antenna structure of claim 1, wherein the decoupling circuit is connected to a first connection point of the first open end and a distance between the first connection point and the first open end is within a range of 0 millimeters (mm) to 2 mm.

16. An electronic device comprising:

a radio-frequency front end; and an antenna structure comprising:

a ground comprising a first edge and a second edge that are adjacent and intersect at an angle that is within a range of 80° to 100°;

a first radiator comprising a first open end, and further comprising a first section and a second section that intersect, wherein the first section is located proximate to the first edge, and wherein the second section is located proximate to the second edge;

a second radiator comprising a second open end and a gap formed between the first open end and the second open end, wherein the first radiator is located on one side of the gap, and the second radiator is located on the other side of the gap, and wherein the second radiator is located on the other side of the gap;

a decoupling circuit connected to the first open end and the second open end and comprising:

a first branch comprising an inductive filter circuit; and a second branch parallel to the first branch and comprising a first inductor, wherein a first equivalent inductance value of the first branch is different from a second equivalent inductance value of the second branch;

a first feedpoint disposed on the first radiator and connected to the radio-frequency front end; and a second feedpoint disposed on the second radiator and connected to the radio-frequency front end.

17. The electronic device of claim 16, further comprising a metal frame, wherein the metal frame comprises the first radiator and the second radiator.

18. An electronic device comprising:

a radio-frequency front end; and an antenna structure comprising:

a ground comprising a first edge and a second edge that are adjacent and intersect at an angle that is within a range of 80° to 100°;

a first radiator comprising a first open end, and further comprising a first section and a second section that intersect, wherein the first section is located proximate to the first edge, and wherein the second section is located proximate to the second edge;

a second radiator comprising a second open end and a gap formed between the first open end and the second open end, wherein the first radiator is located proximate to the gap, and the second radiator is located proximate to the gap;

a decoupling circuit connected to the first open end and the second open end and comprising:

a first branch comprising an inductive filter circuit; and a second branch parallel to the first branch and comprising a first inductor, wherein a first equivalent inductance value of the first branch is different from a second equivalent inductance value of the second branch;

a first feedpoint is disposed on the first radiator; and a second feedpoint is disposed on the second radiator, wherein the radio-frequency front end is connected to the first feedpoint and the second feedpoint, and wherein the ground comprises one or more of a grounded middle plate, a ground plane of a circuit board, and a ground metal piece.

19. The antenna structure of claim 1, wherein the first inductor comprises a distributed inductor.

20. The antenna structure of claim 1, wherein the decoupling circuit is connected to a second connection point of the second open end and a distance between the second connection point and the second open end is within a range of 0 millimeters (mm) to 2 mm.

* * * * *